US008666917B2

(12) United States Patent
Jaros et al.

(10) Patent No.: US 8,666,917 B2
(45) Date of Patent: Mar. 4, 2014

(54) SEQUENCE LEARNING IN A HIERARCHICAL TEMPORAL MEMORY BASED SYSTEM

(75) Inventors: Robert G. Jaros, San Francisco, CA (US); Dileep George, Menlo Park, CA (US); Jeffrey Hawkins, Atherton, CA (US); Frank Astier, Mountain View, CA (US)

(73) Assignee: Numenta, Inc., Redwood City, CA (US)

( * ) Notice: Subject to any disclaimer, the term of this patent is extended or adjusted under 35 U.S.C. 154(b) by 0 days.

(21) Appl. No.: 13/604,543

(22) Filed: Sep. 5, 2012

(65) Prior Publication Data

US 2012/0330885 A1 Dec. 27, 2012

Related U.S. Application Data

(63) Continuation of application No. 12/576,966, filed on Oct. 9, 2009, now Pat. No. 8,285,667, which is a continuation of application No. 11/622,454, filed on Jan. 11, 2007, now Pat. No. 7,620,608, which is a continuation of application No. 11/351,437, filed on Feb. 10, 2006, now abandoned.

(60) Provisional application No. 60/771,990, filed on Feb. 10, 2006.

(51) Int. Cl.
*G06F 15/18* (2006.01)
(52) U.S. Cl.
USPC ............................................................ 706/12
(58) Field of Classification Search
None
See application file for complete search history.

(56) References Cited

U.S. PATENT DOCUMENTS

| 4,766,534 | A  | 8/1988  | DeBenedictis     |
| 4,845,744 | A  | 7/1989  | DeBenedictis     |
| 5,255,348 | A  | 10/1993 | Nenov            |
| 5,712,953 | A  | 1/1998  | Langs            |
| 5,729,661 | A  | 3/1998  | Keeler et al.    |
| 5,761,389 | A  | 6/1998  | Maeda et al.     |
| 6,028,608 | A  | 2/2000  | Jenkins          |
| 6,122,014 | A  | 9/2000  | Panusopone et al.|
| 6,144,711 | A  | 11/2000 | Raleigh et al.   |
| 6,195,622 | B1 | 2/2001  | Altschuler et al.|

(Continued)

FOREIGN PATENT DOCUMENTS

| EP | 1 557 990       | 7/2005 |
| WO | WO 2006/063291  | 6/2006 |
| WO | WO 2008/067326  | 6/2008 |
| WO | WO 2009/006231  | 1/2009 |

OTHER PUBLICATIONS

Bradski et al, Fast-Learning VIEWNET Architectures for Recognizing Three-dimensional Objects from Multiple Two-dimensional Views, 1995.*

(Continued)

*Primary Examiner* — Jeffrey A Gaffin
*Assistant Examiner* — Mikayla Chubb
(74) *Attorney, Agent, or Firm* — Fenwick & West LLP

(57) ABSTRACT

A hierarchy of computing modules is configured to learn a cause of input data sensed over space and time, and is further configured to determine a cause of novel sensed input data dependent on the learned cause. At least one of the computing modules has a sequence learner module configured to associate sequences of input data received by the computing module to a set of causes previously learned in the hierarchy.

19 Claims, 28 Drawing Sheets

(56) References Cited

U.S. PATENT DOCUMENTS

| | | | |
|---|---|---|---|
| 6,400,996 B1 | 6/2002 | Hoffberg et al. | |
| 6,468,069 B2 | 10/2002 | Lemelson et al. | |
| 6,567,814 B1 | 5/2003 | Bankier et al. | |
| 6,615,211 B2 | 9/2003 | Beygelzimer et al. | |
| 6,625,585 B1 | 9/2003 | MacCuish et al. | |
| 6,714,941 B1 | 3/2004 | Lerman et al. | |
| 6,751,343 B1 | 6/2004 | Ferrell et al. | |
| 6,957,241 B2 | 10/2005 | George | |
| 7,088,693 B2 | 8/2006 | George | |
| 7,251,637 B1 | 7/2007 | Caid et al. | |
| 7,613,675 B2 | 11/2009 | Hawkins et al. | |
| 7,620,608 B2 | 11/2009 | Jaros et al. | |
| 7,624,085 B2 | 11/2009 | Hawkins et al. | |
| 7,676,458 B2 | 3/2010 | Aggarwal et al. | |
| 7,739,208 B2 | 6/2010 | George et al. | |
| 7,826,990 B2 | 11/2010 | Nasle et al. | |
| 7,840,395 B2 | 11/2010 | Nasle et al. | |
| 7,840,396 B2 | 11/2010 | Radibratovic et al. | |
| 7,844,439 B2 | 11/2010 | Nasle et al. | |
| 7,844,440 B2 | 11/2010 | Nasle et al. | |
| 7,899,775 B2 | 3/2011 | George et al. | |
| 7,904,412 B2 | 3/2011 | Saphir et al. | |
| 7,937,342 B2 | 5/2011 | George et al. | |
| 7,941,389 B2 | 5/2011 | Marianetti, II et al. | |
| 7,941,392 B2 | 5/2011 | Saphir | |
| 7,983,998 B2 | 7/2011 | George et al. | |
| 8,037,010 B2 | 10/2011 | Jaros et al. | |
| 8,102,423 B2 * | 1/2012 | Cheng | 348/159 |
| 8,103,603 B2 | 1/2012 | George et al. | |
| 8,112,367 B2 | 2/2012 | George et al. | |
| 8,121,961 B2 | 2/2012 | George et al. | |
| 8,175,981 B2 | 5/2012 | Hawkins et al. | |
| 8,175,984 B2 | 5/2012 | George | |
| 8,175,985 B2 | 5/2012 | Sayfan et al. | |
| 8,195,582 B2 | 6/2012 | Niemasik et al. | |
| 8,219,507 B2 | 7/2012 | Jaros et al. | |
| 8,285,667 B2 | 10/2012 | Jaros et al. | |
| 8,290,886 B2 | 10/2012 | George et al. | |
| 2002/0002688 A1 | 1/2002 | Gregg et al. | |
| 2002/0038294 A1 | 3/2002 | Matsugu | |
| 2002/0150044 A1 | 10/2002 | Wu et al. | |
| 2002/0161736 A1 | 10/2002 | Beygelzimer et al. | |
| 2003/0069002 A1 | 4/2003 | Hunter et al. | |
| 2003/0105597 A1 | 6/2003 | Tsui et al. | |
| 2003/0123732 A1 | 7/2003 | Miyazaki et al. | |
| 2003/0167111 A1 | 9/2003 | Kipersztok et al. | |
| 2004/0002838 A1 | 1/2004 | Oliver et al. | |
| 2004/0015459 A1 | 1/2004 | Jaeger | |
| 2004/0142325 A1 | 7/2004 | Mintz et al. | |
| 2004/0148520 A1 | 7/2004 | Talpade et al. | |
| 2004/0267395 A1 | 12/2004 | Discenzo et al. | |
| 2005/0002572 A1 | 1/2005 | Saptharishi et al. | |
| 2005/0028033 A1 | 2/2005 | Kipersztok et al. | |
| 2005/0063565 A1 | 3/2005 | Nagaoka et al. | |
| 2005/0190990 A1 | 9/2005 | Burt et al. | |
| 2005/0203773 A1 | 9/2005 | Soto et al. | |
| 2005/0222811 A1 | 10/2005 | Jakobson et al. | |
| 2006/0093188 A1 | 5/2006 | Blake et al. | |
| 2006/0098886 A1 | 5/2006 | De Haan | |
| 2006/0161736 A1 | 7/2006 | Huang | |
| 2006/0184462 A1 * | 8/2006 | Hawkins | 706/14 |
| 2006/0212444 A1 | 9/2006 | Handman et al. | |
| 2006/0235320 A1 | 10/2006 | Tan et al. | |
| 2006/0248026 A1 | 11/2006 | Aoyama et al. | |
| 2006/0248073 A1 | 11/2006 | Jones et al. | |
| 2006/0253491 A1 | 11/2006 | Gokturk et al. | |
| 2006/0259163 A1 | 11/2006 | Hsiung et al. | |
| 2007/0005531 A1 | 1/2007 | George et al. | |
| 2007/0019754 A1 | 1/2007 | Raleigh et al. | |
| 2007/0192264 A1 | 8/2007 | Hawkins et al. | |
| 2007/0192267 A1 | 8/2007 | Hawkins et al. | |
| 2007/0192268 A1 | 8/2007 | Hawkins et al. | |
| 2007/0192269 A1 | 8/2007 | Saphir et al. | |
| 2007/0192270 A1 | 8/2007 | Hawkins et al. | |
| 2007/0228703 A1 | 10/2007 | Breed | |
| 2007/0276744 A1 | 11/2007 | Burke | |
| 2007/0276774 A1 | 11/2007 | Ahmad et al. | |
| 2008/0059389 A1 | 3/2008 | Jaros et al. | |
| 2008/0140593 A1 | 6/2008 | George et al. | |
| 2008/0183647 A1 | 7/2008 | Hawkins et al. | |
| 2008/0201286 A1 | 8/2008 | Hawkins et al. | |
| 2008/0208783 A1 | 8/2008 | Jaros et al. | |
| 2008/0208915 A1 | 8/2008 | George et al. | |
| 2008/0208966 A1 | 8/2008 | Edwards et al. | |
| 2009/0006289 A1 | 1/2009 | Jaros et al. | |
| 2009/0116413 A1 | 5/2009 | George | |
| 2009/0150311 A1 | 6/2009 | George | |
| 2009/0240886 A1 | 9/2009 | Sayfan et al. | |
| 2009/0313193 A1 | 12/2009 | Hawkins et al. | |
| 2010/0049677 A1 | 2/2010 | Jaros et al. | |
| 2010/0185567 A1 | 7/2010 | Niemasik et al. | |
| 2010/0191684 A1 | 7/2010 | George | |
| 2010/0207754 A1 | 8/2010 | Shostak et al. | |
| 2011/0225108 A1 | 9/2011 | Hawkins et al. | |
| 2011/0231351 A1 | 9/2011 | George et al. | |
| 2012/0005134 A1 | 1/2012 | Jaros et al. | |
| 2012/0197823 A1 | 8/2012 | Hawkins et al. | |

OTHER PUBLICATIONS

Haritaoglu et al, W4: Real-Time Surveillance of People and Their Activities, 2000.*

Naphade et al, Discovering Recurrent Events in Video Using Unsupervised Methods, 2002.*

Poritz, Linear Predictive Hidden Markov Models and the Speech Signal, 1982.*

Adelson, E.H. et al., "The Perception of Shading and Reflectance," *Perception as Bayesian Inference*, 1996, pp. 409-423, Knill, D.C. et al., eds., Cambridge University Press, UK.

Agrawal, R. et al., "Mining Sequential Patterns," *IEEE*, 1995, pp. 3-14.

Ahmad, S. et al., "PowerNuPIC," Numenta, Jun. 2008, Numenta HTM Workshop, Jun. 23-24, 2008, SRI Campus, Menlo Park, CA, fifty-six pages.

Ahmad, S., "NuPIC Jumpstart—Part II," Numenta, May 2008, Numenta HTM Workshop, Jun. 23-24, 2008, SRI Campus, Menlo Park, CA, thirty-three pages.

Archive of "Numenta Platform for Intelligent Computing Programmer's Guide," Numenta, Mar. 7, 2007, pp. 1-186, www.numenta.com, [Online] Archived by http://archive.org on Mar. 19, 2007; Retrieved on Aug. 13, 2008. Retrieved from the Internet<URL:http://web.archive.org/web/20070319232606/http://www.numenta.com/for-developers/softare/pdf/nupic_prog_guide.pdf>.

Becerra, J.A. et al., "Multimodule Artificial Neural Network Architectures for Autonomous Robot Control Through Behavior Modulation," *IWANN 2003, LNCS*, pp. 169-176, vol. 2687.

Biancaniello, P. et al., Multimodal Pattern Recognition with Hierarchical Temporal Memory (MPR), Lockheed Martin Brain-Inspired Computing Research Overview, Numenta HTM Workshop, Jun. 2008, twelve pages.

Bobier, B., "Content-Based Image Retrieval Using Hierarchical Temporal Memory," Numenta HTM Workshop, Jun. 23-24, 2008, SRI Campus, Menlo Park, CA, seven pages.

Bryhni et al., "A Comparison of Load Balancing Ttechniques for Scalable Web Servers," IEEE Network, Jul./Aug. 2000, pp. 58-64.

Ceisel, a. et al., "Using HTM Networks to Decode Neural Signals from the Motor Cortex: A Novel Approach to Brain-Computer Interface Control," Illinois Institute of Technology, Numenta Htm Workshop, 2009, four pages.

Chapela, V., "Preventing Financial Fraud," Smart Security Services, Numenta HTM Workshop, 2009, forty pages.

Chinese Office Action, Chinese Application No. 200780007274.1, Jun. 24, 2011, five pages.

Chinese Office Action, Chinese Application No. 200580042258.7, Jul. 10, 2009, twelve pages.

Colombe, J., "A Survey of Recent Developments in Theoretical Neuroscience and Machine Vision," *Proceedings of the IEEE Applied Imagery Pattern Recognition Workshop*, 2003, nine pages.

(56) References Cited

OTHER PUBLICATIONS

Cormack, G.V. et al., "Data Compression Using Dynamic Markov Modelling," *The Computer Journal*, 1987, pp. 541-550, vol. 30, No. 6.

Csapo, A.B. et al., "Object Categorization Using VFA-Generated Nodemaps and Hierarchical Temporal Memories," *IEEE International Conference on Computational Cybernetics*, Oct. 7, 2007, pp. 257-262.

Curry, C. et al., "Speech Processing with HTM," Numenta HTM Workshop, Jun. 23-24, 2008, SRI Campus, Menlo Park, CA, fifty-seven pages.

Dean, T., "Learning Invariant Features Using Inertial Priors," *Annals of Mathematics and Artificial Intelligence*, 2006, pp. 223-250, vol. 47.

Demeris, Y. et al., "From Motor Babbling to Hierarchical Learning by Imitation: A Robot Developmental Pathway," *Proceedings of the Fifth International Workshop on Epigenetic Robotics: Modeling Cognitive Development in Robotic Systems*, 2005, pp. 31-37.

Dimitrova, N. et al., "Motion Recovery for Video Content Classification," *ACM Transactions on Information Systems*, Oct. 1995, pp. 408-439, vol. 13, No. 4.

Ding, C.H.Q., "Cluster Merging and Splitting in Hierarchical Clustering Algorithms," *Proceedings of the 2002 IEEE International Conference on Data Mining (ICDM 2002)*, Dec. 9, 2002, pp. 139-146.

Dolin, R. et al., "Scalable Collection Summarization and Selection," *Association for Computing Machinery*, 1999, pp. 49-58.

Dubinsky, D., "Numenta Business Strategy," Numenta, Jun. 2008, Numenta HTM Workshop, Jun. 23-24, 2008, SRI Campus, Menlo Park, CA, fifteen pages.

Dudgeon, M. et al., "Evolved HTM Preprocessing," Qualia Labs, Jun. 25, 2009, nine pages.

Eastman, K. "HTM's & Airline Passenger Behavior: Prediction and Inference Model," Numenta HTM Workshop, 2009, ten pages.

Edsa, "Project Information," Apr. 2008, Numenta HTM Workshop, Jun. 23-24, 2008, SRI Campus, Menlo Park, CA, four pages.

Eswaran, K., "Numenta Lightning Talk on Dimension Reduction and Unsupervised Learning," Numenta HTM Workshop, Jun. 23-24, 2008, SRI Campus, Menlo Park, CA, thirty pages.

European Patent Office, Examination Report, European Application No. 05853611.1, Jun. 23, 2008, four pages.

European Patent Office, Examination Report, European Application No. 07750385.2, Apr. 21, 2009, eight pages.

European Patent Office, Examination Report, European Patent Application No. 08796030.8, Dec. 6, 2010, seven pages.

European Patent Office, Examination Report European Patent Application No. 07750385.2, Dec. 6, 2010, eight pages.

Farahmand, N. et al., "Online Temporal Pattern Learning," *Proceedings of the International Joint Conference on Neural Networks*, Jun. 14-19, 2009, pp. 797-802, Atlanta, GA, USA.

Felleman, D.J. et al., "Distributed Hierarchical Processing in the Primate Cerebral Cortex," *Cerebral Cortex*, Jan./Feb. 1991, pp. 1-47, vol. 1.

Fine, S. et al., "The Hierarchical Hidden Markov Model: Analysis and Applications," *Machine Learning*, 1998, pp. 41-62, vol. 32, Kluwer Academic Publishers, Boston.

Finley, M., "Exploration of Motion Capture," Qualia Labs, Jun. 24, 2008, Numenta HTM Workshop, Jun. 23-24, 2008, SRI Campus, Menlo Park, CA, thirty-six pages.

Foldiak, P., "Learning Invariance from Transformation Sequences," *Neural Computation*, 1991, pp. 194-200, vol. 3, No. 2.

Fukushima, K., "Neocognitron: A Self-Organizing Neural Network Model for a Mechanism of Pattern Recognition Unaffected by Shift in Position," *Biol. Cybernetics*, 1980, pp. 193-202, vol. 36.

Garalevicius, S., "Memory-Prediction Framework for Pattern Recognition: Performance and Suitability of the Bayesian Model of Visual Cortex," *American Association of Artificial Intelligence*, 2007, six pages.

George, D. "Thesis: How the Brain Might Work," Dept. of Electrical Engineering and the Committee on Graduate Studies of Stanford University, Jun. 2008, one-hundred ninety-one pages.

George, D. et al., "A Hierarchical Bayesian Model of Invariant Pattern Recognition in the Visual Cortex," Mar. 2005.

George, D., et al., "A Hierarchical Bayesian Model of Invariant Pattern Recognition in the Visual Cortex," Proceedings of the 2005 IEEE International joint Conference on Neural Networks, Jul. 31-Aug. 4, 2005, pp. 1812-1817, vol. 3.

George, D. et al., "Invariant Pattern Recognition Using Bayesian Inference on Hierarchical Sequences," Technical Report, Sep. 17, 2004, pp. 1-8.

George, D., et al., "Invariant Pattern Recognition Using Bayesian Inference on Hierarchical Sequences," Oct. 2004, eight pages.

George, D. et al., "The HTM Learning Algorithms," Mar. 1, 2007, 44 pages. [Online] [Retrieved on Sep. 22, 2011] Retrieved from the Internet <URL:http://www.numenta.com/htm-overview/education/Numenta_HTM_Learning_Algos.pdf.>.

George, D. et al., "Towards a Mathematical Theory of Cortical Micro-circuits," *PLoS Computational Biology*, Oct. 2009, vol. 5, Issue 10, twenty-six pages.

Gottschalk, K. et al., "Introduction to Web Services Architecture," *IBM Systems Journal*, 2002, pp. 170-177, vol. 41, No. 2.

Guerrier, P., "A Generic Architecture for On-Chip Packet-Switched Interconnections," *Association for Computing Machinery*, 2000, pp. 250-256.

Guinea, D. et al., "Robot Learning to Walk: An Architectural Problem for Intelligent Controllers," *Proceedings of the 1993 International Symposium on Intelligent Control*, Aug. 1993, pp. 493-498, Chicago, USA.

Guo, C-E. et al., "Modeling Visual Patterns by Integrating Descriptive and Generative Methods," *International Journal of Computer Vision*, May 29, 2003, pp. 5-29, vol. 53, No. 1.

Haitani, R. et al., "Vitamin D Toolkit, Introduction," Jun. 24, 2008, Numenta HTM Workshop, Jun. 23-24, 2008, SRI Campus, Menlo Park, CA, eleven pages.

Haitani, R., "Smart Video: A Disruptive Market Opportunity for HTM," Numenta HTM Workshop, 2009, twelve pages.

Han, K. et al., "Automated Robot Behavior Recognition Applied to Robotic Soccer," in *Proceedings of the IJCAI-99 Workshop on Team Behaviors and Plan Recognition*, 1999, six pages.

Hartung, J. et al., "Presentation: Support for the Use of Hierarchical Temporal Memory Systems in Automated Design Evaluation: A First Experiment," Numenta HTM Workshop, 2009, thirty-one pages.

Hartung, J. et al., "Support for the Use of Hierarchical Temporal Memory Systems in Automated Design Evaluation: A First Experiment," *Proceedings of the ASME 2009 Intl. Design Engineering Technical Conferences & Computers and Information in Engineering Conference*, Aug. 30-Sep. 2, 2009, ten pages, San Diego, CA, USA.

Hasegawa, Y. et al., "Learning Method for Hierarchical Behavior Controller," *Proceedings of the 1999 IEEE International Conference on Robotics & Automation*, May 1999, pp. 2799-2804.

Hawkins, J. "Hierarchical Temporal Memory: History-Progress-Today-Tomorrow," HTM Workshop, Jun. 2009, twenty-four pages.

Hawkins, J. "Prediction Toolkit Overview," Numenta HTM Workshop, 2009, four pages.

Hawkins, J. et al., "Hierarchical Temporal Memory, Concepts, Theory, and Terminology," Numenta, Jan. 27, 2007, pp. 1-20.

Hawkins, J. et al., "Hierarchical Temporal Memory, Concepts, Theory, and Terminology," Numenta, May 10, 2006, pp. 1-19.

Hawkins, J. et al., "Hierarchical Temporal Memory: Concepts, Theory and Terminology," Numenta, Inc., Mar. 27, 2007, 20 pp.. [Online] [Retrieved on Sep. 22, 2011] Retrieved from the Internet<URL:http://www.numenta.com/htm-overview/education/Numenta_HTM_Concepts.pdf.>.

Hawkins, J. et al., "Hierarchical Temporal Memory: Concepts, Theory and Terminology," Numenta, Mar. 27, 2007, [Online] [Retrieved on Oct. 7, 2008] Retrieved from the Internet<URL:http://www.numenta.com/Numenta_HTM_Concepts.pdf>.

(56) References Cited

OTHER PUBLICATIONS

Hawkins, J. et al., "Hierarchical Temporal Memory: Concepts, Theory and Terminology," Numenta, May 10, 2006, [Online] [Retrieved on Oct. 7, 2008] Retrieved from the Internet<URL:http://www.numenta.com/Numenta_HTM_Concepts.pdf>.
Hawkins, J. et al., "On Intelligence," Sep. 2004, Times Books, Henry Holt and Company, New York, NY 10011.
Hawkins, J. et al., "Sequence Memory for Prediction, Inference and Behaviour," *Philosophical Transactions of the Royal Society B*, Mar. 31, 2009, pp. 1203-1209, vol. 364. [Online] [Retrieved Sep. 22, 2011] Retrieved from the Internet <URL:http://rstb.royalsocietypublishing.org/content/364/1521/1203.full.pdf.>.
Hawkins, J., "Why Can't a Computer Be More Like a Brain?" *IEEE Spectrum*, Apr. 1, 2007, pp. 21-26, vol. 44, No. 4.
Hernandez-Gardiol, N. et al., "Hierarchical Memory-Based Reinforcement Learning," *Proceedings of Neural Information Processing Systems*, 2001, seven pages.
Hinton, G.E. et al., "The "Wake-Sleep" Algorithm for Unsupervised Neural Networks," *Science*, May 26, 1995, pp. 1158-1161, vol. 268.
Hoey, "Hierarchical unsupervised learning of facial expression categories," *IEEE*, 2001, 0-7695-1293-3, pp. 99-106.
"HTM Algorithms," Numenta®, Jun. 2008, Numenta HTM Workshop, Jun. 23-24, 2008, SRI Campus, Menlo Park, CA, 67 pages.
"HTM Optimized Drug Therapy," SDSystem24.com, Numenta HTM Workshop, Jun. 2324, 2008, SRI Campus, Menlo Park, CA 7 pages.
"HTM Workshop, Jumpstart," Numenta®, Jun. 2008, Numenta HTM Workshop, Jun. 23-24, 2008, SRI Campus, Menlo Park, CA, 86 pages.
Hyvarinen, A. et al., "Bubbles: A Unifying Framework for Low-Level Statistical Properties of Natural Image Sequences," *J. Opt. Soc. Am. A.*, 2003, pp. 1237-1252, vol. 20, No. 7.
Isard, M. et al., "ICONDENSATION: Unifying Low-Level and High-Level Tracking in a Stochastic Framework," *Lecture Notes in Computer Science 1406*, 1998, pp. 893-908, Burkhardt, H. et al., ed., Springer-Verlag, Berlin.
Kim, J. et al., "Hierarchical Distributed Genetic Algorithms: A Fuzzy Logic Controller Design Application," *IEEE Expert*, Jun. 1996, pp. 76-84.
Kuenzer, A. et al., "An Empirical Study of Dynamic Bayesian Networks for User Modeling," *Proceedings of the UM 2001 Workshop on Machine Learning*, ten pages.
Lee, T.S. et al., "Hierarchical Bayesian Inference in the Visual Cortex," *J. Opt. Soc. Am. A. Opt. Image. Sci. Vis.*, Jul. 2003, pp. 1434-1448, vol. 20, No. 7.
Lenser, S. et al., "A Modular Hierarchical Behavior-Based Architecture," *RoboCup 2001, LNAI* 2377, 2002, pp. 423-428, Birk, A. et al, (eds.), Springer-Verlag, Berlin, Heidelberg.
Levinson, S. et al., "Automatic Language Acquisition for a Mobile Robot," Feb. 2005, Numenta HTM Workshop, Jun. 23-24, 2008, SRI Campus, Menlo Park, CA, twenty-seven pages.
Lewicki, M.S. et al., "Bayesian Unsupervised Learning of Higher Order Structure," *Proceedings of the 1996 Conference in Advances in Neural Information Processing Systems 9*, pp. 529-535.
Lim, "Estimation of Occlusion and Dense Motion Fields in a Bidirectional Bayesian Framework," *IEEE Transactions on Pattern Analysis and Machine Intelligence*, 2002, pp. 712-718, vol. 24, No. 5.
Lo, J. "Unsupervised Hebbian Learning by Recurrent Multilayer Neural Networks for Temporal Hierarchical Pattern Recognition," *Information Sciences and Systems 44th Annual Conference on Digital Object Identifier*, 2010, pp. 1-6.
Majure, L., "Unsupervised Phoneme Acquisition Using HTM," Jun. 25, 2009, eight pages.
Mannes, C., "A Neural Network Model of Spatio-Temporal Pattern Recognition, Recall and Timing," Technical Report CAS/CNS-92-013, Feb. 1992, Department of Cognitive and Neural Systems, Boston University, USA, seven pages.
Mari, J.-F. et al., "Temporal and Spatial Data Mining with Second-Order Hidden Markov Models," *Soft Computing—A Fusion of Foundations, Methodologies and Applications*, 2006, pp. 406-414, vol. 10, No. 5.

McDowell, C. et al., "SlugGo, a Computer Go Program," Numenta HTM Workshop, Jun. 23-24, 2008, SRI Campus, Menlo Park, CA, eighteen pages.
Miller, J. W. et al., "Biomimetic Sensory Abstraction Using Hierarchical Quilted Self-Organizing Maps," *Society of Photo-Optical Instrumentation Engineers*, 2006, eleven pages.
Mishkin, M. et al., "Hierarchical Organization of Cognitive Memory," *Phil. Trans. R. Soc. B.*, 1997, pp. 1461-1467, London.
Mitrovic, A., "An Intelligent SQL Tutor on the Web," International Journal of Artificial Intelligence in Education, 2003, pp. 171-195, vol. 13.
Muckli, L., "Predictive Coding in Apparent Motion," University of Glasgow, Numenta HTM Workshop, Jun. 25 2009, twelve pages.
Murphy, K. et al., "Using the Forest to See the Trees: A Graphical Model Relating Features, Objects and Scenes,"*Advances in Neural Processing System*, 2004, vol. 16, eight pages.
Murray, S.O. et al., "Shaper Perception Reduces Activity in Human Primary Visual Cortex," *Proceedings of the Nat. Acad. of Sciences of the USA*, Nov. 2002, pp. 15164-151169, vol. 99, No. 23.
Nair, D. et al., "Bayesian Recognition of Targets by Parts in Second Generation Forward Looking Infrared Images," *Image and Vision Computing*, 2000, pp. 849-864, vol. 18.
Namphol, A. et al., "Image Compression with a Hierarchical Neural Network," *IEEE transactions on Aerospace and Electronic Systems*, Jan. 1996, pp. 326-338, vol. 32, No. 1.
Naphade, M. et al., "A Probabilistic Framework for Semantic Video Indexing, Filtering, and Retrieval," *IEEE Transactions on Multimedia*, Mar. 2001, pp. 141-151, vol. 3, No. 1.
Niemasik, J. "Vision Toolkit," Numenta HTM Workshop, 2009, twenty-eight pages.
Numenta, Inc., "Business Strategy," Numenta HTM Workshop, 2009, fifteen pages.
Numenta, Inc., "Hierarchical Temporal Memory including HTM Cortical Learning Algorithms, Version 0.2.1," Sep. 12, 2011, sixty-eight pages. [Online] [Retrieved Sep. 22, 2011] Retrieved from the Internet <URL:http://www.numenta.com/htm-overview/education/HTM_CorticalLearningAlgorithms.pdf.>.
Numenta, Inc., "Hierarchical Temporal Memory: Comparison with Existing Models, Version 1.01," Mar. 1, 2007, four pages.
Numenta, Inc., "HTM Algorithms," Jun. 2008, Numenta HTM Workshop, Jun. 23-24, 2008, SRI Campus, Menlo Park, CA, sixty-seven pages.
Numenta, Inc., "HTM Workshop, Jumpstart," Jun. 2008, Numenta HTM Workshop, Jun. 23-24, 2008, SRI Campus, Menlo Park, CA, eighty-six pages.
Numenta, Inc., "Numenta Node Algorithms Guide NuPIC 1.6," Numenta, Jul. 22, 2008, pp. 1-7.
Numenta, Inc., "Numenta Node Algorithms Guide NuPIC 1.6," Numenta, Jun. 13, 2008, pp. 1-6.
Numenta, Inc., "Numenta Platform for Intelligent Computing: Programmer's Guide Version 1.0," Mar. 2007, seventy-seven pages.
Numenta, Inc., "NuPIC Update," Numenta HTM Workshop, 2009, twenty-four pages.
Numenta, Inc., "Problem Solving with HTMs," Jun. 2008, Numenta HTM Workshop, Jun. 23-24, 2008, SRI Campus, Menlo Park, CA, twenty-three pages.
Numenta, Inc., "Prototype to Demonstrate Automated Insect Detection and Discrimination," Numenta HTM Workshop, 2009, four pages.
Numenta, Inc., "Smart Music: Combining Musical Expectations with Algorithmic Composition," Numenta HTM Workshop, 2009, seven pages.
Numenta, Inc., "Technical Keynote," Numenta HTM Workshop, 2009, seventy-two pages.
Numenta, Inc., "Temporal Model Characteristics," Numenta HTM Workshop, 2009, fourteen pages.
Numenta, Inc., "Vision Framework," Jun. 2008, Numenta HTM Workshop, Jun. 23-24, 2008, SRI Campus, Menlo Park, CA, thirty-six pages.
Numenta, Inc., "What Have We Worked on Since the 2008 Workshop? Customer Applications Presentation," Numenta HTM Workshop, 2009, thirty-five pages.

(56) References Cited

OTHER PUBLICATIONS

Numenta, Inc., "Zeta 1 Algorithms Reference, Version 1.0," Mar. 1, 2007, thirty-seven pages.
Numenta, Inc., "Zeta1 Algorithms Reference, Version 1.2," Numenta Inc., Jun. 8, 2007, pp. 1-38.
Numenta, Inc., "Zeta1 Algorithms Reference, Version 1.3," Numenta Inc., Aug. 22, 2007, pp. 1-41.
Numenta, Inc., "Zeta1 Algorithms Reference, Version 1.5," Numenta Inc., Aug. 24, 2007, pp. 1-45.
Olshausen, B.A. et al., "A Neurobiological Model of Visual Attention and Invariant Pattern Recognition Based on Dynamic Routing Information," *Journal of Neuroscience*, Nov. 1993, pp. 4700-4719, vol. 13, No. 11.
Park, S. et al., "Recognition of Two-person Interactions Using a Hierarchical Bayesian Network," *ACM Sigmm International Workshop on Video Surveillance (IWVS)* 2003, pp. 65-76, Berkeley, USA.
PCT International Search Report and Written Opinion, PCT Application No. PCT/US2005/044729, May 14, 2007, twelve pages.
PCT International Search Report and Written Opinion, PCT Application No. PCT/US2007/003544, Jun. 16, 2008, ten pages.
PCT International Search Report and Written Opinion, PCT Application No. PCT/US07/85661, Jun. 13, 2008, six pages.
PCT International Search Report and Written Opinion, PCT Application No. PCT/US08/55389, Jul. 25, 2008, seven pages.
PCT International Search Report and Written Opinion, PCT Application No. PCT/US08/55352, Aug. 1, 2008, seven pages.
PCT International Search Report and Written Opinion, PCT Application No. PCT/US2008/054631, Aug. 18, 2008, twelve pages.
PCT International Search Report and Written Opinion, PCT Application No. PCT/US2008/068435, Oct. 31, 2008, eleven pages.
PCT International Search Report and Written Opinion, PCT Application No. PCT/US2009/035193, Apr. 22, 2009, eleven pages.
PCT International Search Report and Written Opinion, PCT Application No. PCT/US2011/028231, May 19, 2011, nine pages.
PCT International Search Report and Written Opinion, PCT Application No. PCT/US2009/047250, Sep. 25, 2009, twelve pages.
PCT International Search Report and Written Opinion, PCT Application No. PCT/US2008/080347, Dec. 10, 2008, six pages.
Pearl, J., "Probabilistic Reasoning in Intelligent Systems: Networks of Plausible Inference," 1988, pp. 143-223, Morgan Kaufmann Publishers, Inc.
Poppel, E., "A Hierarchical Model of Temporal Perception," *Trends in Cognitive Sciences*, May 1997, pp. 56-61, vol. 1, No. 2.
"Problem Solving with HTMs," Numenta®, Jun. 2008, Numenta HTM Workshop, Jun. 23-24, 2008, SRI Campus, Menlo Park, CA, 23 pages.
Rao, R. et al., "Predictive Coding in the Visual Cortex: A Functional Interpretation of Some Extra-classical Receptive-field Effects," *Nature Neuroscience*, Jan. 1999, pp. 79-87, vol. 2, No. 1.
Riesenhuber, M. et al., "Hierarchical Models of Object Recognition in Cortex," *Nature Neuroscience*, Nov. 1999, pp. 1019-1025, vol. 2, No. 11.
Rojas, R., "Neural Networks, A Systematic Approach," Springer-Verlag, 1996, pp. 20-21, 110-112 and 311-319.
Ross, L., "Discovering and Using Patterns in Plant Floor Data," Numenta HTM Workshop, Jun. 23-24, 2008, SRI Campus, Menlo Park, CA, twelve pages.
Saphir, B. "Numenta Web Services," Numenta HTM Workshop, 2009, twenty pages.
Saphir, B., "Power NuPIC Part II, How to Create a New Node Type," Numenta, Jun. 2008, Numenta HTM Workshop, Jun. 23-24, 2008, SRI Campus, Menlo Park, CA, thirty-two pages.
SDSYSTEM24.COM, "HTM Optimized Drug Therapy," Numenta HTM Workshop, Jun. 23-24, 2008, SRI Campus, Menlo Park, CA, seven pages.
Sinha, P. et al., "Recovering Reflectance and Illumination in a World of Painted Polyhedra," *Fourth International Conference on Computer Vision*, Berlin, May 11-14, 1993, pp. 156-163, IEEE Computer Society Press, Los Alamitos, CA.
Spence, C. et al., "Varying Complexity in Tree-Structured Image Distribution Models," *IEEE Transactions on Image Processing*, Feb. 2006, pp. 319-330, vol. 15, No. 2.
Starzyk, J.A. et al., "Spatio-Temporal Memories for Machine Learning: A Long-Term Memory Organization," *IEEE Transactions on Neural Networks*, May 2009, pp. 768-780, vol. 20, No. 5.
Stringer, S.M. et al., "Invariant Object Recognition in the Visual System with Novel Views of 3D Objects," *Neural Computation*, Nov. 2002, pp. 2585-2596, vol. 14, No. 11.
Sudderth, E.B. et al., "Nonparametric Belief Propagation and Facial Appearance Estimation," AI Memo 2002-020, Dec. 2002, Artificial Intelligence Laboratory, Massachusetts Institute of Technology, Cambridge, MA, USA, eleven pages.
Thomson, A.M. et al., "Interlaminar Connections in the Neocortex," Cerebral Cortex, 2003, pp. 5-14, vol. 13, No. 1.
Thornton, J. et al., "Robust Character Recognition Using a Hierarchical Bayesian Network," *Proceedings of the 19th Australian Joint Conference on Artifical Intelligence*, 2006, pp. 1259-1264.
Tsinarakis, G.J. et al. "Modular Petri Net Based Modeling, Analysis and Synthesis of Dedicated Production Systems," *Proceedings of the 2003 IEEE International Conference on Robotics and Automation*, Sep. 14-19, 2003, pp. 3559-3564, Taipei, Taiwan.
Tsinarakis, G.J. et al. "Modular Petri Net Based Modeling, Analysis, Synthesis and Performance Evaluation of Random Topology Dedicated Production Systems," *Journal of Intelligent Manufacturing*, 2005, vol. 16, pp. 67-92.
Tsukada, M, "A Theoretical Model of the Hippocampal-Cortical Memory System Motivated by Physiological Functions in the Hippocampus", *Proceedings of the 1993 International Joint Conference on Neural Networks*, Oct. 25, 1993, pp. 1120-1123, vol. 2.
U.S. Office Action, U.S. Appl. No. 11/010,243, Jul. 12, 2007, twelve pages.
U.S. Office Action, U.S. Appl. No. 11/147,069, Jan. 9, 2007, twenty-seven pages.
U.S. Office Action, U.S. Appl. No. 11/147,069, Jul. 29, 2009, forty-three pages.
U.S. Office Action, U.S. Appl. No. 11/147,069, Jan. 9, 2009, thirty-eight pages.
U.S. Office Action, U.S. Appl. No. 11/147,069, May 15, 2008, thirty-seven pages.
U.S. Office Action, U.S. Appl. No. 11/147,069, May 29, 2007, thirty-six pages.
U.S. Office Action, U.S. Appl. No. 11/147,069, Oct. 30, 2007, thirty-four pages.
U.S. Office Action, U.S. Appl. No. 11/351,437, Aug. 23, 2007, sixteen pages.
U.S. Office Action, U.S. Appl. No. 11/351,437, Feb. 20, 2008, six pages.
U.S. Office Action, U.S. Appl. No. 11/622,447, May 28, 2008, eighteen pages.
U.S. Office Action, U.S. Appl. No. 11/622,448, Apr. 30, 2008, seventeen pages.
U.S. Office Action, U.S. Appl. No. 11/622,448, Aug. 24, 2007, nineteen pages.
U.S. Office Action, U.S. Appl. No. 11/622,454, Jun. 3, 2008, thirteen pages.
U.S. Office Action, U.S. Appl. No. 11/622,454, Mar. 30, 2009, eleven pages.
U.S. Office Action, U.S. Appl. No. 11/622,455, Apr. 21, 2010, twelve pages.
U.S. Office Action, U.S. Appl. No. 11/622,456, Mar. 20, 2009, nine pages.
U.S. Office Action, U.S. Appl. No. 11/622,456, May 7, 2008, fourteen pages.
U.S. Office Action, U.S. Appl. No. 11/622,456, Nov. 6, 2008, seven pages.
U.S. Office Action, U.S. Appl. No. 11/622,457, Apr. 21, 2009, six pages.
U.S. Office Action, U.S. Appl. No. 11/622,457, Aug. 24, 2007, ten pages.
U.S. Office Action, U.S. Appl. No. 11/622,457, May 6, 2008, fourteen pages.

(56) References Cited

OTHER PUBLICATIONS

U.S. Office Action, U.S. Appl. No. 11/622,457, Nov. 20, 2008, eight pages.
U.S. Office Action, U.S. Appl. No. 11/622,458, Apr. 1, 2010, sixteen pages.
U.S. Office Action, U.S. Appl. No. 11/680,197, Mar. 23, 2010, twelve pages.
U.S. Office Action, U.S. Appl. No. 11/680,197, Sep. 14, 2010, seventeen pages.
U.S. Office Action, U.S. Appl. No. 11/713,157, Mar. 31, 2010, fourteen pages.
U.S. Office Action, U.S. Appl. No. 11/945,919, Sep. 7, 2010, nineteen pages.
U.S. Office Action, U.S. Appl. No. 12/029,434, Mar. 28, 2011, twenty-four pages.
U.S. Office Action, U.S. Appl. No. 12/029,434, Nov. 8, 2011, thirty-six pages.
U.S. Office Action, U.S. Appl. No. 12/039,630, Nov. 24, 2010, ten pages.
U.S. Office Action, U.S. Appl. No. 12/039,652, Mar. 29, 2011, fifteen pages.
U.S. Office Action, U.S. Appl. No. 12/040,849, Feb. 3, 2011, thirteen pages.
U.S. Office Action, U.S. Appl. No. 12/040,849, Jul. 1, 2011, eighteen pages.
U.S. Office Action, U.S. Appl. No. 12/147,348, Oct. 11, 2011, forty-three pages.
U.S. Office Action, U.S. Appl. No. 12/288,185, Sep. 15, 2010, eleven pages.
U.S. Office Action, U.S. Appl. No. 12/751,808, Oct. 28, 2010, thirteen pages.
U.S. Office Action, U.S. Appl. No. 13/151,928, Aug. 2, 2011, eight pages.
U.S. Office Action, U.S. Appl. No. 13/218,194, Oct. 5, 2012, fourteen pages.
U.S. Office Action, U.S. Appl. No. 13/227,355, May 25, 2012, twenty-four pages.
U.S. Office Action, U.S. Appl. No. 13/333,865, May 16, 2012, twenty-four pages.
U.S. Office Action, U.S. Appl. No. 12/483,642, Aug. 10, 2012, seven pages.
U.S. Office Action, U.S. Appl. No. 12/483,642, Apr. 26, 2012, twelve pages.
U.S. Appl. No. 13/218,170, filed Aug. 25, 2011 (copy not enclosed).
U.S. Appl. No. 13/218,194, filed Aug. 25, 2011 (copy not enclosed).
U.S. Appl. No. 13/218,202, filed Aug. 25, 2011 (copy not enclosed).
U.S. Appl. No. 13/227,355, filed Sep. 7, 2011 (copy not enclosed).
U.S. Appl. No. 13/333,865, filed Dec. 21, 2011 (copy not enclosed).
U.S. Appl. No. 13/604,543, Sep. 5, 2012 (copy not enclosed).
U.S. Appl. No. 12/029434, filed Feb. 11, 2008 (copy not enclosed).
Van Essen, D.C. et al., "Information Processing Strategies and Pathways in the Primate Visual System," *An Introduction to Neural and Electronic Networks*, 1995, pp. 45-76.
Vaught, T.N., "Software Design in Scientific Computing," Jun. 23, 2008, Numenta HTM Workshop, Jun. 23-24, 2008, SRI Campus, Menlo Park, CA, thirty-two pages.
"Vision Framework," Numenta®, Jun. 2008, Numenta HTM Workshop, Jun. 23-24, 2008, SRI Campus, Menlo Park, CA 36 pages.
Vlajic, "Vector Quantization of Images Using Modified Adaptive Resonance Algorithm for Hierarchical Clustering," *IEEE Transactions on Neural Networks*, 2001, pp. 1147-1162, vol. 12, No. 5.
Weiss, R. et al., "HyPursuit: A Hierarchical Network Search Engine that Exploits Content-Link Hypertext Clustering," *Proceedings of the Seventh Annual ACM Conference on Hypertext*, Mar. 16-20, 1996, pp. 180-193, Washington, D.C., USA.
Wiskott, L. et al., "Slow Feature Analysis: Unsupervised Learning of Invariances," *Neural Computation*, 2002, pp. 715-770, vol. 14, No. 4.
Wu, G. et al., "Multi-camera Spatio-temporal Fusion and Biased Sequence-data Learning for Security Surveillance," *Association for Computing Machinery*, 2003, pp. 528-538.
Ye Di Dia, J.S. et al., "Understanding Belief Propagation and its Generalizations," *Joint Conference on Artificial Intelligence (IJCAI 2001)*, Aug. 4-10, 2001, Seattle, WA, USA, thirty-five pages.
Zemel, R.S., "Cortical Belief Networks," *Computational Models for Neuroscience*, 2003, pp. 267-287, Hecht-Nielsen, R. et al., eds., Springer-Verlag, New York.
U.S. Patent Office, Final Office Action, U.S. Appl. No. 13/227,355, Dec. 19, 2012, twenty-five pages.
U.S. Patent Office, Non-final Office Action, U.S. Appl. No. 12/052,580, Dec. 21, 2012, twenty-three pages.

* cited by examiner

|  | I=1 | I=2 | I=3 | I=4 |
|---|---|---|---|---|
| S= S1 = y4y2y3 |  |  |  | ■ |
| S= S2 = y1y2y1 |  |  |  | ■ |
| S= S3 = y3y1 |  |  | ■ | ■ |
| S= S4 = y2y2y1y4 |  |  |  |  |

FIGURE 7A

$\Gamma_{t-1}(S, I)$

|  | I=1 | I=2 | I=3 | I=4 |
|---|---|---|---|---|
| S= S1 = y4y2y3 |  | ▓ |  | ■ |
| S= S2 = y1y2y1 |  |  |  | ■ |
| S= S3 = y3y1 |  |  | ■ | ■ |
| S= S4 = y2y2y1y4 | ▓ |  |  |  |

$\Gamma_t(S, I)$

|  | I=1 | I=2 | I=3 | I=4 |
|---|---|---|---|---|
| S= S1 = y4y2y3 |  |  |  | ■ |
| S= S2 = y1y2y1 | ▓ |  | ▓ | ■ |
| S= S3 = y3y1 |  | ▓ | ■ | ■ |
| S= S4 = y2y2y1y4 |  |  | ▓ |  |

FIGURE 7B

$\Gamma_{t-1}(S, I)$

|  | I=1 | I=2 | I=3 | I=4 |
|---|---|---|---|---|
| S= S1 = y4y2y3 |  | ▓ |  | ■ |
| S= S2 = y1y2y1 |  |  |  | ■ |
| S= S3 = y3y1 |  |  | ■ | ■ |
| S= S4 = y2y2y1y4 | ▓ |  |  |  |

$\Gamma_t(S, I)$

|  | I=1 | I=2 | I=3 | I=4 |
|---|---|---|---|---|
| S= S1 = y4y2y3 |  |  |  | ■ |
| S= S2 = y1y2y1 | ▓ |  | ▓ | ■ |
| S= S3 = y3y1 |  | ▓ | ■ | ■ |
| S= S4 = y2y2y1y4 |  |  | ▓ |  |

FIGURE 7C

$\Gamma_{t-1}(S, I)$

| | I=1 | I=2 | I=3 | I=4 |
|---|---|---|---|---|
| S= S1 = y4y2y3 | | | | |
| S= S2 = y1y2y1 | | | | |
| S= S3 = y3y1 | | | | |
| S= S4 = y2y2y1y4 | | | | |

$\Gamma_t(S, I)$

| | I=1 | I=2 | I=3 | I=4 |
|---|---|---|---|---|
| S= S1 = y4y2y3 | | | | |
| S= S2 = y1y2y1 | | | | |
| S= S3 = y3y1 | | | | |
| S= S4 = y2y2y1y4 | | | | |

FIGURE 7D

$\Gamma_{t-1}(S, I)$

| | I=1 | I=2 | I=3 | I=4 |
|---|---|---|---|---|
| S= S1 = y4y2y3 | | | | |
| S= S2 = y1y2y1 | | | | |
| S= S3 = y3y1 | | | | |
| S= S4 = y2y2y1y4 | | | | |

$\Gamma_t(S, I)$

| | I=1 | I=2 | I=3 | I=4 |
|---|---|---|---|---|
| S= S1 = y4y2y3 | | | | |
| S= S2 = y1y2y1 | | | | |
| S= S3 = y3y1 | | | | |
| S= S4 = y2y2y1y4 | | | | |

FIGURE 7E

|  | I=1 | I=2 | I=3 | I=4 |
|---|---|---|---|---|
| S= S1 = y4y2y3 |  |  |  |  |
| S= S2 = y1y2y1 |  |  |  |  |
| S= S3 = y3y1 |  |  |  |  |
| S= S4 = y2y2y1y4 |  |  |  |  |

FIGURE 9

006D
SEQUENCE LEARNING IN A HIERARCHICAL TEMPORAL MEMORY BASED SYSTEM

CROSS-REFERENCE TO RELATED APPLICATIONS

This application is a continuation under 35 U.S.C. §120 of co-pending U.S. patent application Ser. No. 12/576,966, entitled "Sequence Learning in a Hierarchical Temporal Memory Based System," filed on Oct. 9, 2009, which is a continuation of U.S. patent application Ser. No. 11/622,454, entitled "Sequence Learning in a Hierarchical Temporal Memory Based System," filed on Jan. 11, 2007 (now issued as U.S. Pat. No. 7,620,608), which is a continuation of U.S. patent application Ser. No. 11/351,437, entitled "Architecture of a Hierarchical Temporal Memory Based System," filed on Feb. 10, 2006 (now abandoned) and claims priority under 35 U.S.C. §119(e) to U.S. Provisional Patent Application No. 60/771,990, entitled "Hierarchical Temporal Memory," filed on Feb. 10, 2006, which are incorporated by reference herein in their entirety. Further, the present application contains subject matter that may be related to U.S. patent application Ser. No. 11/010,243, entitled "Methods, Architecture, and Apparatus for Implementing Machine Intelligence and Hierarchical Memory Systems," filed on Dec. 10, 2004; and U.S. patent application Ser. No. 11/147,069, entitled "Trainable Hierarchical Memory System and Method," filed on Jun. 6, 2005, which are incorporated by reference in their entirety.

BACKGROUND

Generally, a "machine" is a system or device that performs or assists in the performance of at least one task. Completing a task often requires the machine to collect, process, and/or output information, possibly in the form of work. For example, a vehicle may have a machine (e.g., a computer) that is designed to continuously collect data from a particular part of the vehicle and responsively notify the driver in case of detected adverse vehicle or driving conditions. However, such a machine is not "intelligent" in that it is designed to operate according to a strict set of rules and instructions predefined in the machine. In other words, a non-intelligent machine is designed to operate deterministically; should, for example, the machine receive an input that is outside the set of inputs it is designed to recognize, the machine is likely to, if at all, generate an output or perform work in a manner that is not helpfully responsive to the novel input.

In an attempt to greatly expand the range of tasks performable by machines, designers have endeavored to build machines that are "intelligent," i.e., more human- or brain-like in the way they operate and perform tasks, regardless of whether the results of the tasks are tangible. This objective of designing and building intelligent machines necessarily requires that such machines be able to "learn" and, in some cases, is predicated on a believed structure and operation of the human brain. "Machine learning" refers to the ability of a machine to autonomously infer and continuously self-improve through experience, analytical observation, and/or other means.

Machine learning has generally been thought of and attempted to be implemented in one of two contexts: artificial intelligence and neural networks. Artificial intelligence, at least conventionally, is not concerned with the workings of the human brain and is instead dependent on algorithmic solutions (e.g., a computer program) to replicate particular human acts and/or behaviors. A machine designed according to conventional artificial intelligence principles may be, for example, one that through programming is able to consider all possible moves and effects thereof in a game of chess between itself and a human.

Neural networks attempt to mimic certain human brain behavior by using individual processing elements that are interconnected by adjustable connections. The individual processing elements in a neural network are intended to represent neurons in the human brain, and the connections in the neural network are intended to represent synapses between the neurons. Each individual processing element has a transfer function, typically non-linear, that generates an output value based on the input values applied to the individual processing element. Initially, a neural network is "trained" with a known set of inputs and associated outputs. Such training builds and associates strengths with connections between the individual processing elements of the neural network. Once trained, a neural network presented with a novel input set may generate an appropriate output based on the connection characteristics of the neural network.

SUMMARY

According to at least one aspect of one or more embodiments of the present invention, a system includes a hierarchy of computing modules configured to learn a cause of input data sensed over space and time, where the hierarchy is further configured to determine a cause of novel sensed input data dependent on the learned cause, and where at least one of the computing modules has a sequence learner module configured to associate sequences of input data received by the computing module to a set of causes previously learned in the hierarchy.

According to at least one other aspect of one or more embodiments of the present invention, a computer-implemented method includes: inputting spatial patterns in sensed input data, where spatial patterns received over time represent sequences; identifying received sequences that occur frequently according to a predetermined statistical threshold; and outputting a distribution representing probabilities of the statistically frequent sequences being a cause of the sensed input data, where the distribution is generated over a set of previously learned causes.

According to at least one other aspect of one or more embodiments of the present invention, a computer-readable medium has instructions stored therein that are executable on a processor to: input spatial patterns in sensed input data, where spatial patterns received over time represent sequences; identify received sequences that occur frequently according to a predetermined statistical threshold; and output a distribution representing probabilities of the statistically frequent sequences being a cause of the sensed input data, where the distribution is generated over a set of previously learned causes.

The features and advantages described herein are not all inclusive, and, in particular, many additional features and advantages will be apparent to those skilled in the art in view of the following description. Moreover, it should be noted that the language used herein has been principally selected for readability and instructional purposes and may not have been selected to circumscribe the present invention.

BRIEF DESCRIPTION OF DRAWINGS

FIGS. 7A-7E show representations in accordance with an embodiment of the present invention.

FIG. 9 shows a representation in accordance with an embodiment of the present invention.

Each of the figures referenced above depict an embodiment of the present invention for purposes of illustration only. Those skilled in the art will readily recognize from the following description that one or more other embodiments of the structures, methods, and systems illustrated herein may be used without departing from the principles of the present invention.

DETAILED DESCRIPTION

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description.

Humans understand and perceive the world in which they live as a collection—or more specifically, a hierarchy—of objects. An "object" is at least partially defined as having some persistent structure over space and/or time. For example, an object may be a car, a person, a building, an idea, a word, a song, or information flowing in a network.

Figure 1:
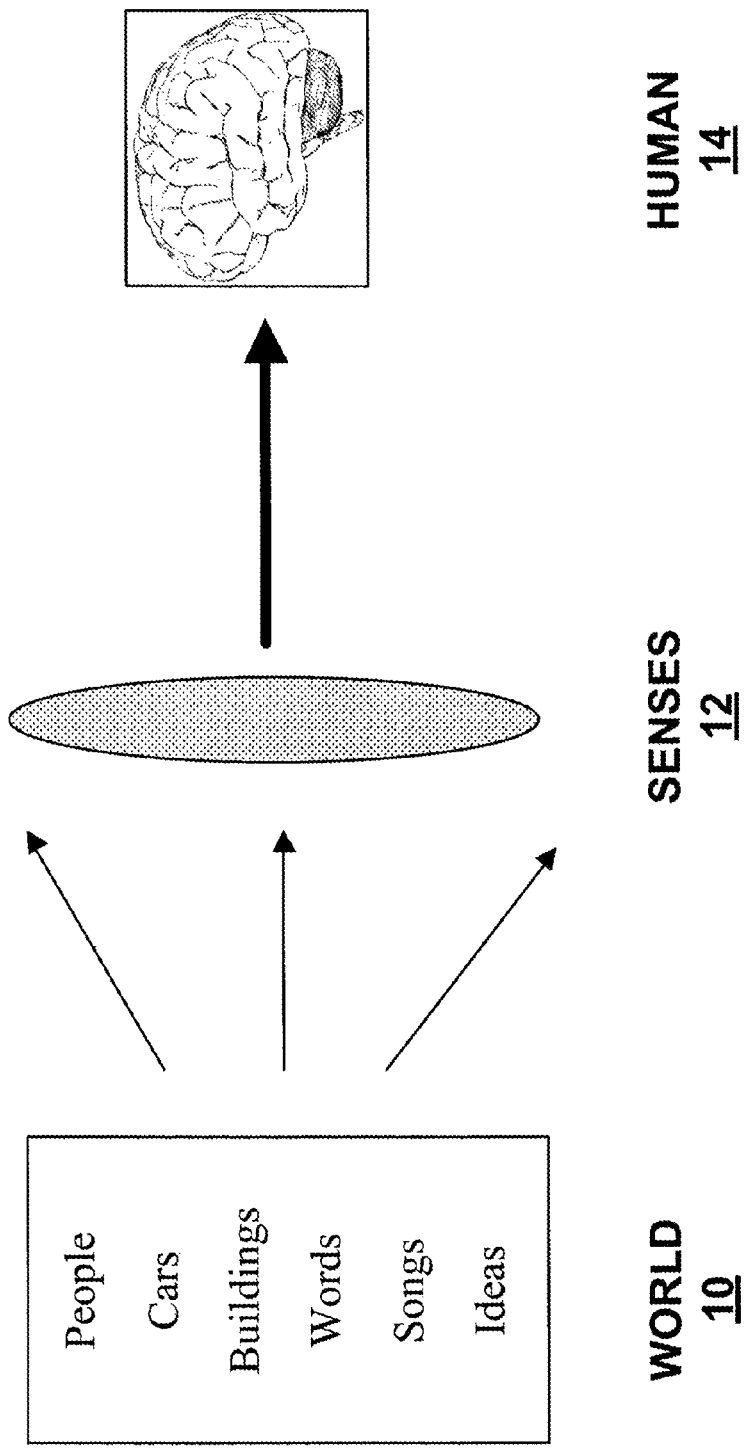
FIG. 1 shows a flow of data between an object and a human.

Moreover, referring to FIG. 1, an object in the world 10 may also be referred to as a "cause" in that the object causes particular data to be sensed, via senses 12, by a human 14. For example, the smell (sensed input data) of a rose (object/cause) results in the recognition/perception of the rose. In another example, the image (sensed input data) of a dog (object/cause) falling upon a human eye results in the recognition/perception of the dog. Even as sensed input data caused by an object change over space and time, humans want to stably perceive the object because the cause of the changing sensed input data, i.e., the object itself, is unchanging. For example, the image (sensed input data) of a dog (object/cause) falling upon the human eye may change with changing light conditions and/or as the human moves; yet, however, the human is able to form and maintain a stable perception of the dog.

In embodiments of the present invention, learning causes and associating novel input with learned causes are achieved using what may be referred to as a "hierarchical temporal memory" (HTM). An HTM is a hierarchical network of interconnected nodes that individually and collectively (i) learn, over space and time, one or more causes of sensed input data and (ii) determine, dependent on learned causes, likely causes of novel sensed input data. HTMs, in accordance with one or more embodiments of the present invention, are further described below with reference to FIGS. 2-27.

HTM Structure

Figure 2:
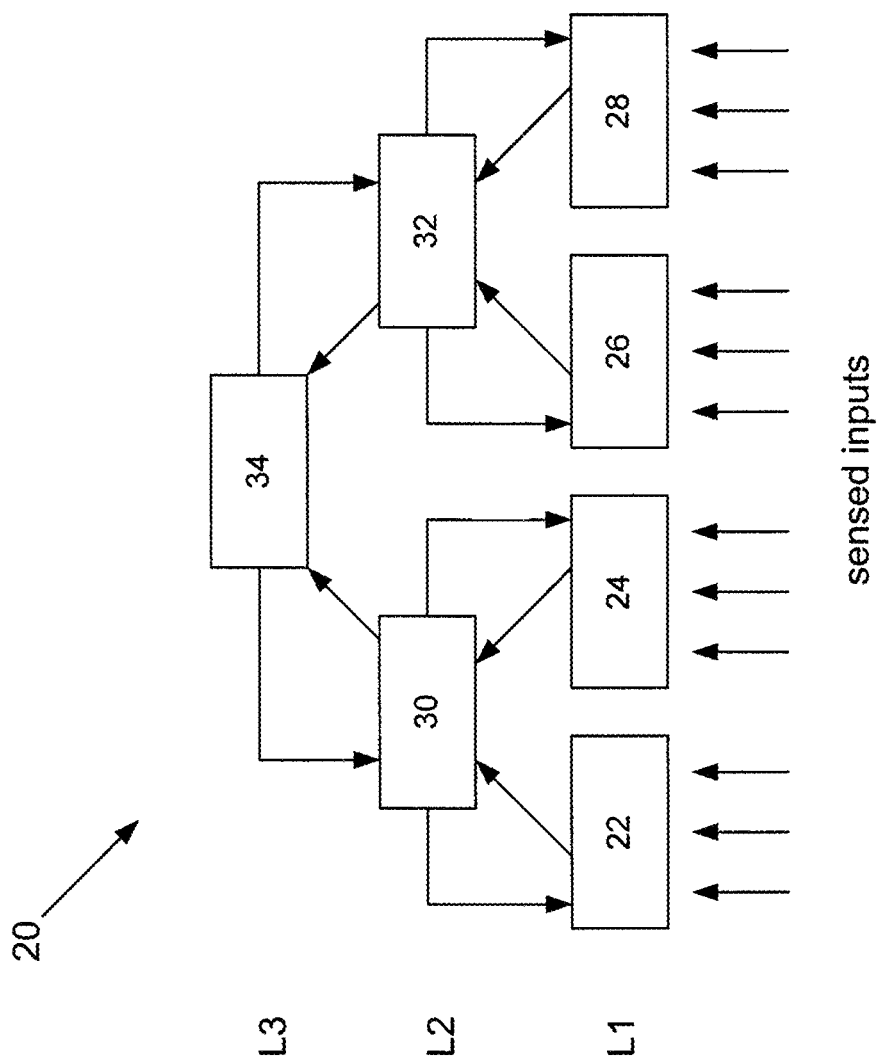
FIG. 2 shows an HTM in accordance with an embodiment of the present invention.

An HTM has several levels of nodes. For example, as shown in FIG. 2, HTM 20 has three levels L1, L2, L3, with level L1 being the lowest level, level L3 being the highest level, and level L2 being between levels L1 and L3. Level L1 has nodes 22, 24, 26, 28; level L2 has nodes 30, 32, and level L3 has node 34. The nodes 22, 24, 26, 28, 30, 32, 34 are hierarchically connected in a tree-like structure such that each node may have several children nodes (i.e., nodes connected at a lower level) and one parent node (i.e., node connected at a higher level). Each node 22, 24, 26, 28, 30, 32, 34 may have or be associated with a capacity to store and process information. For example, each node 22, 24, 26, 28, 30, 32, 34 may store sensed input data (e.g., sequences of patterns) associated with particular causes. Further, each node 22, 24, 26, 28, 30, 32, 34 may be arranged to (i) propagate information "forward" (i.e., "up" an HTM hierarchy) to any connected parent node and/or (ii) propagate information "back" (i.e., "down an HTM hierarchy) to any connected children nodes.

Inputs to the HTM 20 from, for example, a sensory system, are supplied to the level L1 nodes 22, 24, 26, 28. A sensory system through which sensed input data is supplied to level L1 nodes 22, 24, 26, 28 may relate to commonly thought-of human senses (e.g., touch, sight, sound) or other human or non-human senses.

The range of sensed input data that each of the level L1 nodes 22, 24, 26, 28 is arranged to receive is a subset of an entire input space. For example, if an 8×8 image represents an entire input space, each level L1 node 22, 24, 26, 28 may receive sensed input data from a particular 4×4 section of the 8×8 image. Each level L2 node 30, 32, by being a parent of more than one level L1 node 22, 24, 26, 28, covers more of the entire input space than does each individual level L1 node 22,

24, 26, 28. It follows that in FIG. 2, the level L3 node 34 covers the entire input space by receiving, in some form, the sensed input data received by all of the level L1 nodes 22, 24, 26, 28. Moreover, in one or more embodiments of the present invention, the ranges of sensed input data received by two or more nodes 22, 24, 26, 28, 30, 32, 34 may overlap.

While HTM 20 in FIG. 2 is shown and described as having three levels, an HTM in accordance with one or more embodiments of the present invention may have any number of levels. Moreover, the hierarchical structure of an HTM may be different than that shown in FIG. 2. For example, an HTM may be structured such that one or more parent nodes have three children nodes as opposed to two children nodes like that shown in FIG. 2. Further, in one or more embodiments of the present invention, an HTM may be structured such that a parent node in one level of the HTM has a different number of children nodes than a parent node in the same or another level of the HTM. Further, in one or more embodiments of the present invention, an HTM may be structured such that a parent node receives input from children nodes in multiple levels of the HTM. In general, those skilled in the art will note that there are various and numerous ways to structure an HTM other than as shown in FIG. 2.

Any entity that uses or is otherwise dependent on an HTM as, for example, described above with reference to FIG. 2 and below with reference to FIGS. 3-27, may be referred to as an "HTM-based" system. Thus, for example, an HTM-based system may be a machine that uses an HTM, either implemented in hardware or software, in performing or assisting in the performance of a task.

Learning Causes

In embodiments of the present invention, an HTM discovers one or more causes in its world from sensory input data received by the HTM. In other words, an HTM does not necessarily have a sense particular to each of the types of causes being sensed; instead, an HTM may discover from raw sensed input data that causes such as cars and words exist. In such a manner, an HTM is able to learn and form representations of causes existing in its world.

As described above, an "object" has persistent structure. The persistent structure causes persistent patterns to be sensed by an HTM. Each sensed input pattern has a spatial attribute. In other words, each sensed input pattern may be thought of as being represented as a particular set of bits. In general, a node in an HTM "learns," i.e., stores and associates with a common cause, sensed input patterns by determining "coincidences" of sensed input patterns in its input. Determining coincidences of sensed input patterns involves determining which sensed input patterns are active at the same time at a rate statistically greater than what would be expected based on mere chance. For example, if an HTM node having one hundred inputs has seven inputs that become active together at some statistically significant rate, then the HTM node learns the sensed input patterns at those seven inputs.

Further, in one or more embodiments of the present invention, it may not be necessary for an HTM node to learn all sensed input patterns occurring together at some statistically significant rate. Instead, an HTM node may store the x most common sensed input patterns found in its input. These learned sensed input patterns may be referred to as "quantization points" of the HTM node.

In addition to an HTM node learning commonly occurring sensed input patterns as described above, the HTM node learns common sequences of those learned sensed input patterns. A particular sequence of learned sensed input patterns may be learned by recognizing that the sequence occurs at a rate statistically greater than what would be expected based on mere chance. For example, if of fifty sensed input patterns learned by an HTM node, three occur in a particular order at some statistically significant rate, then the HTM node may learn that sequence of sensed input patterns.

Further, in one or more embodiments of the present invention, it may not be necessary for an HTM node to learn all sequences occurring at some statistically significant rate. Instead, an HTM node may store the x most frequent sequences found in its input.

In one or more embodiments of the present invention, the sequences learned by an HTM node may each be represented by a variable. As each learned sequence is associated with a particular cause, each variable accordingly represents a different cause. The HTM node may pass each of its variables up to a parent node via a vector containing probabilities as to the likelihood that each of its learned sequences is active at its input at a given time. The parent node may then (i) determine coincidences of its sensed input patterns (i.e., the variables received from its child node), (ii) learn sensed input patterns as described above, and (iii) learn sequences of learned sensed input patterns (i.e., learn sequences of variables representing sequences learned by its child node).

Sequence Learning

Figure 3:
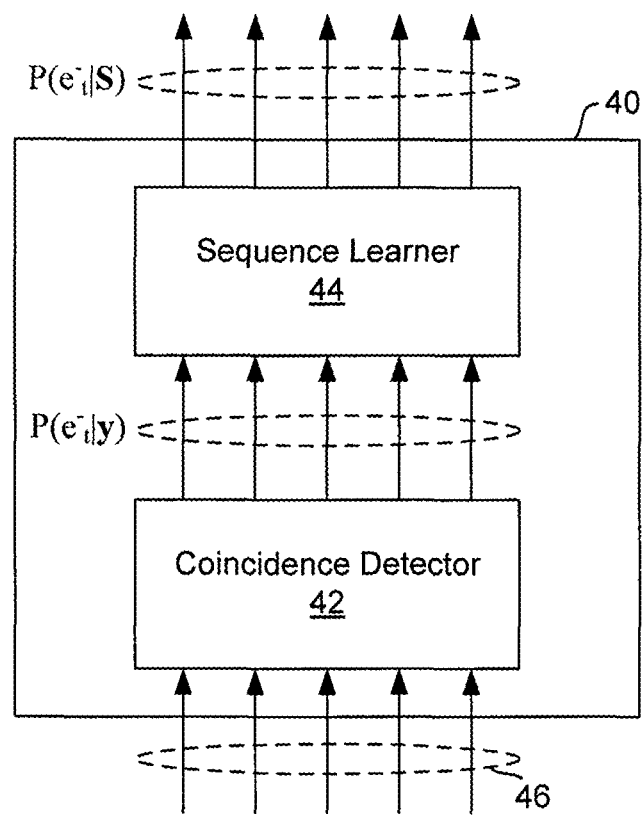
FIG. 3 shows a node in accordance with an embodiment of the present invention.

As described above, sequence learning involves learning frequently occurring sequences of elements and outputting a probability that a given input vector of elements is part of a learned sequence for each of its learned sequences. FIG. 3 shows a node 40 having a sequence learning functionality. The node 40 has a coincidence detector 42 and a sequence learner 44. The coincidence detector 42 receives some input 46. Generally, the coincidence detector 42 identifies coincidences among its input. At each time-step, the coincidence detector 42 outputs a distribution $P(e^-_t|y)$, where $P(e^-_t|y)$ represents the probability of observing $e^-$ (evidence from a lower level) at time t when in state y. The distribution $P(e^-_t|y)$ is a vector in which each entry corresponds to a different y, where y represents some state of a world to which node 40 is exposed. Thus, for example, at time t, the first entry in $P(e^-_t|y)$ is $P(e^-_t|y_1)$, the second entry is $P(e^-_t|y_2)$, and so forth.

Based on the distributions outputted over time by the coincidence detector 42, the sequence learner 44 outputs a distribution $P(e^-_t|S)$, where $P(e^-_t|S)$ represents the probability of observing $e^-$ (evidence from a lower level) at time t over learned sequences S. Thus, each entry in the distribution $P(e^-_t|S)$ corresponds to a different learned sequence $S_i$. In one or more embodiments of the present invention, the learned sequences themselves may not be communicated outside of the sequence learner 44. Further, those skilled in the art will note that the sequence learner 44, has a behavior (i.e., outputting distributions over learned sequences) that may be independent of a type and/or topology of network of which the sequence learner 44 is part.

Figure 4:
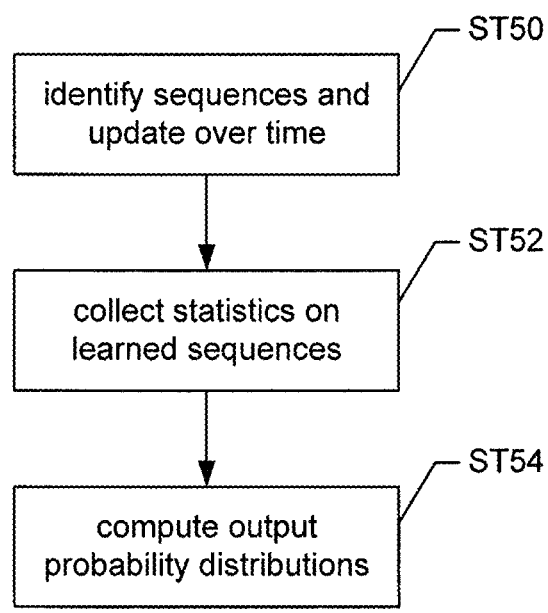
FIG. 4 shows a flow process in accordance with an embodiment of the present invention.

As described above, y represents some state of a world. Those skilled in the art will note that the statistical nature of the world is such that these states are likely to occur in particular sequences over time. As shown in FIG. 4, to learn sequences in its world, a sequence learner (e.g., 44 in FIG. 3) identifies sequences and updates them over time ST50. Further, the sequence learner is arranged to collect statistics on its learned sequences ST52 and then, based on its learned sequences and statistics thereof, compute probability distributions (as described above) ST54.

In one or more embodiments of the present invention, a sequence learner may have a particular number noutputs of outputs. Although the sequence learner may identify more sequences than it has outputs, only noutputs may be represented at the output of the sequence learner. In other words, every sequence identified by the sequence learner may not be uniquely represented at the output of the sequence learner. Thus, it follows that the sequence learner may be arranged to allocate, or "map," its limited number of outputs among a larger number of identified sequences. In one or more embodiments of the present invention, such mapping may be motivated by one or more of the following priorities: desiring frequently occurring sequences; desiring differentiated sequences (in an effort to, for example, not waste outputs on sequences that are substantially similar); and desiring a minimum disruption to the meanings associated with the outputs (in an effort to, for example, enable stable learning at a higher level).

Figure 5:
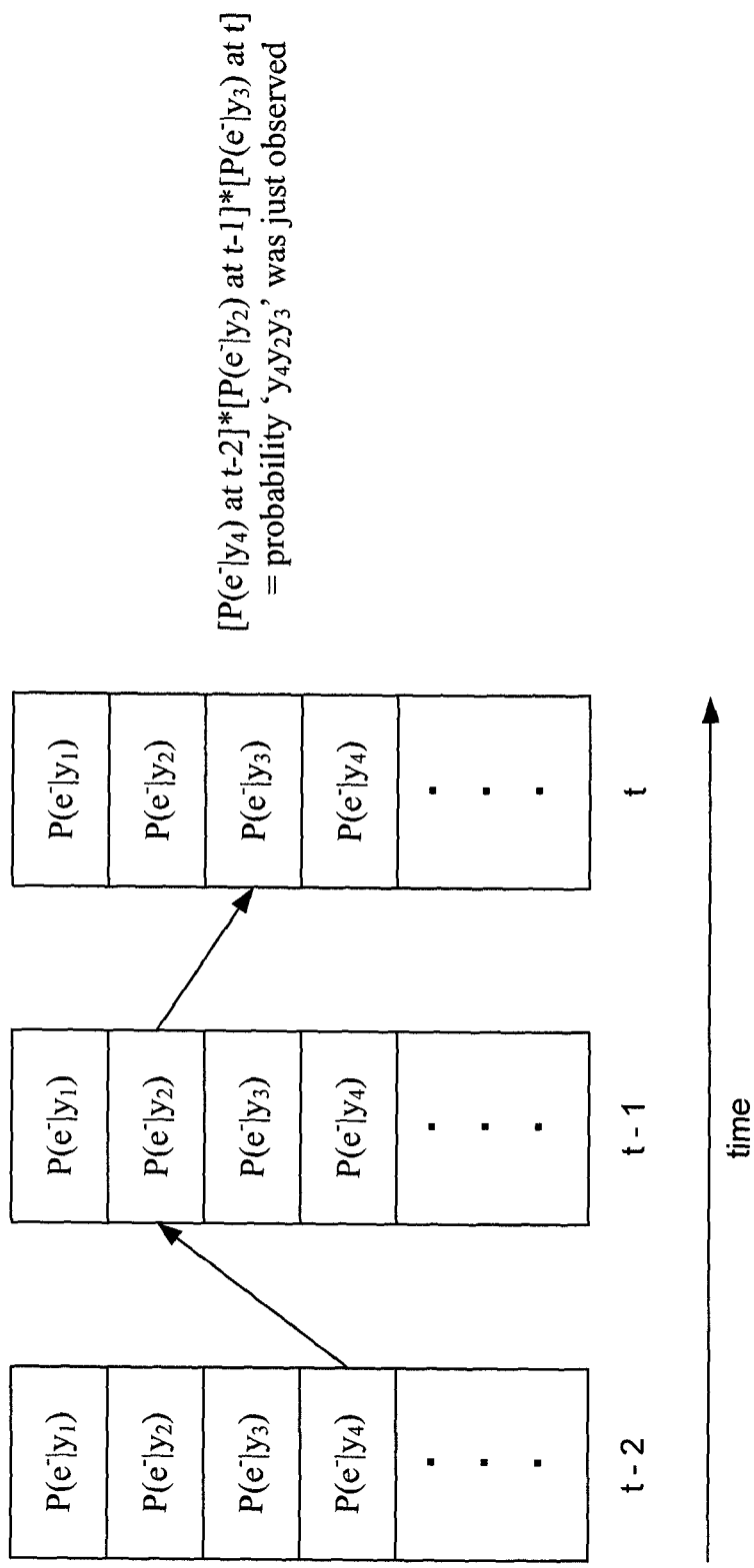
FIG. 5 shows an operation of a sequence learner in accordance with an embodiment of the present invention.

In regard to identifying frequently occurring sequences, at any given time t, a sequence learner may have to calculate the probability that a particular sequence of elements has been received over time up until time t. For example, to determine the probability that the sequence '$y_4y_2y_3$' has occurred over the last three samples (i.e., over the last three time steps), a sequence learner may multiply $P(e^-_{t-2}|y_4)$, $P(e^-_{t-1}|y_2)$, and $P(e^-_t|y_3)$ as shown in FIG. 5. The product of such a multiplication operation represents a "soft" count of the probability of having observed '$y_4y_2y_3$'. Thus, because at every time t, each input state has some probability associated with it (e.g., in FIG. 5, at any time t, each of input states $y_1$-$y_4$ has an associated probability), for every time t, there is some probability that any one of the possible sequences has been observed.

Further, in one or more embodiments of the present invention, instead of keeping a "soft" count as described above, a count of the actual number of times a sequence has occurred—a "hard" count—may be kept dependent on having a particular state of input vectors.

Those skilled in the art will note that there may be a combinatorial explosion of possible sequences received by a sequence learner over time. Thus, in one or more embodiments of the present invention, the sequence learner may consider a certain number of input states in each input sample, where that certain number is parameterized by some value para. Such treatment may narrow the number of possible updates to a base of para instead of a base of the number ninputs of inputs to the sequence learner.

Further, in one or more embodiments of the present invention, a search space of a sequence learner may be reduced, or otherwise controlled, by considering only those sequences of a given length that have been identified as potentially frequent from observations of shorter sequences. For example, the sequence learner may count likely 2-sequences (i.e., sequences of 2 elements) over a certain number window[2] of input samples. The resulting frequent 2-sequences may be used to generate candidate 3-sequences (i.e., sequences of 3 elements), whereupon, only these candidate 3-sequences are counted over a certain number window[3] of input samples. This process may continue until reaching a number MaxL representing the maximum length sequence to be considered by the sequence learner. In one or more other embodiments of the present invention, the sequence learner may have a different stopping point. For example, the sequence learner may use the statistics of its input to determine the maximum sequence length to consider.

Determining likely sequences as described above may be dependent on a "coherence time," which is the time over which the statistics of inputs remain constant. For an "on-line" sequence learner (i.e., one that does not loop back over previous inputs), the time required to generate likely sequences up to some maximum length may have to be less than the coherence time. If the time required to identify sequences of a certain length becomes longer than the coherence time, then in one or more embodiments of the present invention, "batch" processing, instead of on-line processing, may be used. Batch processing may involve identifying k-sequences (i.e., sequences of length k) by looping back over the same input used to identify the k−1-sequences (i.e., sequences of length k−1).

In one or more embodiments of the present invention, as sequences of certain length are identified, a sequence learner may keep the associated counts in a table st_table. There may be a separate st_table for each sequence length. For example, after counting 3-sequences, a table st_table{3} may be as follows:

| Count | Sequence |
| --- | --- |
| 103.92 | 121 |
| 8.67 | 224 |
| 82.50 | 231 |
| 167.02 | 312 |
| 220.45 | 423 |
| 14.32 | 412 |

Figure 6:
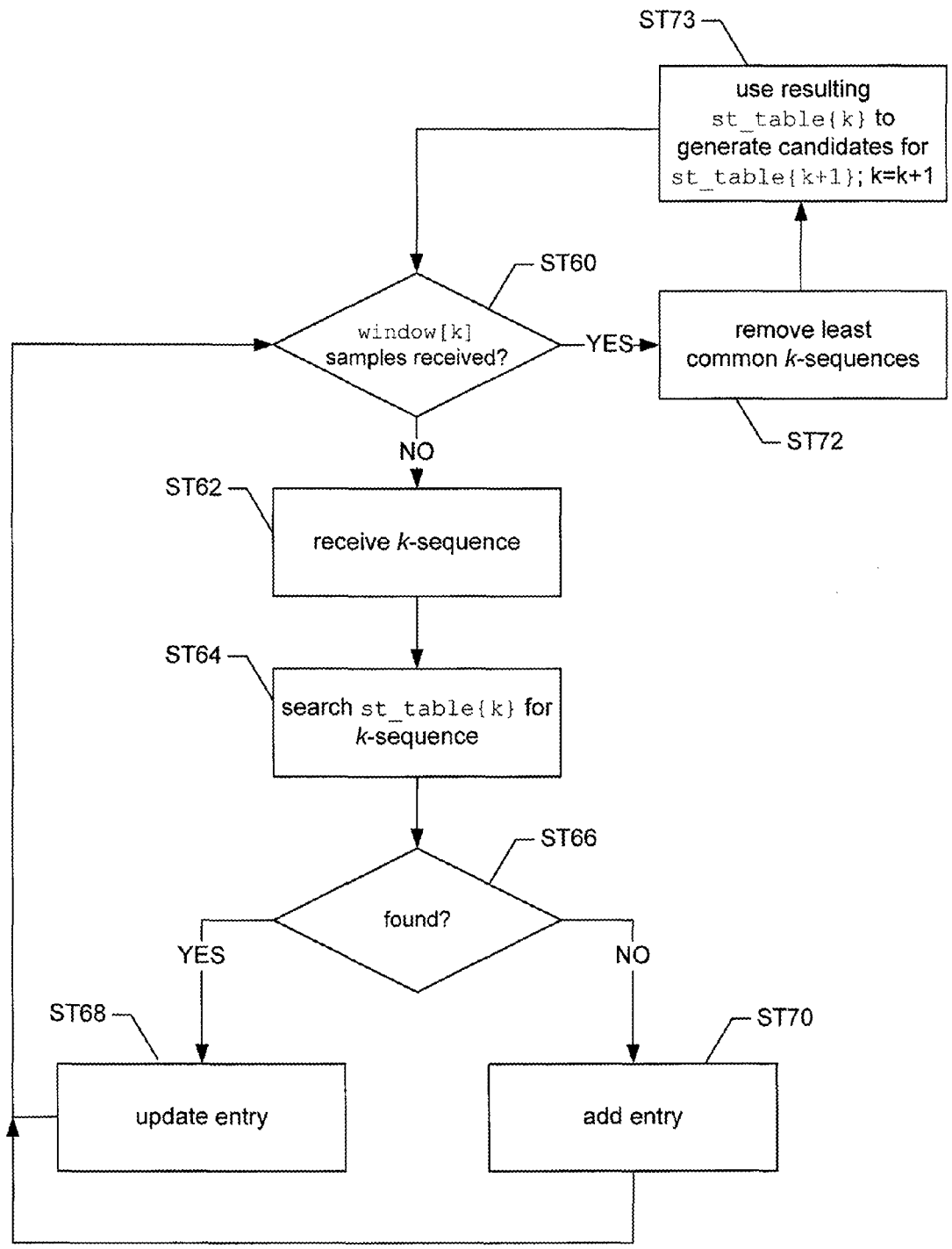
FIG. 6 shows a flow process in accordance with an embodiment of the present invention.

FIG. 6 shows a flow process for building a table st_table in accordance with an embodiment of the present invention. In regard to building table st_table{k}, for each k-sequence received in an input to a sequence learner, if a certain number window[k] of input samples has not yet been sampled ST60, the table st_table{k} is searched for the k-sequence ST62, ST64. If the k-sequence is already identified by table st_table{k}, then the corresponding count is appropriately incremented by the soft count for the k-sequence ST66, ST68. Otherwise, if the k-sequence is not listed in table st_table{k}, then that k-sequence is added to table st_table{k} with its corresponding soft count ST66, ST70. Upon receiving window[k] input samples ST60, the least common k-sequences may be removed ST72, i.e., all but the top x sequences may be removed, where x represents a maximum number of sequences that may be kept in table st_table{k} after counting sequences of length k. The resulting table st_table{k} may then be used to generate candidate sequences for table st_table{k+1} (generating candidate sequences further described below) ST73, whereupon the process shown in FIG. 6 may be repeated for table st_table{k+1}. Further, in one or more embodiments of the present invention, the process shown in FIG. 6 may not be performed for every k-sequence.

Further, in one or more embodiments of the present invention, it may be desirable to refine counts on k-length sequences at multiple points in time after an initial counting procedure. In such embodiments, in an effort to give greater weight to recent counts without abandoning all previous observations, a table lt_table of long-term counts may be created and used.

As described above, in one or more embodiments of the present invention, a sequence learner may only consider those sequences of a given length that have been identified as potentially frequent from observations of shorter sequences. In other words, for example, if $S_i$ is a frequent 3-sequence, then it is likely that each subsequence of $S_i$ of length 2 is also frequent. Conversely, if a 2-sequence is infrequent, then it is unlikely that any of its 3-length super-sequences are frequent. Thus, the sequence learner may consider only those 3-sequences of which each 2-length subsequence is frequent.

In one or more embodiments of the present invention, a sequence learner may determine candidate k-sequences from a set of frequent k−1-sequences using, for example, a "join"

operation. Candidate k-sequences are those for which the first k−1 samples and the last k−1 samples are frequent. For each frequent k−1-sequence $S_i$ in a table st_table{k−1}, a join operation may search for a k−1-sequence $S_j$ in table st_table{k−1}, where the first k−2 elements of $S_j$ are the same as the last k−2 elements of $S_i$. If such an $S_j$ exists, the concatenation of $S_i$ and the last element of $S_j$ is added to the list of candidate k-sequences in a table st_table{k}. For example, consider the following tables st_table{3} and st_table{4}, which show the results after a join operation on table st_table{3}.

| Count | 3-Sequence | | Count | 4-Sequence |
|---|---|---|---|---|
| 103.92 | 121 | | 0 | 2312 |
| ~~8.67~~ | ~~224~~ | →JOIN→ | 0 | 3121 |
| | 231 | | 0 | 4231 |
| 167.02 | 312 | | | |
| | 423 | | | |
| ~~14.31~~ | ~~412~~ | | | |

To illustrate how a join operation may work on table st_table{3}, the following description is provided. Taking the 3-sequence '121,' the join operation searches table st_table{3} for a 3-sequence whose first 2 elements match the last two elements of the taken '121' 3-sequence. Because there are no 3-sequences that meet this condition with respect to the taken '121' 3-sequence, the join operation may next take, for example, the 3-sequence '312.' For this taken sequence, the join operation finds that the first two elements of the '121' 3-sequence matches the last two elements of the taken '312' sequence. Thus, the join operation then concatenates the taken '312' 3-sequence with the last element in the found '121' 3-sequence to yield a candidate 4-sequence of '3121' in table st_table{4}. Further, those skilled in the art will note that in one or more embodiments of the present invention, one or more operations other than a join operation may be used to generate candidate k-sequences.

As described above, in one or more embodiments of the present invention, each output of a sequence learner represents a particular learned sequence. Considering that the sequence learner is continuously identifying the most likely sequences to represent at its outputs, old sequences may need to be replaced by newer sequences that are more frequent. If there are multiple old sequences that are less frequent than a new sequence, the sequence learner may replace one or more of the multiple old sequences based on some criteria. For example, the sequence learner may first remove any old sequences having a length of 1.

Further, the sequence learner may, for example, remove an old sequence based on its similarity to a new sequence. The similarity of sequences may be determined based on some distance metric. For example, the sequence learner may determine the similarities of sequences using some minimum Hamming distance metric. The Hamming distance may be defined as the number of single-entry changes needed to be made to one sequence to reach another sequence, including changes to "empty" slots either before or after the sequence (but not both). For example, if an old sequence is '1234', and the new sequence is '1235', the Hamming distance is 1.

Further, in one or more embodiments of the present invention, a distance metric may consider all possible shifts of one sequence relative to the other. For those element indices that overlap in a given shift, '0' may be counted if the elements match, and '1' may be counted if the elements do not match. This number is added to the number of elements that do not align with any element of the other sequence. For example, if an old sequence is '1234', and the new sequence is '345', the result of the distance metric may be determined as 2. Those skilled in the art will note that various distance metrics may be created and/or used to determine the similarity between two sequences.

Further, in one or more embodiments of the present invention, a sequence learner may, for example, remove an old sequence based on the count (i.e., occurrence frequency) of the old sequence. More particularly, old sequences with lower counts may be replaced before old sequences with higher counts.

Further, in one or more embodiments of the present invention, a sequence learner may limit how different old and new sequences can be before an old sequence is replaced. In other words, if an old sequence is relatively very different than a new sequence, the sequence learner may prevent that old sequence from being replaced by the new sequence. Such control may promote stable learning at higher levels.

If a sequence learner replaces an old sequence with a new sequence, then, in one or more embodiments of the present invention, counts associated with subsequences of the old sequence may be removed from a corresponding table st_table.

In one or more embodiments of the present invention, as sequences are identified and represented at an output of a sequence learner, the sequence learner may collect statistics on the represented sequences. For example, the sequence learner may identify the a priori probability of a particular sequence and/or the transition probability between sequences.

At any time t, a sequence learner identifies the most likely sequences to represent at its output as described above. As described above, the sequence learner is further arranged to compute the probability of actually being in each of the represented sequences given the inputs received over time by the sequence learner.

By learning sequences as described above, a node in an HTM may coalesce both space and time when learning causes. Thus, for example, while a lower level child node learns causes based on patterns and sequences thereof sensed over its input space, a higher level parent node is able to learn higher level causes by coalescing both space and time over a larger input space. In other words, as information ascends through the hierarchy of an HTM, higher level nodes learn causes that cover larger areas of input space and longer periods of time than lower level nodes. For example, one or more nodes in a lowest level of an HTM may learn causes associated with a price of a particular stock, whereas one or more nodes in a higher level of the HTM may learn causes associated with overall stock market fluctuations.

In one or more embodiments of the present invention, computing the output probability over a learned sequence may be dependent on Γ (gamma). Γ may be denoted as a matrix indexed by two variables, S and I, where S corresponds to output sequences (e.g., $S_1$='$y_4y_2y_3$', $S_2$='$y_1y_2y_1$', $S_3$='$y_3y_1$', $S_4$='$y_2y_2y_1y_4$'), and where I corresponds to the index within each sequence (e.g., $S_1[I]=y_4$ when I=1). Γ(S, I) may be represented as shown in FIG. 7A.

At any point in time, each entry ($S_i$, $I_m$) in a gamma matrix represents the probability that the current input vector corresponds to the $I_m^{th}$ element of sequence $S_i$. Each gamma may be determined based solely on the previous gamma and the input vector. Further, even though the result may depend on the input history of all past inputs, only the result from the previous time-step may need to be considered as the result of the previous time-step implicitly contains all relevant information from all previous time-steps. Once gamma is determined, the total probability of sequence $S_i$ may be determined as the sum across the $i^{th}$ row of the gamma matrix (normalized by the prior probability of the sequence).

In one or more embodiments of the present invention, an overall sequence probability in terms of gamma may be represented as follows:

$$P(e_0^- \ldots e_t^- | S_i^t) = \frac{1}{P(S_i)} \sum_{I_m} \Gamma_t(S_i, I_m),$$

where $$\Gamma_t(S_i, I_m) = \sum_{y_t} P(e_t^- | y_t) \sum_{y_{t-1}} \left[ \sum_{S_j, I_n: y_{t-1} = S_j[I_n]} \beta(S_i, S_j, I_m, I_n) \Gamma_{t-1}(S_j, I_n) \right],$$

and where $$\beta(S_i, S_j, I_m, I_n) = P(S_i^t, I_m^t, y_t | S_j^{t-1}, I_n^{t-1}, y_0 \ldots y_{t-1}).$$

Further, for example, in the case where a given sequence is observed in its entirety, the expression for $\beta$ may be reduced to the following:

$$\beta(S_i, S_j, I_m, I_n) = \begin{cases} 1 & \text{if } S_i[I_m] = y_t, S_j[I_n] = y_{t-1}, I_m = I_n + 1, S_i = S_j \\ A^0 & \text{if } S_i[I_m] = y_t, S_j[I_n] = y_{t-1}, I_m = 1, I_n = Len(S_j) \\ 0 & \text{otherwise.} \end{cases}$$

Those skilled in the art will note that the description above and below in regard to computing (and initializing) gamma represents only an example of how a sequence learner may calculate output probabilities. Now considering, for example, the four sequences given above (i.e., $\{S_1, S_2, S_3, S_4\}$, where $S_1$='$y_4y_2y_3$', $S_2$='$y_1y_2y_1$', $S_3$='$y_3y_1$', $S_4$='$y_2y_2y_1y_4$'), the first two sums in the expression for gamma iterate through every possible combination of previous and current elements. Consider one of those combinations $y^{t-1}=y_2$ and $y^t=y_1$. In other words, the previous input vector (though it contains a probability for every element $y_i$) represents a cause of $y_2$, and the current input vector represents $y_1$. The expression for $\beta$ (beta) may evaluate to a non-zero value for those entries in gamma that correspond to the elements $y_2$ and $y_1$ and time t-1 and t, respectively. These may be referred to as "active cells" in the gamma matrix as further shown in FIG. 7B.

Those skilled in the art will note that it may not be enough for a cell to be active at time t to satisfy non-zero conditions given in beta. For those cells that are not in the first column (I!=1), an active cell at time t may follow an active cell at time t−1 in the same sequence. For the example being used (namely, with respect to the four sequences $\{S_1, S_2, S_3, S_4\}$ given above), there may be only one out of the four time-t active cells for which this condition holds, the cell being circled (at the head of the arrow) as shown in FIG. 7C. Because this is an internal (I!=1) case, the beta function may simply multiply the value stored in the circled t−1 cell by one.

Further, those skilled in the art will note that beta may just be one function in the expression for beta given above. There may also be a need to multiply the value in the circled t−1 cell (at the non-headed of the arrow) shown in FIG. 7C by $P(e_t^r|y^t=y_1)$, which is equivalent to the circled value in the input vector shown in FIG. 8.

Figure 8:
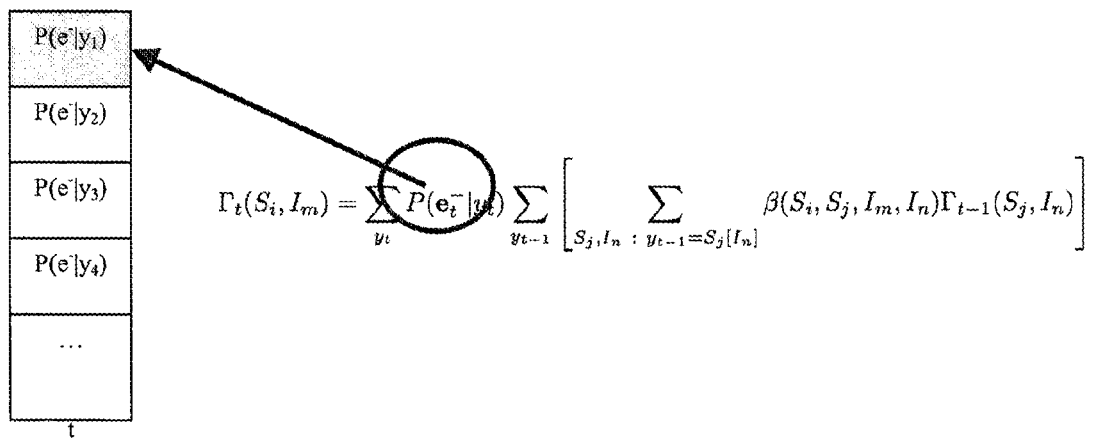
FIG. 8 shows a representation in accordance with an embodiment of the present invention.

Accordingly, the value added to the circled cell at time t is the value in the circled cell from time t−1 multiplied by the value in the input vector indicated shown in FIG. 8 (and multiplied by 1). This may be for only one case of previous and current elements ($y^{t-1}=y_2$ and $y^t=y_1$). Iterations may be carried through every combination of previous and current elements, performing similar calculations, and the results are cumulatively added to the gamma matrix at time t.

A further iteration may be considered—the iteration dealing with the case relating to the first column (I=1). To visualize this, those skilled in the art may assume they are dealing with the case of $y^{t-1}=y_4$ and $y^t=y_1$. The current element is the same, but now there may be an assumption that the previous element was $y_4$ instead of $y_2$. The active cells are shown in FIG. 7D.

In such a case, there are no active cells at time t that follow an active cell of the same sequence at time t−1. However, as shown in FIG. 7E, there is a first-column (I=1) cell at time t and a final-element cell at time t−1. Although this fails to satisfy the conditions for beta=1, it does satisfy the conditions for beta=$A^0$, where $A^0$ represents the (constant) transition probability between sequences (noting that the general case may be represented as $A^0(S_i,S_j)$). Those skilled in the art will note that the circled t−1 cell (at the non-headed end of arrow) shown in FIG. 7E need not be in the last column (I=4), but may be the last element of a given sequence. Still referring to FIG. 7E, the value in the cell circled at time t−1 would be multiplied by $A^0$ and multiplied by the value corresponding to $y_4$ in the input vector, and the product would be added to the value stored in the circled cell at time t.

In summary, in one or more embodiments of the present invention, for each combination of previous and current elements, a sequence learner may determine which active cells satisfy the conditions for either beta=1 or beta=$A^0$. The sequence learner may multiply the legal values from time t−1 by the beta and then multiply by the corresponding value from the input vector. The result across all combinations of previous and current elements is then summed to reach a final gamma.

As described above, in one or more embodiments of the present invention, each gamma is defined in terms of the previous gamma. With respect to determining the first gamma, those skilled in the art will note that the first observed element, $y^{t=0}=y_a$, may correspond to any index in a sequence with equal likelihood. In one or more embodiments of the present invention, the number of occurrences of $y_a$ across all sequences may be determined as follows:

$$T(y_a) = \sum_{S_i} \sum_I 1(S_i[I] = y_a).$$

The probability of an element in a sequence is 1 over this sum if that element is a $y_a$ and zero otherwise:

$$\Gamma_0(S_i, I) = \sum_{y_i: T(y_i) \neq 0} \frac{1}{T(y_i)} P(e_t^- | y_i).$$

For example, referring to FIG. 9, consider the first iteration of the sum, where $y_i=y_1$. There are 4 cells in the gamma matrix that correspond to $y_1$. Each of these cells may be populated by ¼ multiplied by the first entry in the input vector, $P(e_t|y_1)$. This operation may then be repeated for $y_i=y_2$, and so forth.

Further, in one or more embodiments of the present invention, it may be necessary, or otherwise desirable, to initialize a gamma at times other than at time t=0. For example, in some cases, a sequence learner may perform calculations that yield no useful results regarding the sequence to which an input vector belongs. Thus, when a sequence learner has an output probability that meets one or more certain characteristics (e.g., the output distribution is uniform), gamma may be re-initialized as described above by treating the first input vector as a new input at time t=0.

Those skilled in the art will note that in one or more embodiments of the present invention, gamma will become small over time. Even when high-probability elements correspond to legal paths along learned sequences, there may be some energy in the input that does not correspond to legal paths and is therefore not passed along to the output probabilities. Further, each transition multiplies by a factor of $A^0<1$, which may diminish the input. However, the accuracy of the sequence learner may not be affected if, for example, the probabilities in a gamma matrix (examples described above) are normalized to 1. Thus, in one or more embodiments of the present invention, the output distribution of a sequence learner may simply be normalized to render accurate probabilities. Further, in one or more embodiments of the present invention, should it be desirable to prevent gamma from diminishing to numbers over time that are "too small," gamma may be periodically normalized. Gamma may be normalized, for example, by dividing each entry in the matrix by a sum total of the entire matrix.

Those skilled in the art will note that the description above in regard to computing (and initializing) gamma represents only an example of how a sequence learner may calculate output probabilities. In one or more other embodiments of the present invention, a sequence learner may use one or more different operations or techniques to calculate output probabilities.

Further, in one or more embodiments of the present invention, a sequence learner may output a probability for an input sequence as opposed to for each input element. For example, if the sequence '123' is received over time, the sequence learner may output a probability upon receiving the last element, i.e., '3', in the sequence as opposed to outputting a probability for each element '1', '2', and '3'. A determination as to when a particular sequence ends and when to output the corresponding probability may depend on one or more various criteria. For example, in one or more embodiments of the present invention, if a transition probability (e.g., $A^0$ described above) meets a certain threshold, a sequence learner may then output a probability for the sequence received over time until meeting the threshold. Further, in one or more embodiments of the present invention, a sequence learner may output a probability if a transition probability peaks (i.e., a fast rise followed by a fast fall, or vice-versa). Further, in one or more embodiments of the present invention, a sequence learner may output a probability if a correlation between distributions indicates that a new sequence has occurred. Further, in one or more embodiments of the present invention, a sequence learner may track a change in a "motion" (i.e., computations) of the sequence learner and then output a probability when there is a change inconsistent with the tracked motion.

Pooling

As described above, learning causes in an HTM-based system may involve learning patterns and sequences of patterns. In general, patterns and sequences that occur frequently are stored and assigned to the same causes. For example, groups of patterns that occur frequently at some statistically significant rate may be assigned to the same cause. In the case of sequences, sequences that occur frequently at some statistically significant rate may be assigned to the same cause. Accordingly, learning causes may effectively entail mapping many patterns and/or sequences to a single cause. Such assigning of multiple patterns and/or sequences to a single cause may be referred to as "pooling."

In one or more embodiments of the present invention, pooling may be dependent on "spatial" similarities between two or more patterns (noting that a pattern may actually represent a sequence from a lower level). In such embodiments, an HTM node may compare a spatial property of a received sensed input pattern with that of a learned sensed input pattern (or "quantization" point). If the two patterns are "similar enough" (i.e., have enough "overlap"), then the received sensed input pattern may be assigned to the same cause as that of the quantization point. For example, if a quantization point is equal to '10010110', then a received sensed input pattern of '10011110' may be assigned to the same cause as that of the quantization point due to there being a difference of only bit between the two patterns. Those skilled in the art will note that the amount of similarity needed to perform such "spatial" pooling may vary within and/or among HTM-based systems.

Further, in one or more embodiments of the present invention, pooling may involve assigning patterns that occur in order to the same cause. For example, if an HTM node receives pattern A followed by pattern B followed by pattern D, then patterns A, B, and D may be assigned to the same cause as there is some likelihood that this sequence of patterns was caused by the same object. Accordingly, such "temporal" pooling enables the mapping of patterns, some or all of which may have no significant spatial overlap, to a single cause.

Further, in one or more embodiments of the present invention, pooling may involve learning the timing between received input patterns. For example, an HTM node that learns a sequence of patterns A, B, and C may also learn the timing between the patterns in the sequence. Sequences having such timing are assigned to the same cause. In such a manner, an HTM node, and an HTM in general, may assign sequences to a cause based on rhythm (i.e., the timing relationship from one element in a sequence to the next element in the sequence) and/or tempo (i.e., the overall speed of the sequence).

Further, in one or more embodiments of the present invention, pooling may involve controlling an HTM node to assign two or more patterns to the same cause. For example, a higher level HTM node may send a signal to a lower level HTM node directing the lower level HTM node to assign two or more patterns received by the lower level HTM node to the same cause. These two or more patterns may have no spatial overlap or temporal relationship.

Determining Causes of Novel Input

After an HTM has learned, or while the HTM is continuing to learn, one or more causes in its world, the HTM may determine causes of novel input using what may be referred to as "inference." In general, presented with novel sensed input data, an HTM may infer which of its learned causes is/are the source of the novel sensed input data based on statistical comparisons of learned patterns and sequences thereof with patterns and sequences thereof in the novel sensed input data.

When an HTM node receives a new sensed input pattern, the HTM node assigns probabilities as to the likelihood that the new sensed input pattern matches each of its learned sensed input patterns. The HTM node then combines this probability distribution (may be normalized) with previous state information to assign probabilities as to the likelihood that the new sensed input pattern is part of each of the learned sequences of the HTM node. Then, as described above, the distribution over the set of sequences learned by the HTM node is passed to a higher level node.

Those skilled in the art will note that the distribution passed by an HTM node is derived from a "belief" as to the likelihood that each learned cause is the cause of sensed input patterns at the input of the HTM node. A "belief" also includes those messages that are derived from or based on the belief. For example, an HTM node having learned five causes may deterministically assign percentages to each of the five learned causes as being the cause of sensed input patterns. The distribution of percentages (or "belief" as described above) may be normalized (or unnormalized) and passed to a parent node. The parent node may then determine coincidences among the distributions sent from its child nodes, and then, based on its learned sensed input patterns and sequences thereof, pass to a yet higher level node its own belief as to the likelihood that each of its learned causes is the cause of sensed input patterns at its input. In other words, a parent node forms its own "higher level" belief as to the cause of the sensed input patterns at least partly based on some statistical convergence of the beliefs passed from its child nodes.

Further, in one or more embodiments of the present invention, inferring causes may occur during learning. Further, in one or more embodiments of the present invention, learning by an HTM may be disabled, in which case, inference may continue to occur.

As described above, one or more causes of sensed input patterns may be determined by an HTM through a series of inference steps ascending through the hierarchy of the HTM. Further, in one or more embodiments of the present invention, one or more causes of sensed input patterns may be determined based on information descending through the hierarchy of the HTM. In general, by combining its memory of likely sequences of sensed input patterns with current input (i.e., beliefs from lower level nodes), a node in an HTM may have the ability to "predict" (i.e., make "predictions" as to) what is likely to happen next.

When a node in an HTM generates a prediction of what is likely to happen next, the prediction, or "prior probability," biases lower level nodes in the HTM to infer the predicted causes. This may be achieved by a higher level node passing a probability distribution over its learned sensed input patterns (as opposed to over its learned sequences) to a lower level node. This probability distribution may be used by the lower level node as an expectation as to the next sensed input pattern. For example, if an HTM is processing text or spoken language, the HTM may automatically predict what sounds, words, and ideas are likely to occur next. Such a process may help the HTM understand noisy or missing data. In other words, for example, if an ambiguous sound arrived, the HTM may likely interpret the sound based on what the HTM was expecting. In general, prediction may influence the inference process by biasing at least part of an HTM to settle on one or more expected beliefs. Moreover, in one or more embodiments of the present invention, a prediction may be fed back from a higher level node in an HTM to a lower level node in the HTM as a substitute (at least in part) for sensory input data to the lower level node.

Further, in one or more embodiments of the present invention, one or more prior probabilities may be set manually in addition to or instead of having prior probabilities set via prediction. In other words, an HTM may be manually controlled to anticipate a particular cause or set of causes.

Belief Propagation

Figure 10:
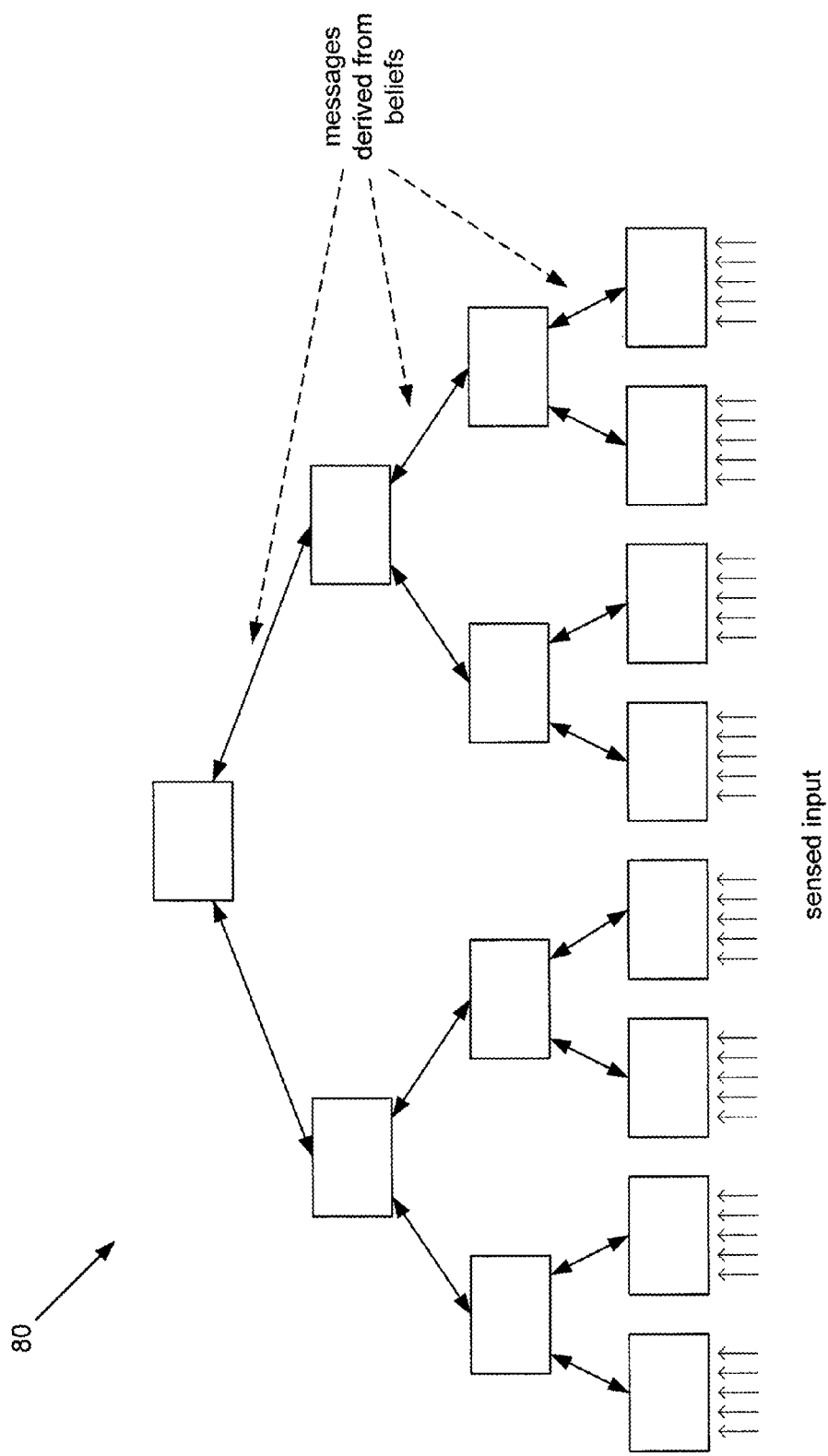
FIG. 10 shows at least a portion of an HTM-based system in accordance with an embodiment of the present invention.

As described above, in one or more embodiments of the present invention, inferring causes of sensed input patterns involves passing beliefs from lower level nodes to higher level nodes. In FIG. 10, such "belief propagation" is shown in HTM 80 (beliefs indicated with arrows; nodes shown, but not labeled). Generally, as described above, a belief is a vector of values, where each value represents a different cause. A current belief of a node may be a distribution of several causes being at least partially active at the same time. Further, the values in the belief vector may be normalized so that a stronger likelihood of one cause represented in the vector will diminish the likelihood of other causes represented in the vector. Further, those skilled in the art will note that a meaning of a value representing a cause in a belief vector may not vary depending on what other causes represented in the belief vector are active.

As described above with reference to FIG. 2, an HTM is a hierarchy of connected nodes. Each node may be thought as having a belief. In one or more embodiments of the present invention, a belief at one node may influence a belief at another node dependent on, for example, whether the nodes are connected via a conditional probability table (CPT).

A CPT is a matrix of numbers, where each column of the matrix corresponds to the individual beliefs from one node, and where each row of the matrix corresponds to the individual beliefs from another node. Thus, those skilled in the art will note that by multiplying a vector representing a belief in a source node by an appropriate CPT results in a vector in the dimension and "language" of beliefs of a destination node. For example, in an HTM-based system designed for operation in a "weather" domain, a lower level node may form a belief about air temperature and have values representing the likelihood of the following causes: "hot"; "warm"; "mild"; "cold"; and "freezing". A higher level node may form a belief about precipitation and have values representing the likelihood of the following causes: "sunny"; "rain"; "sleet"; and "snow". Thus, using a CPT, the belief about air temperature in the lower level node may inform the belief about precipitation in the higher level node (and vice-versa). In other words, multiplying the vector representing the belief about air temperature in the lower level node by the CPT results in a vector representing the appropriate belief about precipitation in the higher level node.

Accordingly, in one or more embodiments of the present invention, belief propagation allows an HTM to infer causes such that each node in the HTM represents a belief that is maximally or optimally consistent with its input. Those skilled in the art will note that performing inference in such a manner results in ambiguities being resolved as beliefs ascend through the HTM. For example, in an HTM (or part thereof) having a parent node and two child nodes, if (i) the first child node believes with 80% certainty that it is seeing a "dog" and with 20% certainty that it is seeing a "cat" and (ii) the second child node believes with 80% certainty that it is hearing a "pig" and with 20% certainty that it is hearing a "cat," then the parent node may decide with relatively high certainty that a "cat" is present and not a "dog" or "pig." The parent node effectively settled on "cat" because this belief is the only one that is consistent with its inputs, despite the fact the "cat" image and the "cat" sound were not the most likely beliefs of its child nodes.

Further, as described above, a higher level node in an HTM may pass a "prediction" to a lower level node in the HTM. The "prediction" is a "belief" in that it contains values representing the likelihoods of different causes. The vector representing the belief in the higher level node may be multiplied by an appropriate CPT to inform a belief in the lower level node. Thus, in effect, a higher level node in an HTM uses its learned sequences combined with recent state information (i.e., the current input to the higher level node) to (i) predict what its next belief should be and (ii) then pass the expectation down to one or more lower level nodes in the HTM.

Figure 11:
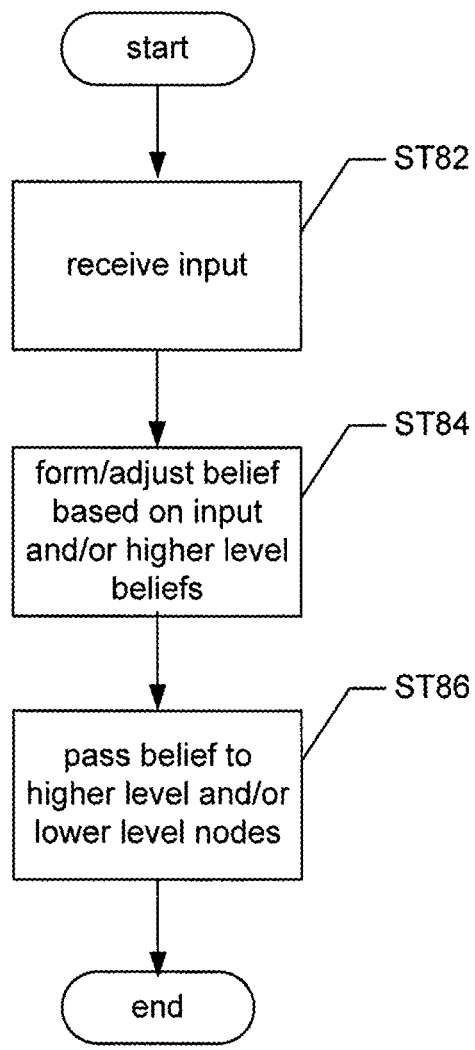
FIG. 11 shows a flow process in accordance with an embodiment of the present invention.

FIG. 11 shows a flow process in accordance with an embodiment of the present invention. Particularly, FIG. 11 shows in summary the steps of belief propagation described above. Initially, a current node in the HTM receives input (in the form of sensed input patterns or beliefs from lower level nodes) ST82. Based on the received input and any beliefs passed down from a higher level node, the current node forms/adjusts its belief as to the likelihood of causes at its input distributed over its learned causes ST84. This belief is then passed to higher level and/or lower level nodes to inform beliefs at those nodes ST86.

Spatial Attention

To facilitate a determination of causes of input patterns sensed by an HTM, the HTM may "focus" the determination. An HTM provided with the ability to focus when determining causes of sensed input patterns may be referred to as having "attention." For example, in one or more embodiments of the present invention, an HTM may have the capacity to focus on a subset of an entire input space. An HTM having such a capacity may be referred to as having "spatial attention."

Figure 12:
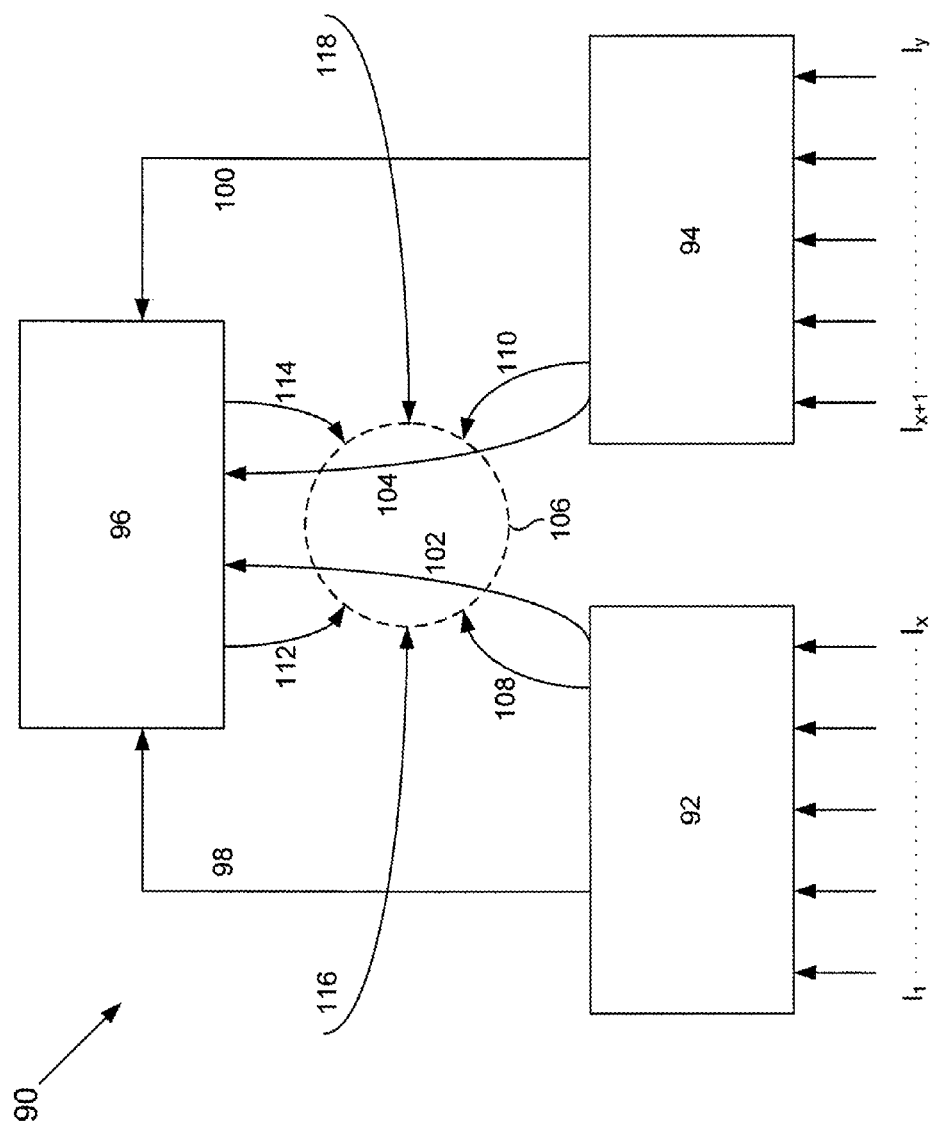
FIG. 12 shows at least a portion of an HTM-based system in accordance with an embodiment of the present invention.

FIG. 12 shows a portion of an HTM 90 having spatial attention in accordance with an embodiment of the present invention. The portion of HTM 90 shown in FIG. 12 has level L1 nodes 92, 94 and level L2 node 96. Level L1 node 92 has an input range of $i_1$-$i_x$, and level L1 node 94 has an input range of $i_{x+1}$-$i_y$. Accordingly, level L2 node 96 has an input range of $i_1$-$i_y$.

As shown in FIG. 12, level L1 nodes 92, 94 are connected to level L2 node 96 by connections 98, 100. Connections 98, 100 are referred to as being "permanent" in that data/information is always allowed to flow from level L1 nodes 92, 94 to level L2 node 96 over connections 98, 100.

Further, level L1 nodes 92, 94 may be connected to level L2 node 96 by connections 102, 104. Connections 102, 104 are routed through a relay module 106. Those skilled in the art will note that the depiction of relay module 106 in FIG. 12 is only a representation. In other words, although relay module 106 is shown in FIG. 12 as being positioned between level L1 nodes 92, 94 and level L2 node 96, in one or more other embodiments of the present invention, relay module 106 may be positioned elsewhere (either in software or hardware).

In the case, for example, that level L2 node 96 is "not paying attention" to level L1 node 92 due to the state of relay module 106, if level L1 node 92 experiences an unexpected event at its input, level L1 node 92 may send a "strong" signal to relay module 96 over connection 108 in order to cause relay module 106 to allow data/information to flow from level L1 node 92 to level L2 node 96 over connection 102. Further, in the case, for example, that level L2 node 96 is "not paying attention" to level L1 node 94 due to the state of relay module 106, if level L1 node 94 experiences an unexpected event at its input, level L1 node 94 may send a "strong" signal to relay module 106 over connection 100 in order to cause relay module 106 to allow data/information to flow from level L1 node 94 to level L2 node 96 over connection 104.

Further, in the case, for example, that level L2 node 96 is "not paying attention" to level L1 node 92 due to the state of relay module 106, if level L2 node 96 needs to pay attention to the input space of level L1 node 92, level L2 node 96 may send a "strong" signal to relay module 106 over connection 112 in order to cause relay module 106 to allow data/information to flow from level L1 node 92 to level L2 node 96 over connection 102. Further, in the case, for example, that level L2 node 96 is "not paying attention" to level L1 node 94 due to the state of relay module 106, if level L2 node 96 needs to pay attention to the input space of level L1 node 94, level L2 node 96 may send a "strong" signal to relay module 106 over connection 114 in order to cause relay module 106 to allow data/information to flow from level L1 node 94 to level L2 node 96 over connection 104.

Further, the flow of data/information over connections 102, 104 may be dependent on the assertion of signals to relay module 106 over connections 116, 118. As shown in FIG. 12, connections 116, 118 do not originate from level L1 nodes 92, 94 or level L2 node 96. Instead, for example, in one or more embodiments of the present invention, signals over connections 116, 118 may be controlled by a control module (not shown). Generally, in one or more embodiments of the present invention, signals over connections 116, 118 may originate from any portion of an HTM-based system not shown in FIG. 12.

As described above, relay module 106 provides a means to switch "on" and "off" connections between lower and higher level nodes. This has the effect of limiting or increasing what an HTM perceives.

Further, in one or more embodiments of the present invention, relay module 106, instead of switching "on" and "off" data/information flow over connections 102, 104, may otherwise modify or set the value of data/information flowing over connections 102, 104. For example, relay module 106 may modify a probability distribution sent from level L1 node 92 over connection 102.

Category Attention

Figure 13:
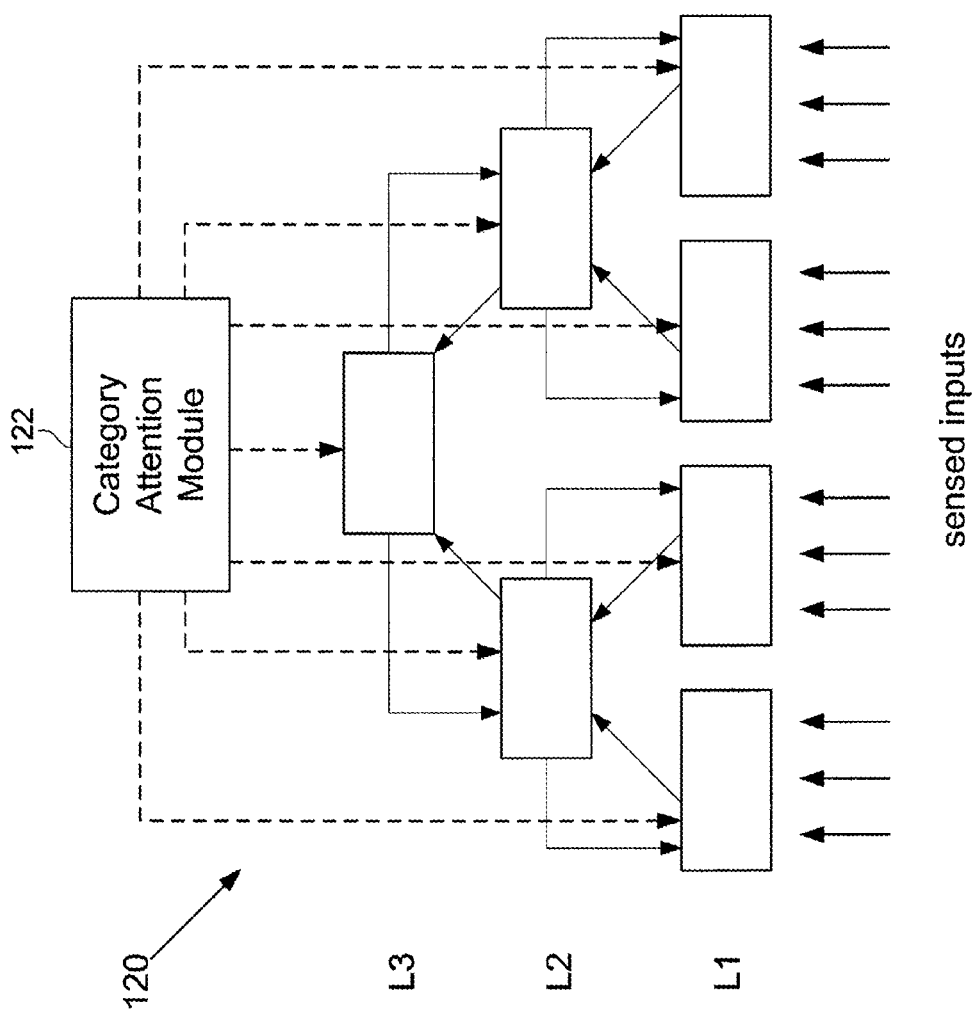
FIG. 13 shows at least a portion of an HTM-based system in accordance with an embodiment of the present invention.

In one or more embodiments of the present invention, an HTM, possibly in addition to having spatial attention, may have what may be referred to as "category attention." An HTM having category attention may focus the HTM on a particular category of causes/objects. FIG. 13 shows a portion of an HTM 120 in accordance with an embodiment of the present invention. In FIG. 13, the levels and nodes (shown, but not labeled) are similar to that shown and described above with reference to FIG. 2. Further, HTM 120 is provided with, or at least connected to, a category attention module 122. The category attention module 122 may be singly or multiply connected (possible connections indicated in FIG. 13 with dashed lines) to any of the nodes in HTM 120.

Category attention module 122 allows for the control of categories of causes (e.g., by selecting one or more contexts) that may be considered by a node connected to the category attention module 122. Thus, for example, if HTM 120 expects to receive inputs of category "CAT," category attention module 122 may assert a signal to the only node in level L3 so as to effectively switch "off" the consideration of non-"CAT" categories (e.g., category "DOG"). In other words, category attention module 122 may be used to select a context for what at least a portion of HTM 120 perceives. In one or more other embodiments of the present invention, category attention module 122 may assert a context that is not to be perceived by at least a portion of HTM 120. For example, category attention module 122 may assert context "DOG," whereby all contexts other than "DOG" may be perceived by HTM 120.

Directed Behavior

As described above, an HTM in accordance with embodiments of the present invention is able to learn and form representations of causes in its world and then later predict causes as the HTM senses novel input. In essence, an HTM that has learned how causes in its world behave over time has created a model of its world. In one or more embodiments of the present invention, the ability of an HTM to predict causes over time may be used to direct behavior as described below with reference to FIGS. 14 and 15.

Figure 14:
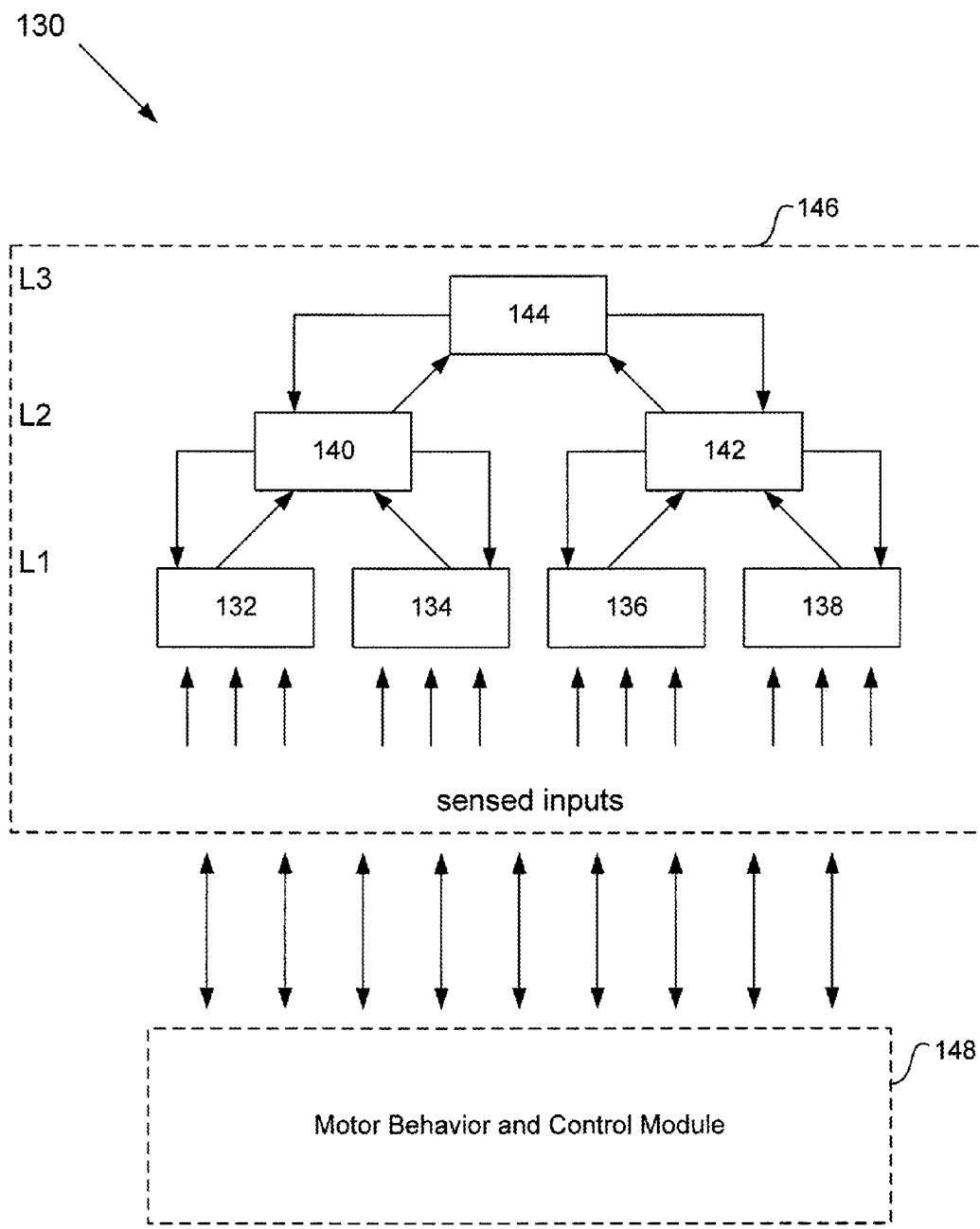
FIG. 14 shows at least a portion of an HTM-based system in accordance with an embodiment of the present invention.

FIG. 14 shows a portion of an HTM-based system 130 in accordance with an embodiment of the present invention. The HTM-based system 130 has an HTM 146 formed of levels L1, L2, L3, where level L1 has nodes 132, 134, 136, 138, level L2 has nodes 140, 142, and level L3 has node 144. The HTM 146 receives sensed input data, learns and forms representations of causes of the sensed input data, and then infers and predicts causes of novel sensed input data based on its learned causes and representations thereof.

The HTM-based system 130 further includes a motor behavior and control module 148. The motor behavior and control module 148 has "built-in" or preprogrammed behaviors, which are essentially primitive behaviors that exist independent of the HTM 146. As the HTM 146 discovers and learns causes in its world, the HTM 146 learns to represent the built-in behaviors just as the HTM 146 learns to represent the behavior of objects in its world outside of the HTM-based system 130. Those skilled in the art will note that from the perspective of the HTM 146, the built-in behaviors of the HTM-based system 130 are simply causes in its world. The HTM 146 discovers these causes, forms representations of them, and learns to predict their activity.

Those skilled in the art will note that in one or more embodiments of the present invention, the motor behavior and control module 148 may be part of or associated with a robot. However, in one or more other embodiments of the present invention, the motor behavior and control module 148 may not be part of or associated with a robot. Instead, for example, the motor behavior and control module 148 may simply provide some mechanism for movement of the HTM-based system 130.

As described above, HTM 146 learns and forms representations of the built-in behaviors of the HTM-based system 130 as carried out by the motor behavior and control module 148. Next, through an associative memory mechanism, the representations of the built-in behaviors learned by the HTM 146 may be paired with the corresponding mechanisms in the motor behavior and control module 148. For example, in one or more embodiments of the present invention, a node in HTM 146 having a learned representation of a particular built-in behavior (or a part thereof depending on a position of the node in the HTM 146) may send one or more signals to the motor behavior and control module 148 to determine which mechanisms in the motor behavior and control module 58 are active during the occurrence of the particular built-in behavior. Thus, representations of built-in behavior carried out by the HTM-based system 130 are learned by the HTM 146 and then may be associated with the corresponding mechanisms in the motor behavior and control module 148.

Those skilled in the art will note that in one or more embodiments of the present invention, the learned representations of the built-in behaviors in the HTM 146 may be associated or correlated with the mechanisms creating the built-in behaviors in the motor behavior and control module 148 based on an implementation representing some form of Hebbian learning.

After the association of a learned behavioral representation in the HTM 146 with a corresponding behavioral mechanism in the motor behavior and control module 148, when the HTM 146 next predicts that behavior, it may actually cause the behavior to occur. For example, using an analogue to human behavior, breathing is considered a built-in, or innate, behavior. A newborn human breathes without having to first learn how to breathe (similar to, for example, eye blinking and movement away from pain). Over time, the human associates learned representations of breathing with the actual muscles that cause breathing. Based on this determined association, the human may then control his/her breathing by, for example, purposefully deciding when to breathe in and/or breathe out. In a similar manner, returning to the context of the HTM-based system 130, the HTM 146, once having learned a representation of a particular behavior (e.g., movement of a robot limb) caused by the HTM-based system 130 and associating the learned representation with a corresponding behavioral mechanism (e.g., the motor responsible for causing movement of the robot limb), may cause, via prediction, the particular behavior to occur.

Figure 15:
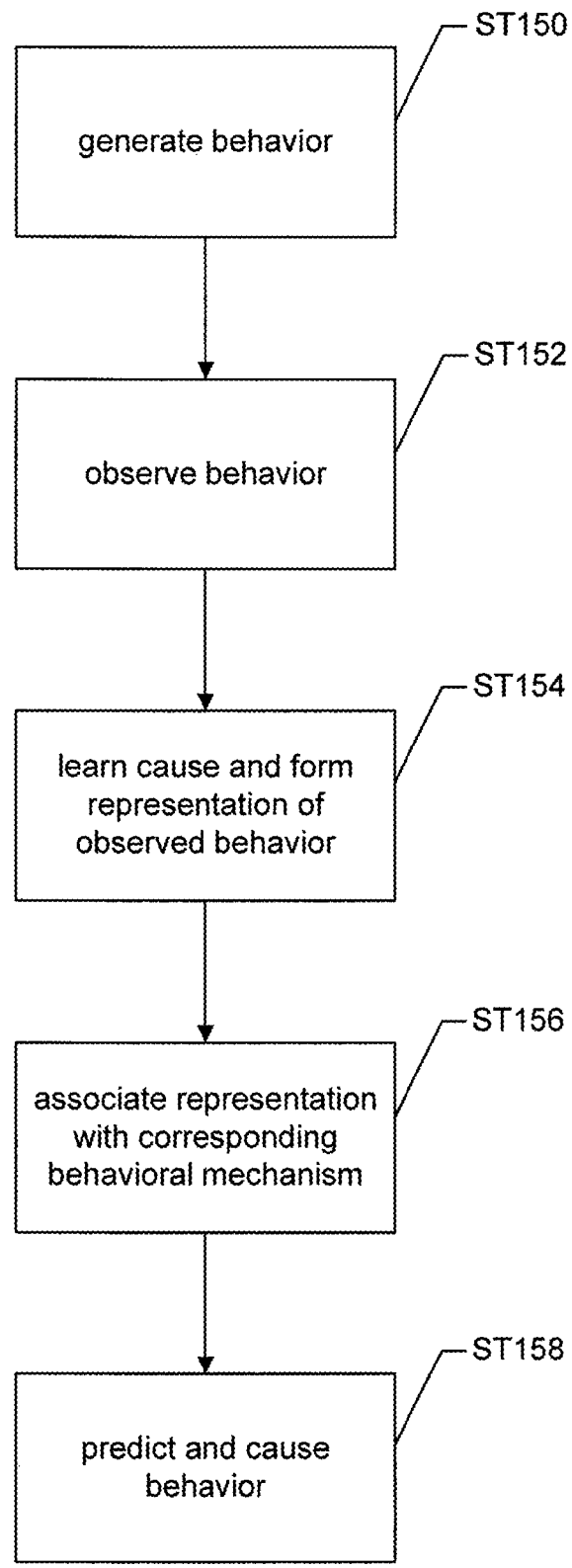
FIG. 15 shows a flow process in accordance with an embodiment of the present invention.

FIG. 15 shows a flow process in accordance with an embodiment of the present invention. In ST150, an HTM-based system generates some sort of behavior. The HTM in the HTM-based system observes the behavior ST152, and subsequently over time, the HTM learns causes and forms representations of the observed behavior ST154. Nodes in lower levels of the HTM learn causes and form representations of smaller parts of the behavior relative to that learned and formed by nodes in higher levels of the HTM. For example, in the context of a robot capable of walking in a human-like way, lower level nodes in the HTM may learn causes and form representations of particular toe or knee movements, whereas larger level nodes in the HTM may learn causes and form representations of entire leg, hip, and torso movements.

Once the HTM learns causes and forms representations of the observed behavior in ST154, each of the nodes in the HTM associates learned causes with corresponding behavioral mechanisms in the HTM-based system ST156. For example, in the context of the robot capable of walking in a human-like way, lower level nodes in the HTM may associate representations of particular toe and knee movements with the mechanisms in the HTM-based system that cause these movements, whereas higher level nodes in the HTM may associate representations of entire leg, hip, and torso movements with the mechanisms in the HTM-based system that cause these larger, or higher-level, movements.

After determining associations between learned behavioral representations and their corresponding behavioral mechanisms in ST156, the HTM, based on information propagated to and/or through the HTM, may predict and cause particular behaviors to occur ST158. Those skilled in the art will note that in such a manner, an HTM may string together complex sequences of learned built-in behaviors to create novel, complex, and/or goal-oriented behavior.

Further, in one or more embodiments of the present invention, an HTM-based system may be controlled so as to switch "off" the ability of an HTM to cause one or more particular behaviors. This may be achieved by use of a control module that is capable of selectively switching "off" or damping particular signals from nodes in the HTM to a motor behavior and control component of the HTM-based system.

Architecture

Figure 16:
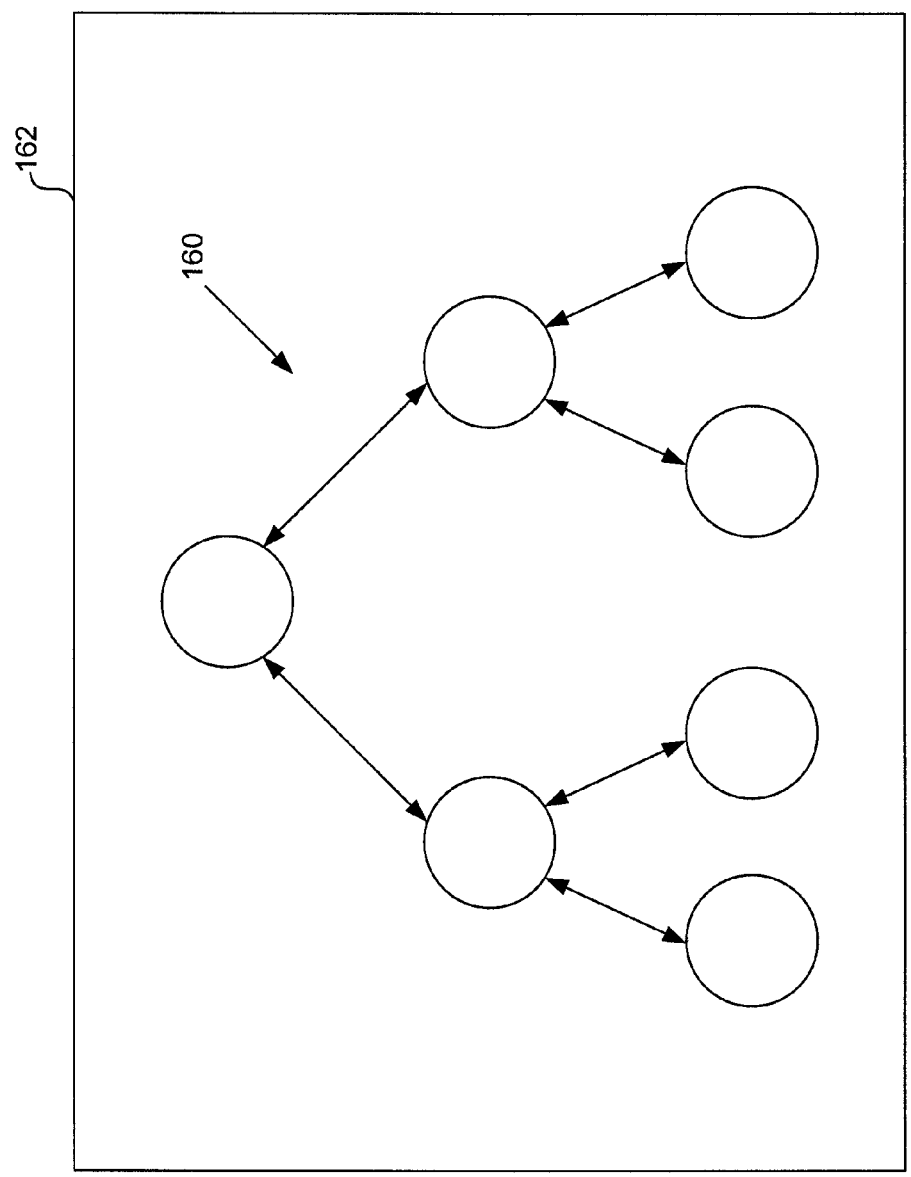
FIG. 16 shows at least a portion of an HTM-based system in accordance with an embodiment of the present invention.

In one or more embodiments of the present invention, at least part of an HTM network may be provided as a software platform. The HTM network may run on various computer architectures. For example, as shown in FIG. 16, an HTM network (nodes shown, but not labeled) 160 may run on a single central processing unit (CPU) 162.

Figure 17:
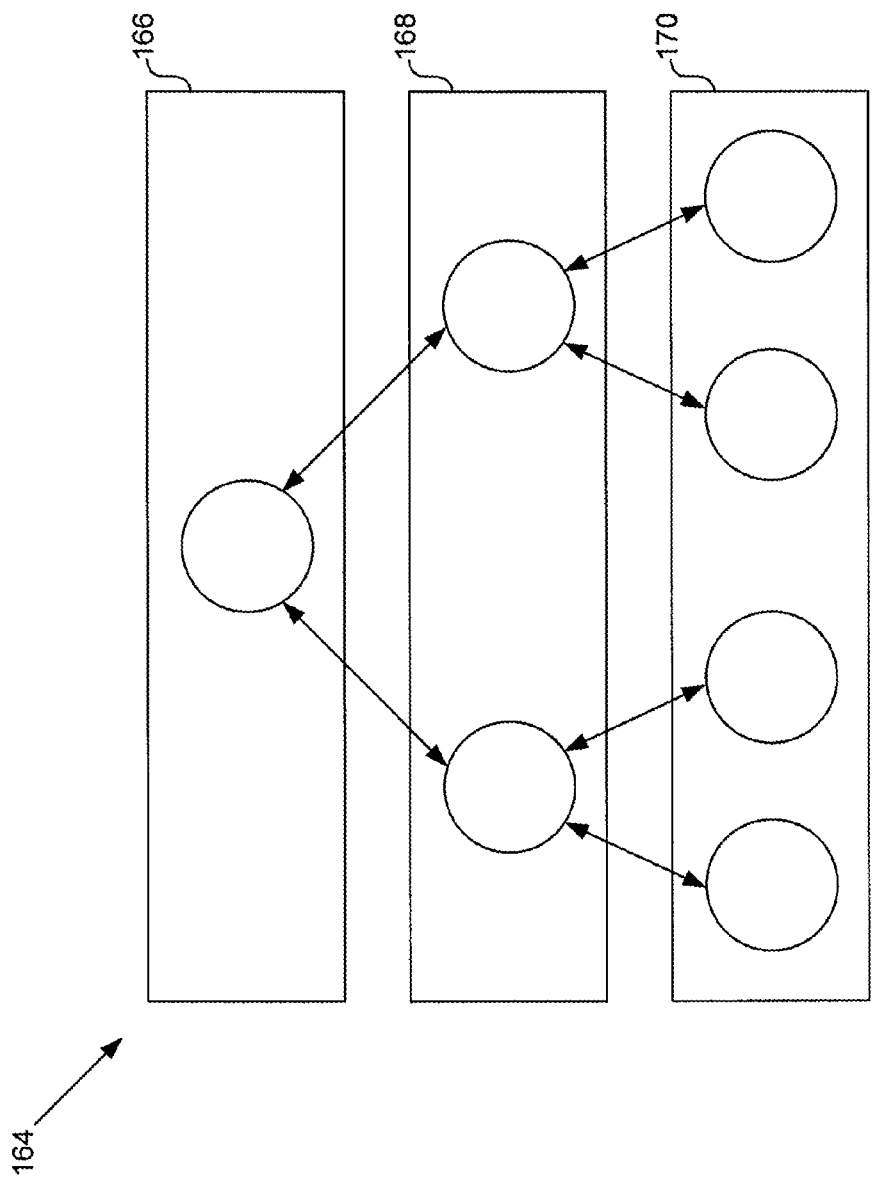
FIG. 17 shows at least a portion of an HTM-based system in accordance with an embodiment of the present invention.

Further, as shown in FIG. 17, in one or more embodiments of the present invention, an HTM network (nodes shown, but not labeled) 164 may run across several CPUs 166, 168, 170.

The CPUs 166, 168, 170 may either be part of a single system (e.g., a single server) or multiple systems. For example, an HTM network may be created in software across several multiprocessor servers, where such a group of servers may be referred to as a "cluster." The servers in a cluster may be heterogeneous, i.e., the servers may have differing configurations/specifications (e.g., clock speeds, memory size, number of processors per server). Further, the servers may be connected via Ethernet or one or more other networking protocols such as, for example, Infiniband, Myrinet, or over a memory bus. Further, the servers may run any operating system (OS) (e.g., Windows, Linux). In general, each of the servers in a cluster may be responsible for running some portion of an HTM network. The portion of the HTM network dedicated to each server may vary from server to server depending on, for example, the configuration/specification of each server.

Further, in one or more embodiments of the present invention, the CPUs over which an HTM network runs may be located at a single location (e.g., at a datacenter) or at locations remote from one another.

Figure 18:
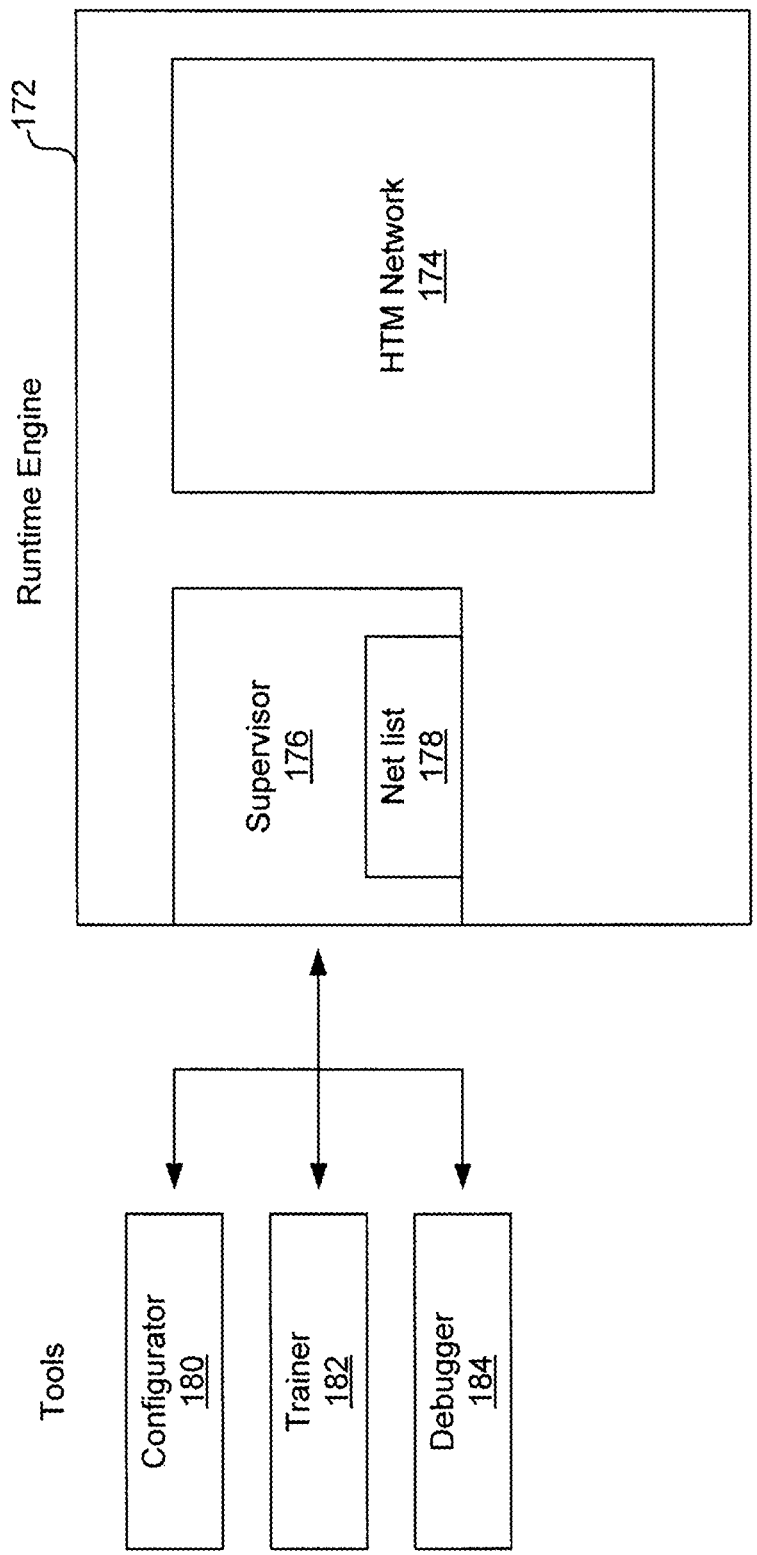
FIG. 18 shows at least a portion of an HTM-based system in accordance with an embodiment of the present invention.

As described above, in one or more embodiments of the present invention, at least part of an HTM network may be provided as a software platform. The software executables for creating and running the HTM network may be referred to as being part of a "runtime engine." As shown in FIG. 18, a runtime engine 172 of an HTM-based system includes, in addition to the executables for running an HTM network 174, a Supervisor entity 176. In one or more embodiments of the present invention, the Supervisor entity 176 is responsible for, among other things, starting and stopping the HTM network 174 and communicating with external applications (i.e., "tools") 180, 182, 184, each of which are further described below. However, although the Supervisor entity 176 may be used to start and stop the HTM network 174, it may not be necessary for the Supervisor entity 176 to be running while the HTM network 174 is in operation.

As shown in FIG. 18, the Supervisor entity 176 is associated with a net list 178. The Supervisor entity 176 uses a description in the net list 178 to configure the HTM network 174. For example, a description in the net list 178 may specify the distribution of nodes across a given set of CPUs. However, in one or more other embodiments of the present invention, the Supervisor entity 176 may configure an HTM network dynamically if, for example, certain information is not contained in the net list 178. Further, in one or more embodiments of the present invention, the Supervisor entity 176 may read a net list from a date file. Further, in one or more embodiments of the present invention, a net list may be specified interactively by a user using one or more tools 180, 182, 184.

Further, in one or more embodiments of the present invention, the Supervisor entity 176 may perform global network actions, distribute nodes across CPUs, and/or coordinate CPU activity/behavior. Further, in one or more embodiments of the present invention, the Supervisor entity 176 may enforce licensing restrictions such as those relating to, for example, the number of usable CPUs, license expiration dates, number of user limitations, and/or the ability to load third-party "plug-ins."

Further, in one or more embodiments of the present invention, the Supervisor entity 176 may check for software updates on some regular basis. In such embodiments, if there is a software update available, the Supervisor entity 176 may, for example, install the software update and restart the HTM network 174. Further, in one or more embodiments of the present invention, the Supervisor entity 176 may determine and/or select the order in which portions of the HTM network 174 are to be updated.

Further, in one or more embodiments of the present invention, the Supervisor entity 176 may communicate with one or more CPUs (not shown in FIG. 18) running the HTM network 174 using, for example, a private or internal application program interface (API). Further, in one or more embodiments of the present invention, the Supervisor entity 176 and the one or more CPUs (not shown in FIG. 18) running the HTM network 174 may all be on the same local area network (LAN).

Further, in one or more embodiments of the present invention, the Supervisor entity 176 may run on a CPU separate from one or more CPUs (not shown in FIG. 18) running the HTM network 174. However, in one or more other embodiments of the present invention, the Supervisor entity 176 may run on a CPU that runs all or part of the HTM network 174.

Figure 19:
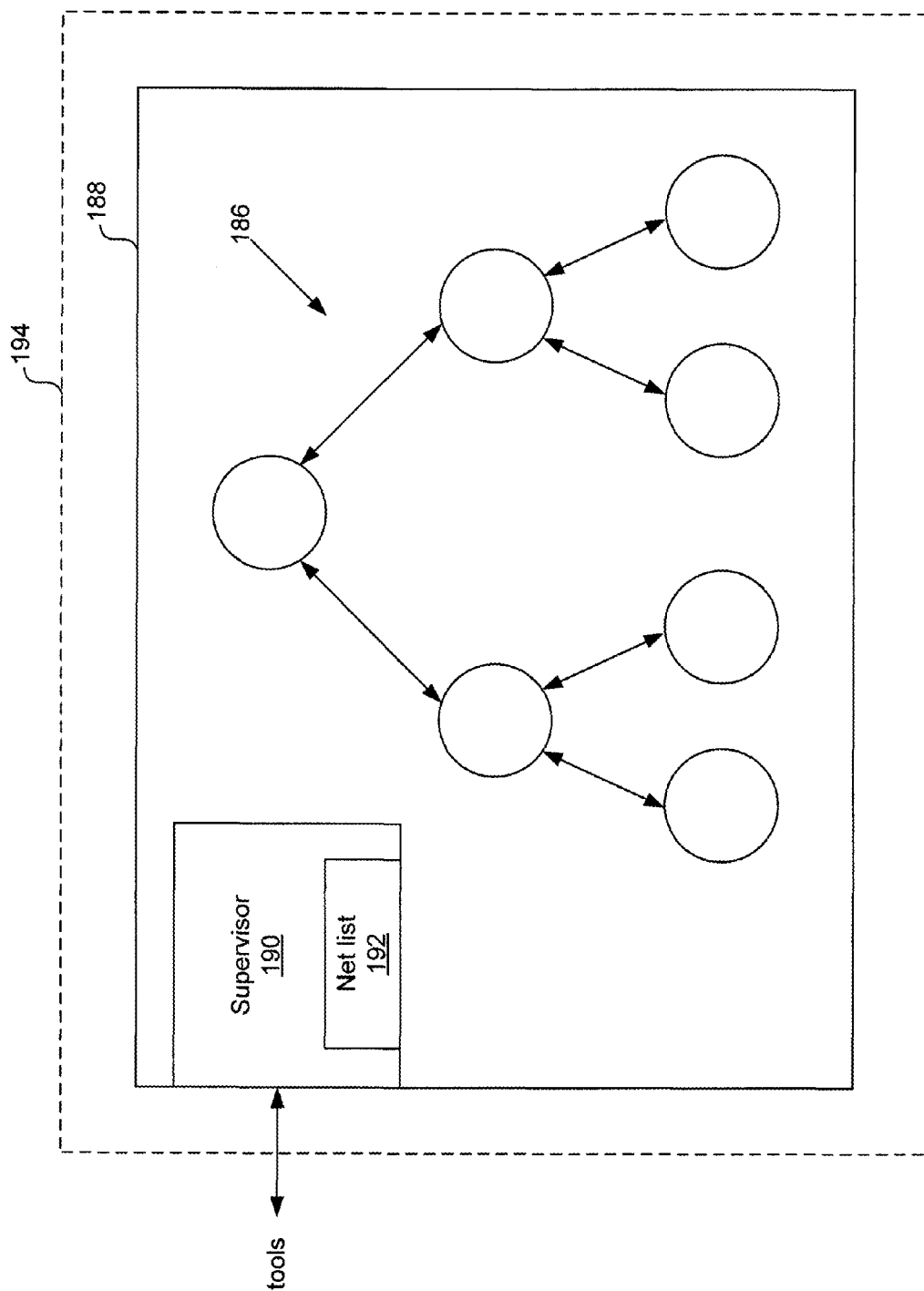
FIG. 19 shows at least a portion of an HTM-based system in accordance with an embodiment of the present invention.

FIG. 19 shows at least a portion of an HTM-based system that runs an HTM network 186 on a single CPU 188. In such embodiments of the present invention, an instance of Supervisor entity 190, along with a net list 192, may run on CPU 188. Further, as shown in FIG. 19, a runtime engine 194 may be composed of the software executables for the HTM network 186, the Supervisor entity 190, and the net list 192.

Figure 20:
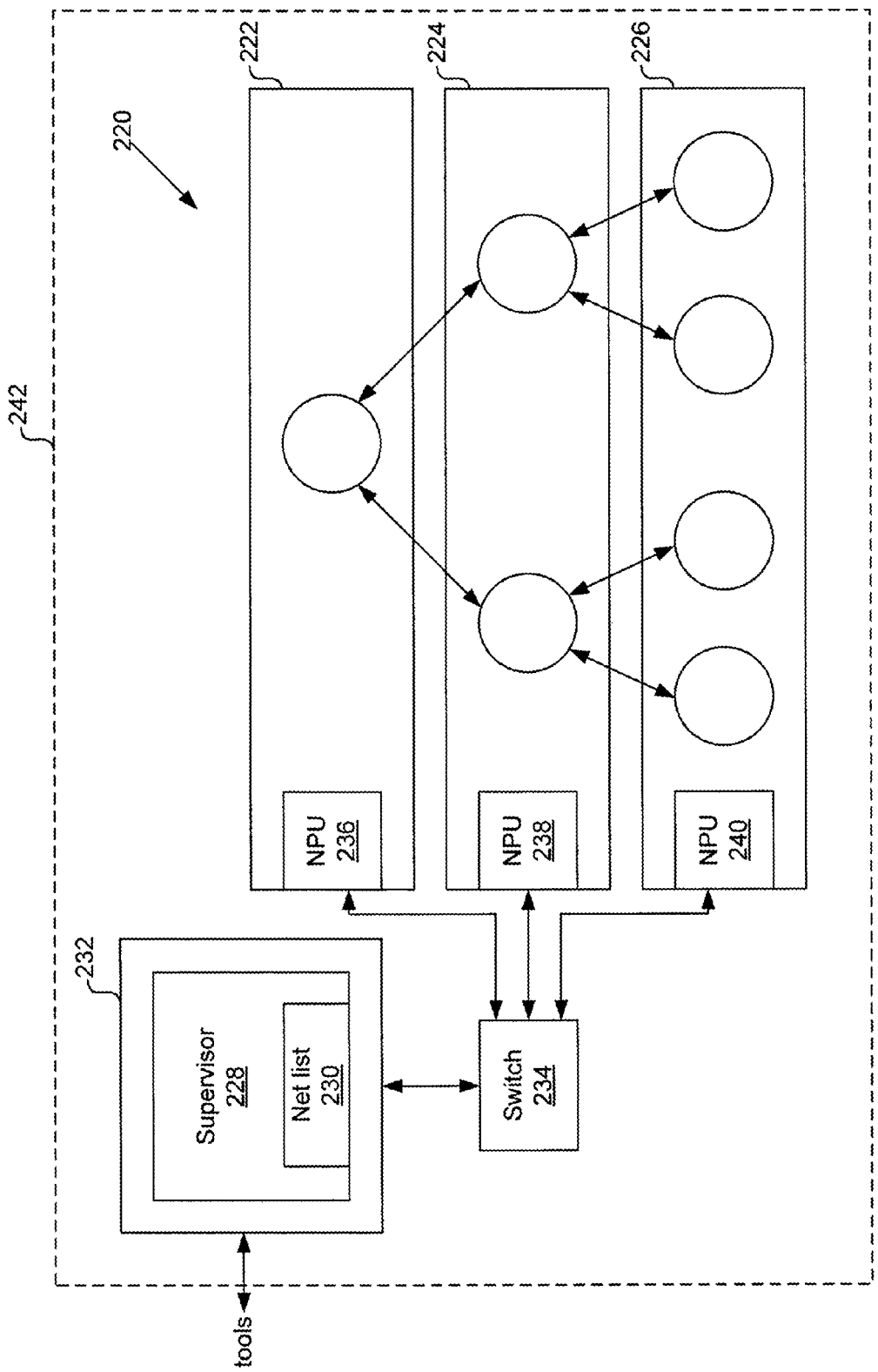
FIG. 20 shows at least a portion of an HTM-based system in accordance with an embodiment of the present invention.

FIG. 20 shows at least a portion of an HTM-based system that runs an HTM network 220 on multiple CPUs 222, 224, 226. The CPUs 222, 224, 226 may all be part of the same server (thereby, sharing resources of that server) or they may be distributed over two or more servers. An instance of Supervisor entity 228, along with a net list 230, may run on a separate CPU 232. In such embodiments of the present invention, the Supervisor entity 228 may communicate (across, for example, a switch 234) with instances of "node processing units" (NPUs) 236, 238, 240 running on each of the CPUs 222, 224, 226. Each NPU 236, 238, 240 may be a software component that is responsible for running and/or scheduling a portion (i.e., a "sub-net") of the HTM network 220 running on the CPU 222, 224, 226 to which the NPU 236, 238, 240 is respectively allocated. At an initial stage, each NPU 236, 238, 240 may receive information from the Supervisor entity 228 describing all or part of the HTM network 220, including information relating to the portion of the HTM network 220 that each NPU 236, 238, 240 will manage. Further, each NPU 236, 238, 240 may be responsible for allocating the memory needed for the nodes, links, and other data structures for the portion of the HTM network 220 for which it is responsible. Further, each NPU 236, 238, 240 may run and/or schedule a portion of the HTM network 220 in some timing relation to at least one other NPU 236, 238, 240.

Further, in one or more embodiments of the present invention, each NPU 236, 238, 240 may maintain a local net list. A local net list may be used by an NPU to determine when to update one or more nodes, where "updating" a node may include executing an operation of the node and then updating the state of the node. An NPU may perform such updating based on, for example, one or more timestamps of previous updates of one or more nodes, one or more values (e.g., beliefs) of one or more nodes, priorities of one or more nodes, and/or a set of rules for updating nodes.

Further, as shown in FIG. 20, a runtime engine 242 may be composed of the software executables for the HTM network 220, the Supervisor entity 228, the net list 230, and the NPUs 236, 238, 240. Moreover, a file server (not shown) may be present to store file information for one or more of the various components shown in FIG. 20.

Further, as shown, for example, in FIG. 20, there is one NPU per CPU running a portion of an HTM network. However, in one or more other embodiments of the present invention, there may be a different relationship as to the number of NPUs allocated per CPU.

As described above with reference to FIG. 18 (also shown in FIGS. 19 and 20), a runtime engine 1720 running HTM network 174 may interface with one or more tools 180, 182, 184. Each of these tools 180, 182, 184 may be used by a user (e.g., a software developer) to, for example, modify, improve, augment, restrict, configure, or otherwise affect an operation or configuration of the HTM network 174 or a CPU on which the HTM network 174 runs. Generally, in one or more embodiments of the present invention, Configurator tool 180 may be used to create and/or configure an HTM network, Trainer tool 182 may be used to create a trained HTM network for a particular application, and/or Debugger tool 184 may be used to debug the operation of an HTM network. Further, in one or more embodiments of the present invention, tools (not shown) may be provided to, for example, monitor/report performance of an HTM network and/or deploy a designed, trained, and/or debugged HTM network as a running application. In general, one or more embodiments of the present invention may use any number and/or types of different tools to interface with an HTM network.

In one or more embodiments of the present invention, a Supervisor entity (e.g., 176 in FIG. 18, 190 in FIG. 19, 228 in FIG. 20) may communicate with developer/client tools (e.g., 180, 182, 184 in FIG. 18) using a designated Supervisor API. In one or more embodiments of the present invention, the Supervisor API may support Unicode and/or multi-byte character sets.

Because the developer/client tools may reside at, or otherwise be accessible from, locations remote from a location running a particular HTM network, a Supervisor API may be accessible through, for example, a firewall. One protocol that may be used to facilitate such accessibility involves encoding messages in Extensible Markup Language (XML) and passing them over the Internet (i.e., HTTP transmission). If security is desired or required, then messages may be passed over a secure Internet protocol (e.g., HTTPS transmission). Further, in one or more embodiments of the present invention, if a Supervisor entity (e.g., 176 in FIG. 18, 190 in FIG. 19, 228 in FIG. 20) and developer/client tools (e.g., 180, 182, 184 in FIG. 18) are on the same LAN, messages may be passed using means such as, for example, socket connections and/or pipes.

As described above, a Supervisor API may interact with developer/client tools. In one or more embodiments of the present invention, the Supervisor API may be used to authenticate one or more client applications attempting to communicate with a Supervisor entity (e.g., 176 in FIG. 18, 190 in FIG. 19, 228 in FIG. 20). If the client is authenticated, the Supervisor API may return session information to the client and connect the client with the Supervisor entity. The Supervisor API may also disconnect the client from the Supervisor entity.

Further, in one or more embodiments of the present invention, a net list describing all or part of an HTM network may be passed from a client to a Supervisor entity through a Supervisor API. Further, a Supervisor API may be used to return state information to the client. State information may include, for example, the beliefs at one or more nodes of the HTM network, whether the HTM network is running, paused, or restarting, the number of nodes in all or part of the HTM network, and the number of CPUs actively running portions of the HTM network. Further, a Supervisor API may be accessed to start, pause and restart, or stop an HTM network.

Further, in one or more embodiments of the present invention, a Supervisor API may be accessed to: return a list of network files that have been stored by a system (e.g., a cluster of servers) used to run an HTM network; load an HTM network from a network file stored locally in a system (e.g., a cluster of servers) usable to run an HTM network; locally save a state of an HTM network in a system (e.g., a cluster of servers) running the HTM network; move one or more nodes from running on one CPU to running on another CPU; turn a debugging feature "on" or "off"; retrieve detailed state information of a component in an HTM network; set a state of a component in an HTM network; instruct an HTM network to pause operations after a specific triggering event, where the triggering event may be completion of one complete iteration of the HTM network, completion of updating a given list of nodes, completion of updating one node on each CPU, reaching a particular time, reaching a particular node value, and/or an occurrence of an error; retrieve statistics regarding operation of an HTM network; request storage of historical data regarding an HTM network; retrieve stored historical data regarding an HTM network; retrieve messages from an event log that, for example, occurred during a particular time frame; execute an OS command; reboot a set of servers used to run an HTM network; and/or request the triggering of an alarm if certain conditions are met.

Further, in one or more embodiments of the present invention, a Supervisory API may have a "batch command" system. In one or more embodiments of the present invention, a batch command system may be used to execute one or more operations of a Supervisor API in a particular sequence. Further, in one or more embodiments of the present invention, a batch command system may be used to execute one or more of the same commands on more than one node. Further, in one or more embodiments of the present invention, a batch command system may include the capabilities of a full scripting language (e.g., Python, Perl) so that, for example, 'if' statements and loops may be performed easily. Those skilled in the art will note that the use of a full scripting language may allow a user to script complex commands (e.g., commands: train level 1 of hierarchy until states of level 1 nodes reach a given condition; then turn "off" learning in level 1 and train level 2 of hierarchy until states of level 2 nodes reach a given condition, etc.).

Further, in one or more embodiments of the present invention, the Supervisor API may be arranged to handle a failure of any of the hardware components needed to run a particular HTM network. Further, in one or more embodiments of the present invention, the Supervisor API may handle a software failure (e.g., failure of an NPU instance). Further, in one or more embodiments of the present invention, the Supervisor API may handle a communication establishment error. Further, in one or more embodiments of the present invention, the Supervisor API may handle one or more errors in reading a provided net list describing a particular HTM network.

Figure 21:
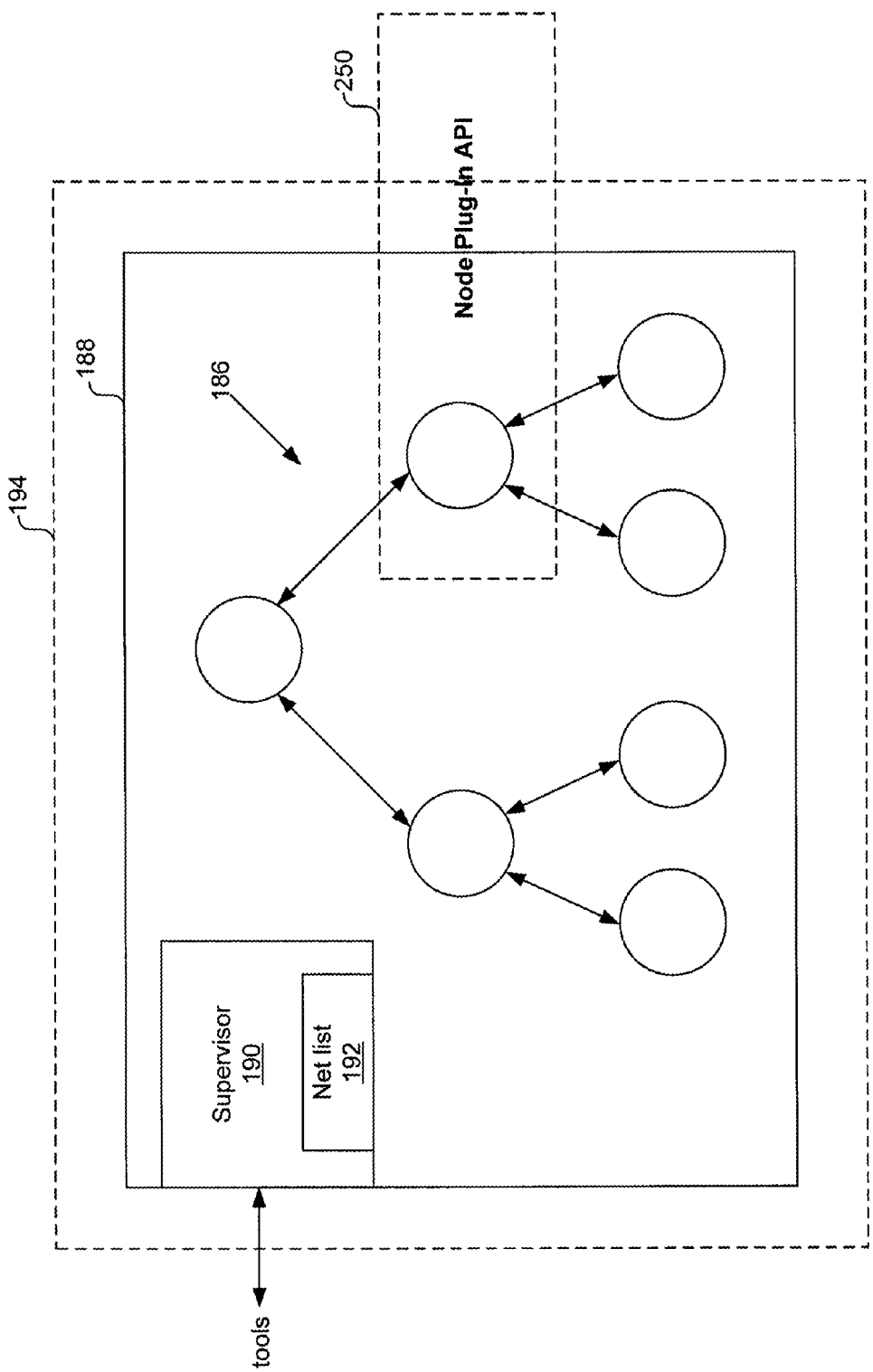
FIG. 21 shows at least a portion of an HTM-based system in accordance with an embodiment of the present invention.

In addition to the Supervisor API, an HTM-based system may also have a Node Plug-in API 250 as shown in FIG. 21. In FIG. 21 (elements labeled similarly to that shown in FIG. 19), the Node Plug-in API 250 may be used to create new node types. For example, the Node Plug-in API 250 may be used to interface new hardware for running the HTM network 186 and/or implement, for example, new learning algorithms. In one or more embodiments of the present invention, using the Node Plug-in API 250, one or more "plug-ins" may be dynamically loaded when the HTM network 186 is initialized or rebooted. In such a manner, a functionality of a runtime engine running the HTM network 186 may be extended as further described below.

Extensibility

As described above, in one or more embodiments of the present invention, an HTM network may be provided as a software platform. To enable the HTM network to be usable in various different domains and/or modifiable by various entities (e.g., software developers, client or user-level applications), the functionality of all or part of the HTM may be "extensible." Those skilled in the art will note that the term "extensible" in the context of software describes a software entity (e.g., a computer program, a programming language, a routine) that can have its capabilities "extended" (e.g., changed, augmented).

In one or more embodiments of the present invention, extensibility may be afforded to an HTM network by having abstract interfaces for one or more of the components of the HTM network. For example, in one or more embodiments of the present invention, an abstract interface for a component of an HTM network may be implemented using a base class if using object-oriented programming (e.g., C++, Java® (developed by Sun Microsystems, Inc. of Santa Clara, Calif.)) to implement the HTM network. Those skilled in the art will note that a base class in object-oriented programming is a class from which other classes (e.g., subclasses, child classes, derived classes) inherit members. Further, those skilled in the art will note that a base class may also be referred to as a "superclass" or "parent" class.

Figure 22:
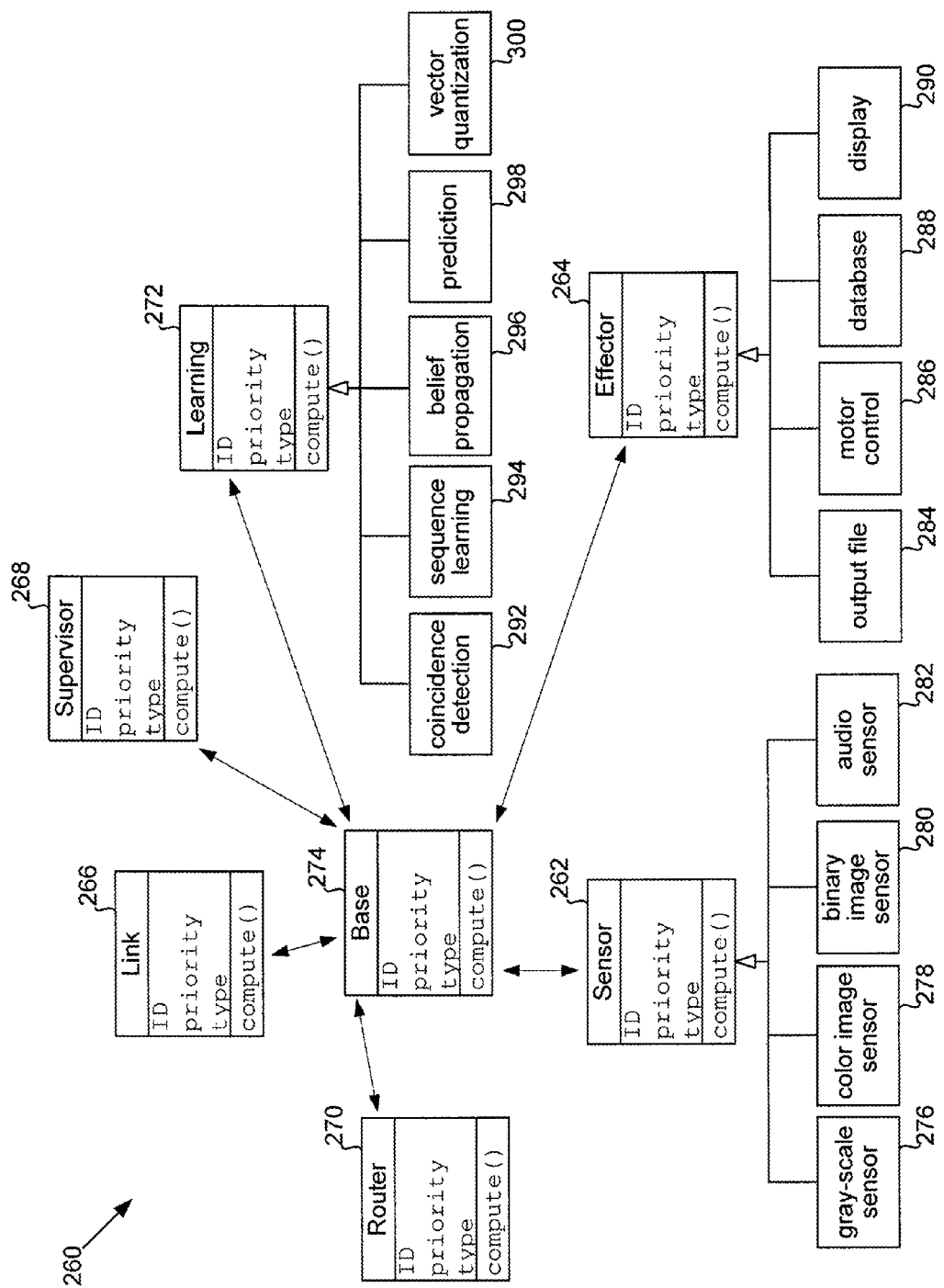
FIG. 22 shows an inheritance diagram in accordance with an embodiment of the present invention.

FIG. 22 shows an inheritance diagram of an HTM network 260 in accordance with an embodiment of the present invention. In general, the HTM network 260 is formed of one or more "entities," where each entity defines an interface that is implemented through instantiation in order to render that entity extensible. In one or more embodiments of the present invention, the collection of entities in the HTM network 260 may be specified by a net list that is part of a software file that defines and is used to implement the HTM network 260. Once instantiated, the entities specified in the net list may communicate in some synchronized fashion and collaborate to perform some collective computation of the HTM network 260.

The HTM network 260 shown in FIG. 22 has a Base entity 274 that links the following named entities, each of which is further described below: Sensor 262; Effector 264; Link 266; Supervisor 268; Router 270; and Learning and Inference/Prediction Algorithm 272 (shown in FIG. 3 as "Learning"). Each of the entities 262, 264, 266, 268, 270, 272, 274 is an abstract interface implemented using a base class as described above.

As shown in FIG. 22, each entity 262, 264, 266, 268, 270, 272, 274 has ID, priority, and type attributes. The ID attribute identifies each entity. This attribute may not only identify an entity, but may also be used to indicate a specific CPU, set of CPUs, or machine on which to run the entity. The priority attribute denotes a priority, in terms of processing order, of an entity. The type attribute indicates a type of the entity. Further, as shown in FIG. 22, each entity 262, 264, 266, 268, 270, 272, 274 has a compute ( ) method, which is invocable (by, for example, a subclass of the base class entity) to perform some computation.

Further, although FIG. 22 shows a particular number and types of entities, in one or more other embodiments of the present invention, an HTM network may have a different number and/or one or more types of entities different than that shown in FIG. 22. For example, in one or more embodiments of the present invention, an HTM network may not have an Effector entity.

In one or more embodiments of the present invention, software executables for running an HTM network may run at the level of Base entity 274. In other words, Base entity 274 may be thought of as working at the level of a net list containing the description of the HTM network. In such a manner, a user-level application for creating, running, designing, debugging, training, modifying, and/or otherwise using an HTM network may simply interface with Base entity 274 without having to "know" about, for example, one or more of the other entities 262, 264, 266, 268, 270, 272 shown in FIG. 22.

In one or more embodiments of the present invention, Sensor entity 262 specializes in handling inputs sensed by the HTM network 260, where causes of the inputs exist in the domain in which the HTM network 260 is implemented. Those skilled in the art will note that there may any number of Sensor entities 262 in a net list defining the HTM network 260. The exact behavior of Sensor entity 262 (implemented as a base class) is extensible through the modification or addition of one or more subclasses. For example, as shown in FIG. 22, Sensor entity 262 has the following subclasses: a grayscale sensor subclass 276; a color image sensor subclass 278; a binary image sensor subclass 280; and an audio sensor subclass 282. Each of these subclasses 276, 278, 280, 282 contains functionality specific to the type of each subclass 276, 278, 280, 282. In other words, Sensor entity 262 may have no "knowledge" of the specific functionalities performed by each of its subclasses 276, 278, 280, 282. Further, although FIG. 22 shows a particular number and types of subclasses, in one or more other embodiments of the present invention, any number and/or types of subclasses may be used.

In one or more embodiments of the present invention, Effector entity 264 specializes in passing back outputs from the HTM network 260. Those skilled in the art will note that there may be any number of Effector entities 264 in a net list defining the HTM network 260. The exact behavior of Effector entity 264 (implemented as a base class) is extensible through the modification or addition of one or more subclasses. For example, as shown in FIG. 22, Effector entity 264 has the following subclasses: an output file subclass 284; a motor control subclass 286; a database subclass 288; and a display subclass 290. Each of these subclasses 284, 286, 288, 290 contains functionality specific to the type of each subclass 284, 286, 288, 290. In other words, Effector entity 264 may have no "knowledge" of the specific functionalities performed by each of its subclasses 284, 286, 288, 290. Further, although FIG. 22 shows a particular number and types of subclasses, in one or more other embodiments of the present invention, any number and/or types of subclasses may be used.

In one or more embodiments of the present invention, Link entity 266 specializes in efficient message passing between particular entities. Those skilled in the art will note that there may be any number of Link entities 266 in a net list defining the HTM network 260. The exact behavior of Link entity 266 (implemented as a base class) is extensible through the modification or addition of one or more subclasses.

In one or more embodiments of the present invention, Supervisor entity 268 orchestrates the collective computation of the HTM network 260. Those skilled in the art will note that for a normal application, there may be only one Supervisor entity 268 in a net list defining the HTM network 260. The exact behavior of Supervisor entity 268 (implemented as a base class) is extensible through the modification or addition of one or more subclasses.

In one or more embodiments of the present invention, Router entity 270 specializes in accurately coordinating the passing of messages among the entities in an HTM network 260. Those skilled in the art will note that there may be a Router entity 270 for each computing entity (e.g., CPU) over which the HTM network 260 is running. The exact behavior of Router entity 270 (implemented as a base class) is extensible through the modification or addition of one or more subclasses.

In one or more embodiments of the present invention, Learning and Inference/Prediction entity 272 specializes in discovering and inferring causes of sensed input patterns as described above. Those skilled in the art will note that there may be any number of Learning and Inference/Prediction entities 272 in a net list defining the HTM network 260. The exact behavior of Learning and Inference/Prediction entity 272 (implemented as a base class) is extensible through the modification or addition of one or more subclasses. For example, as shown in FIG. 22, Learning and Inference/Prediction entity 272 has the following subclasses: a coincidence detection subclass 292; a sequence learning subclass 294; a belief propagation subclass 296; a prediction subclass 298; and a vector quantization subclass 300. Each of these subclasses 292, 294, 296, 298, 300 contains functionality specific to the type of each subclass 292, 294, 296, 298, 300. In other words, Learning and Inference/Prediction entity 272 may have no "knowledge" of the specific functionalities performed by each of its subclasses 292, 294, 296, 298, 300. Further, although FIG. 22 shows a particular number and types of subclasses, in one or more other embodiments of the present invention, any number and/or types of subclasses may be used.

Figure 23:
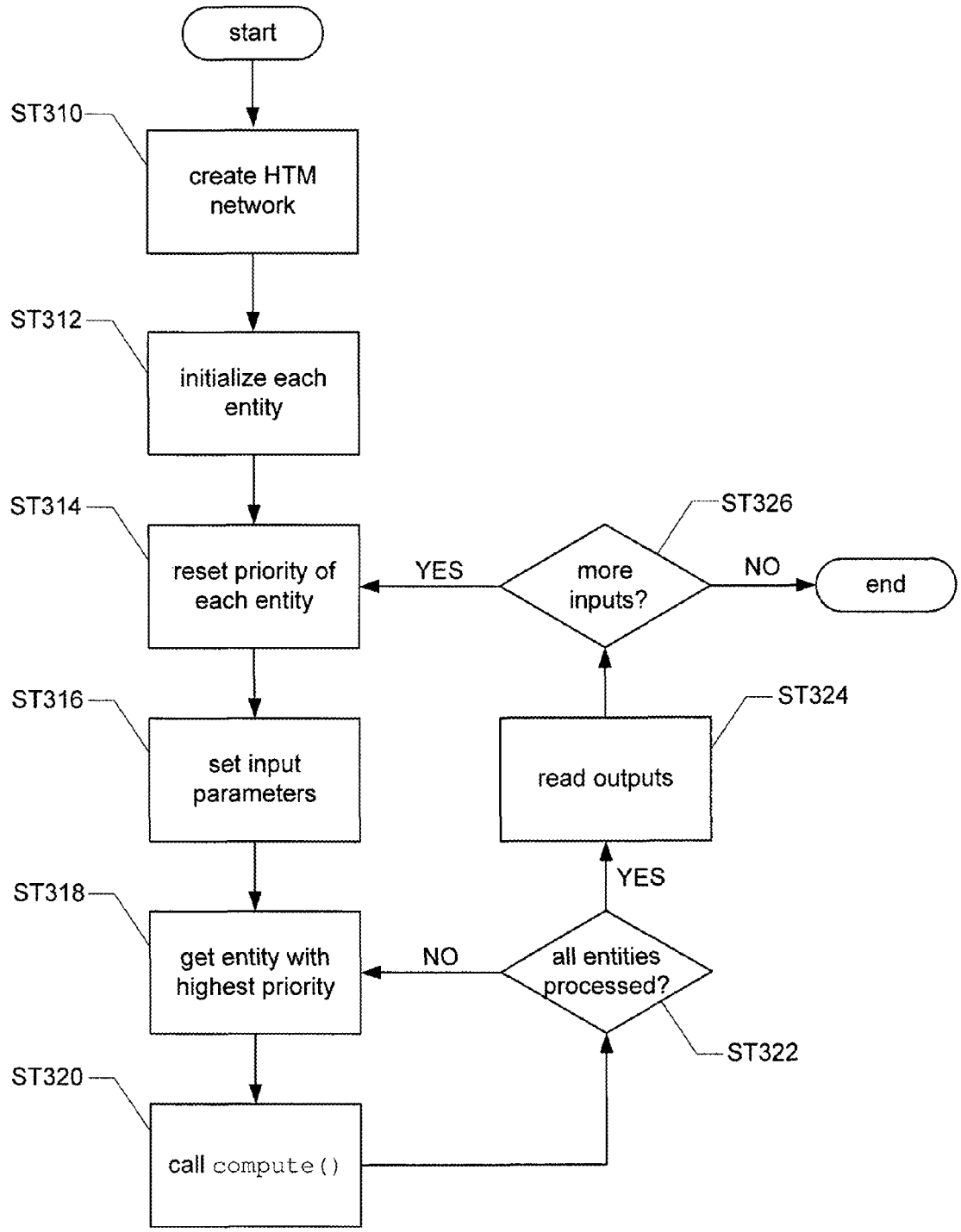
FIG. 23 shows a flow process in accordance with an embodiment of the present invention.

In one or more embodiments of the present invention, when HTM network 260 is running, an "outer" process may be running to "orchestrate" the operation of the HTM network 260. FIG. 23 shows a flow process in accordance with an embodiment of the present invention. Particularly, FIG. 23 shows a technique for traversing an HTM network. To provide further context, as described above, an HTM network may have several entities that are extensible. During operation of the HTM network, (i) various entities may attempt to extend one or more entities of the HTM network and (ii) various entities will need to be processed. Thus, one or more embodiments of the present invention provide a mechanism for traversing the HTM network in some desirable manner with consideration to, for example, the priority and timing of particular entities.

In FIG. 23, initially, an HTM network is created ST310. This may be achieved by reading in a net list defining the HTM network. In one or more other embodiments of the present invention, the HTM network may be created programmatically. Once the HTM network itself has been created in ST310, each entity in the HTM network is initialized (and stored in memory) ST312.

Then, the priority of each entity may be optionally reset (noting that the priorities of each entity may already be reset immediately after initialization in ST312) ST314. Thereafter, the input parameters to the HTM network are set ST316. Then, the entity with the highest priority is determined ST318 and its compute( ) method is invoked ST320. Determining the entity with the highest priority may be dependent on one or more different factors. For example, in some cases, a priority level of an entity may be used to determine the priority of that entity relative to other entities. However, in other cases, a timing of an entity may be used to determine the priority of that entity relative to other entities. For example, if a compute ( ) method of a particular entity has to be invoked every x milliseconds, then at time intervals of x milliseconds, that particular entity has the highest priority regardless of the priority levels of other entities. More particularly, for example, a sensor may be connected to a camera that needs to process a live image ever 33 milliseconds. In this case, a compute ( )method for the sensor may be invoked every 33 milliseconds regardless of the priority levels of other active entities. Those skilled in the art will note that in such a manner, an HTM network may run in real-time.

Once all the entities in the HTM network have been processed ST322, the outputs of the HTM network are read ST324. If more inputs remain ST326, then the process repeats optionally starting at ST314 (otherwise repeating starting at ST316 (not shown)).

Further, in one or more embodiments of the present invention, the process described above with reference to FIG. 23 may be performed by or under the direction of, for example, Supervisor entity 268 shown in FIG. 22. In one or more embodiments of the present invention, Supervisor entity 268 may be "subclassed" if a different traversal mechanism is desired.

An HTM network, as described above with reference to FIG. 22, enables, for example, a software developer, to "extend" the capabilities of the HTM network through the replacement and/or addition of subclasses. Moreover, with proper permission, a user may also modify the entity base classes in the net list defining the HTM network.

Figure 24:
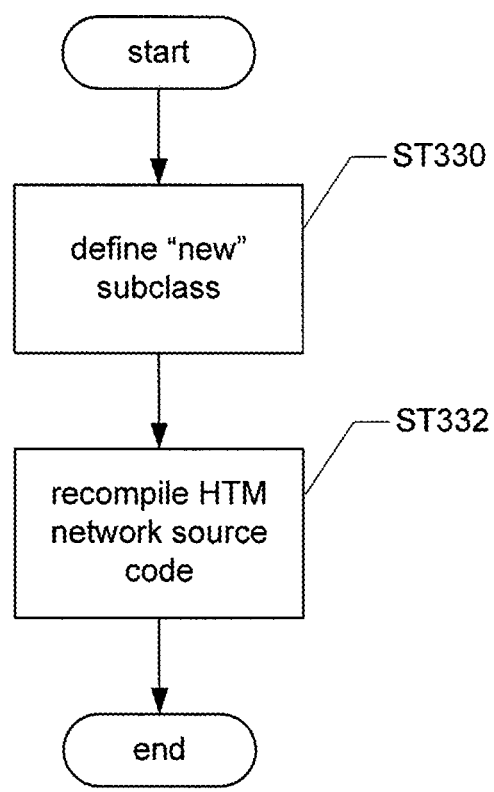
FIG. 24 shows a flow process in accordance with an embodiment of the present invention.

FIG. 24 shows a flow process in accordance with an embodiment of the present invention. Particularly, FIG. 24 shows how a user may extend an HTM network. Initially, a user may define/write a subclass for extending the HTM network in some way ST330. This subclass would include, for example, a compute( ) method. Then, the source code for the HTM network may be recompiled ST332, thereby creating a new HTM network with the newly defined subclass.

Figure 25:
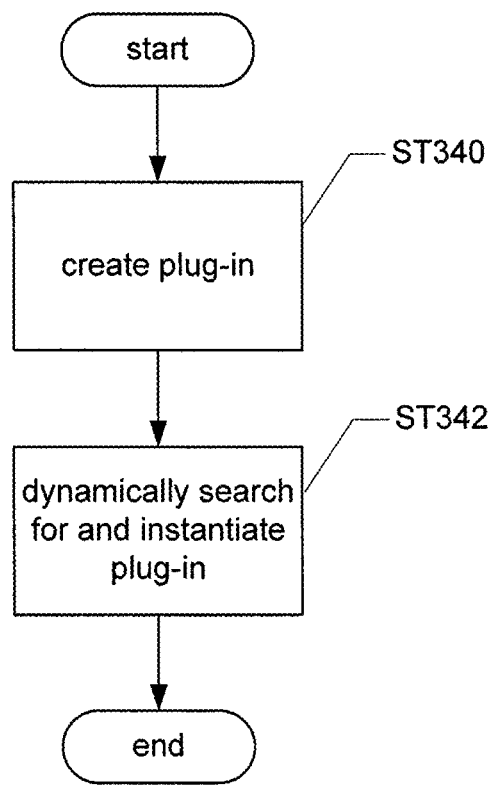
FIG. 25 shows a flow process in accordance with an embodiment of the present invention.

In some cases, however, it may not be desirable to recompile and/or provide access to the source code for an entire HTM network. Accordingly, FIG. 25 shows a flow process for another way to extend an HTM network. Initially, a user creates a dynamic library as a plug-in, i.e., the new or modified subclass for the HTM network ST340. Then, the user links, i.e., references in code, the plug-in to the HTM network using a plug-in interface/mechanism (e.g., Node Plug-in Interface 250 shown in FIG. 21) of the HTM network (step not shown). This linking may be dependent on binary code of the HTM network provided to the user. Thereafter, at start-up or while running, the HTM network may dynamically search for and then instantiate the plug-in ST342. Those skilled in the art will note that in such a manner, the HTM network is extended without having to recompile the source code for the entire HTM network.

Message Passing

As described above, the operation of an HTM network may be executed across a cluster of one or more servers. As further described above, in one or more embodiments of the present invention, NPUs manage the operation of nodes forming the HTM network. Each NPU is responsible for managing a certain set of one or more nodes. As further described below with reference to FIG. 26, one or more "message managers" may be instantiated/implemented to facilitate the propagation of messages within a particular server and/or among two or more servers.

Figure 26:
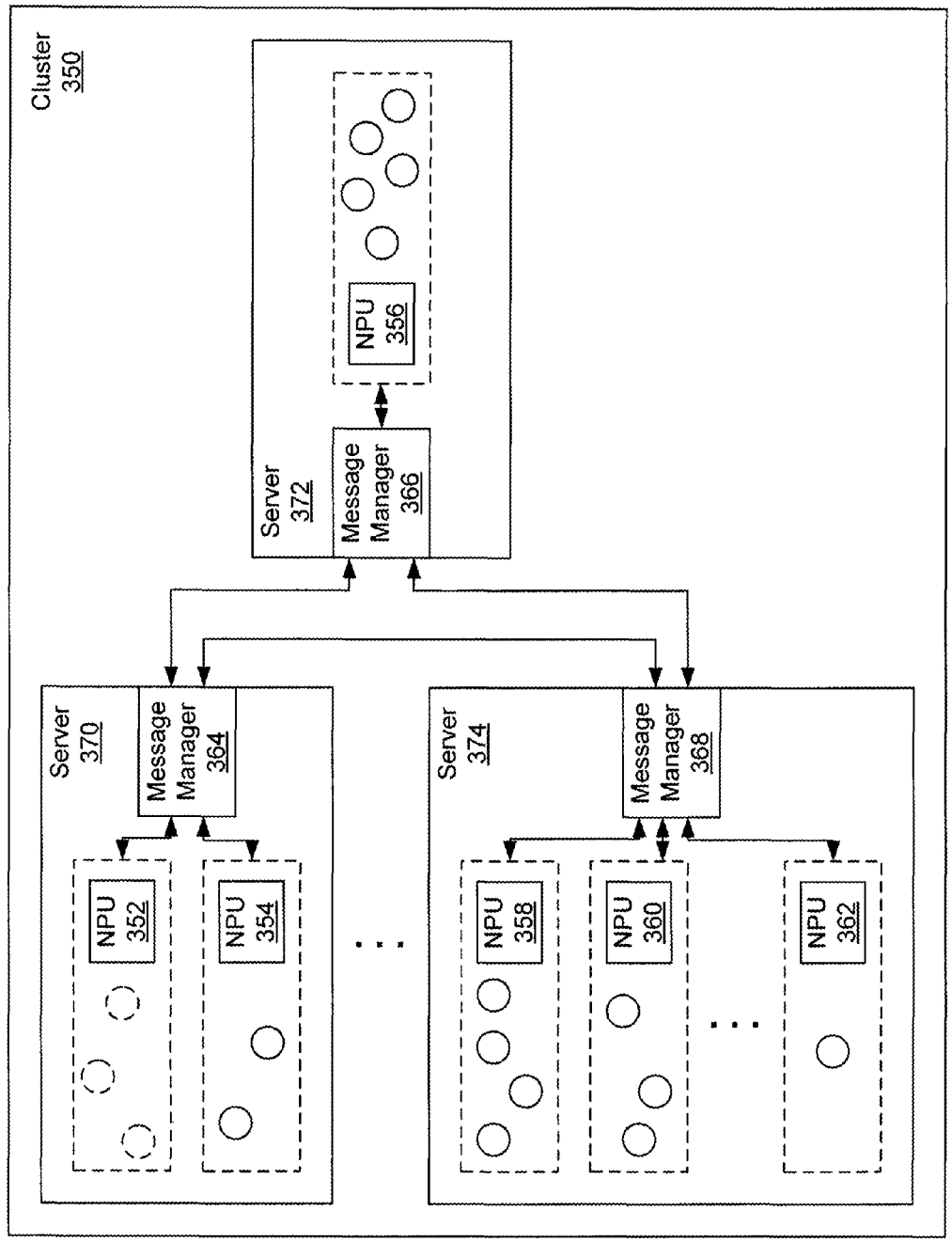
FIG. 26 shows at least a portion of an HTM-based system in accordance with an embodiment of the present invention.

In FIG. 26, a cluster 350 is formed, at least in part, of servers 370, 372, 374. NPUs 352, 354 are assigned to server 370, NPU 356 is assigned to server 372, and NPUs 358, 360, 362 are assigned to server 372. Further, as shown in FIG. 26, each NPU 350, 352, 354, 356, 358, 360, 362 manages its own set of one or more nodes (shown, but not labeled), where the nodes collectively form all or part of an HTM network. Further, in one or more embodiments of the present invention, one or more of NPUs 350, 352, 354, 356, 358, 360, 362 may be assigned (by, for example, an OS scheduler or a user) to run on particular CPUs. In such embodiments, the nodes of a particular NPU may be run by the CPU to which that particular NPU is assigned. Further, in one or more embodiments of the present invention, an NPU assigned to a particular CPU may be dynamically switched to run on a different CPU.

Further, those skilled in the art will note that although FIG. 26 shows particular numbers of NPUs, servers, NPUs per server, total nodes, nodes per server, and nodes per NPU, in one or more other embodiments of the present invention, any configuration of servers, NPUs, and nodes may be used.

As described above, nodes in an HTM network output data (e.g., beliefs, matrices of values). Still referring to FIG. 26, in one or more embodiments of the present invention, the propagation of such data as messages between nodes, whether part of the same server or different servers, may be handled by one or more message managers 364, 366, 368. For example, when a node managed by NPU 354 outputs a belief, the belief is made available to message manager 364 (the availability of the belief may be notified to message manager 364 by NPU 354), which, based on information as to the source of the output belief and the topology of the HTM network running on cluster 350, sends the belief as part of a message to each appropriate destination server (e.g., server 372). An "appropriate" destination server is a server running a node (or nodes) that requires the output belief. Those skilled in the art will note that by implementing such message passing, data from one server needed or expected by multiple nodes on another server may only be sent once as opposed to multiple times for each of the multiple destination nodes. This may result in the use of less bandwidth across the cluster 350. Further, in one or more embodiments of the present invention, it may not be necessary for a message manager 364, 366, 368 on one server to be informed of the local topology of another server.

As described above, a message manager 364, 366, 368 sends "inter-server" messages based on information regarding the topology of the HTM network running across servers 370, 372, 374. This information may be specified to each message manager 364, 366, 368 by a Supervisor entity (e.g., 176 in FIG. 18). Further, in one or more embodiments of the present invention, information (e.g., address tables) regarding the topology of an HTM network may be formed dynamically without some central control.

Further, in one or more embodiments of the present invention, a message manager 364, 366, 368 of one server may communicate a message to a message manager 364, 366, 368 of another server, which then communicates the message to a message manager 364, 366, 368 of yet another server. Such "relay" message passing may be used, for example, to improve performance in a large-scale HTM-based system having many servers.

Further, in one or more embodiments of the present invention, message managers 364, 366, 368 may implement one or more of any various transport protocols (e.g., using a Message Passing Interface (MPI) or via a "zero-copy" protocol using shared memory).

Further, in one or more embodiments of the present invention, a message manager 364, 366, 368 may effectively send output data from a node managed by a first NPU to a node managed by a second NPU that is on the same server as the first NPU. Message managers 364, 366, 368 may communicate such "intra-server" messages using, for example, socket connections and/or shared memory buffers.

Further, although FIG. 26 shows a one-to-one correspondence between servers 370, 372, 374 and message managers 364, 366, 368, in one or more other embodiments of the present invention, any arrangement of servers and message managers may be used. For example, a particular server may not have a message manager. Further, for example, a message manager for NPUs running on one server may run on a different server.

In one or more embodiments of the present invention, a message formed by any one of message managers 364, 366, 368 may include sub-messages formed of a header portion and a data portion. The header portion may contain, for example, a source and/or destination ID, message type information, timing information, and/or a total data size of the sub-message. The data portion may contain, for example, the data itself. Further, in one or more embodiments of the present invention, a sub-message may be formed of a fixed-size header portion and a variable-size data portion. Because the header portion may contain size and content information as to the data portion, a receiving message manager may proactively allocate the necessary resources to receive the data portion. Further, in one or more embodiments of the present invention, the header and data portions may be transmitted over different communication channels (e.g., TCP sockets) so that receipt of the data portion may be deferred until resources are available and while not blocking receipt of further header portions.

Further, in one or more embodiments of the present invention, a message manager 364, 366, 368 as described above with reference to FIG. 26 may be related to, or otherwise associated with, a Router entity (e.g., 270 in FIG. 22).

Further, in one or more embodiments of the present invention, one or more of message managers 364, 366, 368 may ensure that messages routed through them are uncorrupted. Further, in one or more embodiments of the present invention, one or more of message managers 364, 366, 368 may implement lazy or proactive transmission algorithms. Further, in one or more embodiments of the present invention, one or more of message managers 364, 366, 368 may be used to profile an HTM network. Further, in one or more embodiments of the present invention, one or more of message managers 364, 366, 368 may be used to observe network behavior and/or monitor for performance issues. Further, in one or more embodiments of the present invention, one or more of message managers 364, 366, 368 may be used to detect and/or recover from faults. Further, in one or more embodiments of the present invention, one or more of message managers 364, 366, 368 may be used to perform "quality-of-service" operations.

Further, in one or more embodiments of the present invention, one or more of message managers 364, 366, 368 may have one or more message buffers. A message buffer of a message manager may be used to buffer all or parts of a received message (noting that the received message may originate from a node local to (i.e., on the same server as) the router or a node remote from (i.e., on a different server than) the router). Messages may be written to or read from a message buffer. Further, the message buffer may be used to help synchronize message passing in cluster 350. For example, a router having a message buffer may prevent node A from reading a message from its location in the message buffer while node B is writing to that location in the message buffer.

Figure 27:
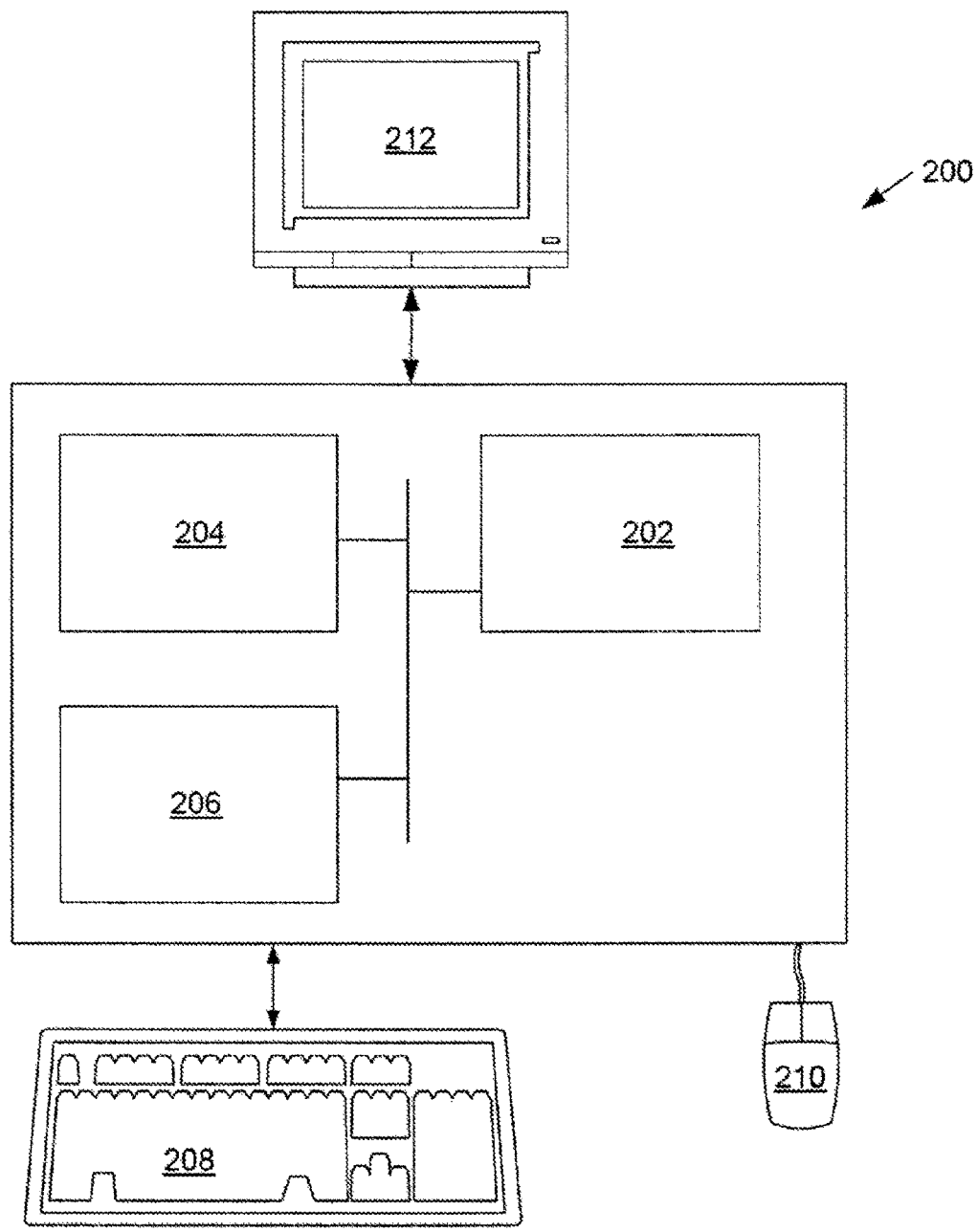
FIG. 27 shows a computer system in accordance with an embodiment of the present invention.

Further, an HTM in accordance with one or more embodiments of the present invention may be associated with virtually any type of computer system, including multiprocessor and multithreaded uniprocessor systems, regardless of the platform being used. For example, as shown in FIG. 27, a networked computer system 200 includes at least one processor (e.g., a general-purpose processor, a field-programmable gate array (FPGA), an application-specific integrated circuit (ASIC), a graphics processor) 202, associated memory 204, a storage device 206, and numerous other elements (not shown) and functionalities typical of modern computer systems. The networked computer system 200 may also include input means (e.g., a keyboard 208, a mouse 210, one or more sensory input systems (not shown)) and output means (e.g., a monitor 212). The networked computer system 200 is connected to a LAN or a wide area network (WAN) via a network interface connection (not shown). Those skilled in the art will appreciate that these input and output means may take other forms. Further, those skilled in the art will appreciate that one or more elements of the networked computer system 200 may be remotely located and connected to the other elements over a network. Further, software instructions to perform one or more embodiments of the present invention may be stored on a computer readable medium such as a compact disc (CD), a diskette, a tape, a file, a hard drive, or any other computer-readable storage device.

Advantages of the present invention may include one or more of the following. In one or more embodiments of the present invention, an HTM-based system may learn causes.

In one or more embodiments of the present invention, an HTM-based system may determine one or more causes of patterns that may change over space and/or time.

In one or more embodiments of the present invention, an HTM-based system may identify patterns occurring frequently over time and then assign them to one or more particular causes.

In one or more embodiments of the present invention, an HTM-based system may learn frequently occurring sequences and assign probabilities indicating the likelihood of elements in an input vector being part of the learned sequences.

In one or more embodiments of the present invention, an HTM-based system may assign spatially similar patterns to the same cause.

In one or more embodiments of the present invention, an HTM-based system may assign patterns received in order to the same cause.

In one or more embodiments of the present invention, an HTM-based system may learn timing between patterns in a received sequence.

In one or more embodiments of the present invention, an HTM-based system may assign patterns having no significant spatial overlap or timing relationship to the same cause.

In one or more embodiments of the present invention, an HTM may infer causes through belief propagation.

In one or more embodiments of the present invention, a belief in one node of an HTM may be used to inform a belief in another node of the HTM.

In one or more embodiments of the present invention, a belief in one node of an HTM may be passed from a higher level node to a lower level node.

In one or more embodiments of the present invention, belief propagation in an HTM may enable a node in the HTM to form a belief that is optimally and/or maximally consistent with the input to the node.

In one or more embodiments of the present invention, an HTM-based system may focus its determination of causes of input data on a subset of an entire input space, thereby possibly resulting in more efficient, less intensive, and/or faster determination of causes of novel input.

In one or more embodiments of the present invention, an HTM-based system may focus its determination of causes of input data on a particular category (or set thereof) of causes, thereby possibly resulting in more efficient, less intensive, and/or faster determination of causes of input data.

In one or more embodiments of the present invention, an HTM-based system may be used to create novel, complex, and goal-oriented behavior, where the behavior as a whole was not initially preprogrammed into the HTM-based system.

In one or more embodiments of the present invention, an HTM-based system may learn causes and form representations of behaviors caused both outside of and by the HTM-based system.

In one or more embodiments of the present invention, an HTM network may be implemented across one or more CPUs and/or servers.

In one or more embodiments of the present invention, an HTM network may be provided as a software platform that may be accessible in whole or in part by one or more third parties.

In one or more embodiments of the present invention, an HTM network implemented across one or more CPUs may be accessible through a controlled interface.

In one or more embodiments of the present invention, a functionality of an HTM network may be extensible.

In one or more embodiments of the present invention, an HTM network may be extended without recompiling source code for the entire HTM network.

In one or more embodiments of the present invention, various entities may extend an HTM network, thereby potentially improving the applicability, performance, speed, efficiency, robustness, and/or accuracy of the HTM network.

In one or more embodiments of the present invention, an HTM network may be extensible based on time, thereby providing for a real-time HTM network.

In one or more embodiments of the present invention, messages between nodes distributed across servers running all or part of an HTM network may be passed accurately and/or efficiently (e.g., using low relatively bandwidth).

In one or more embodiments of the present invention, one or more message managers running in an HTM network may be provided with information regarding the location of nodes in the HTM network. Such information may be used to efficiently route messages between nodes in the HTM network.

In one or more embodiments of the present invention, an HTM-based system is formed of a hierarchical network of nodes that may be used to represent a hierarchical spatial and temporal structure of a world in which the HTM-based system is designed to operate.

While the invention has been described with respect to a limited number of embodiments, those skilled in the art, having benefit of the above description, will appreciate that other embodiments can be devised which do not depart from the scope of the invention as disclosed herein. Accordingly, the scope of the invention should be limited only by the attached claims.

What is claimed is:

1. A computer-implemented system, comprising:
a processor;
a coincidence detector configured to:
    detect spatial patterns in an input signal, the spatial patterns in the input signal changing over time; and
    generate a series of coincidence detector outputs indicating the detected spatial patterns in the input signal; and
a sequence learner coupled to the coincidence detector and configured to:
    associate temporal sequences of the detected spatial patterns by storing temporal relationships between the series of coincidence detector outputs;

detecting a temporal sequence associated with two or more adjacent and distinct spatial patterns detected by the coincidence detector based on the stored temporal relationships between the series of coincidence detector outputs; and generate a sequence learner output indicating the detected temporal sequence.

2. The system of claim 1, wherein the sequence learner is configured to store the temporal relationships between the series of coincidence detector outputs in a list.

3. The system of claim 1, wherein the sequence learner output comprises numbers representing likelihood that the input signal is caused by objects or states of the objects.

4. The system of claim 1, wherein the coincidence detector and the sequence learner are implemented as software.

5. The system of claim 1, wherein the sequence learner, in a learning stage, is configured to remove a first sequence of spatial patterns responsive to receiving a second sequence of spatial patterns that is similar to the first sequence of spatial patterns.

6. The system of claim 1, wherein the sequence learner, in a learning stage, is configured to remove a sequence of spatial patterns based on occurrence frequency of the sequence of spatial patterns.

7. The system of claim 1, wherein the coincidence detector and the sequence learner are part of a computing module that forms a hierarchical structure with other computing modules.

8. A computer-implemented method, comprising:
at a coincidence detector, detecting spatial patterns in an input signal, the spatial patterns in the input signal changing over time;
at the coincidence detector, generating a series of coincidence detector outputs indicating the detected spatial patterns in the input signal;
at a sequence learner, associating temporal sequences of the detected spatial patterns by storing temporal relationships between the series of coincidence detector outputs;
at the sequence learner, detecting a temporal sequence associated with two or more adjacent and distinct spatial patterns detected by the coincidence based on the stored temporal relationships between the series of coincidence detector outputs; and
at the sequence learner, generating a sequence learner output indicating the detected temporal sequence.

9. The method of claim 8, wherein the temporal relationships between the series of coincidence detector outputs are stored in a list.

10. The method of claim 8, wherein the sequence learner output comprises numbers representing likelihood that the input signal is caused by objects or states of the objects.

11. The method of claim 8, wherein the coincidence detector and the sequence learner are implemented as software.

12. The method of claim 8, further comprising removing a first sequence of spatial patterns responsive to receiving a second sequence of spatial patterns that is similar to the first sequence of spatial patterns at the sequence learner in a learning stage.

13. The method of claim 8, further comprising removing a sequence of spatial patterns based on occurrence frequency of the sequence of spatial patterns at the sequence learner in a learning stage.

14. The method of claim 8, wherein the coincidence detector and the sequence learner are part of a computing module that forms a hierarchical structure with other computing modules.

15. A non-transitory computer-readable storage medium having instructions stored therein, the instructions when executed on a processor cause the processor to:
detect spatial patterns in an input signal, the spatial patterns in the input signal changing over time;
generate a series of coincidence detector outputs indicating the detected spatial patterns in the input signal;
associate temporal sequences of the detected spatial patterns by storing temporal relationships between the series of coincidence detector outputs;
detect a temporal sequence associated with two or more adjacent and distinct spatial patterns that are detected based on the stored temporal relationships between the series of coincidence detector outputs; and
generate a sequence learner output indicating the detected temporal sequence.

16. The computer-readable storage medium of claim 15, wherein the sequence learner output comprises numbers representing likelihood that the input signal is caused by objects or states of the objects.

17. The computer-readable storage medium of claim 15, wherein the temporal relationships between the series of coincidence detector outputs are stored in a list.

18. The computer-readable storage medium of claim 15, wherein the coincidence detector and the sequence learner are implemented as software.

19. The computer-readable storage medium of claim 15, further comprising instructions to remove a first sequence of spatial patterns responsive to receiving a second sequence of spatial patterns that is similar to the first sequence of spatial patterns at the sequence learner in a learning stage.

* * * * *